US012726365B2

(12) United States Patent
Small et al.

(10) Patent No.: US 12,726,365 B2
(45) Date of Patent: Sep. 1, 2026

(54) SYSTEM AND METHOD FOR MANAGING SECURE SHELL PROTOCOL ACCESS IN CLOUD INFRASTRUCTURE ENVIRONMENTS

(71) Applicant: Oracle International Corporation, Redwood Shores, CA (US)

(72) Inventors: Jeremiah David Small, Wesford, MA (US); Alexander Chebaturkin, Seattle, WA (US); Yavor Tashev, Issaquah, WA (US); Siddharth Satish Shenoy, Sammamish, WA (US); Thom Dixon, Kent, WA (US); Xin Xu, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 43 days.

(21) Appl. No.: 18/648,025

(22) Filed: Apr. 26, 2024

(65) Prior Publication Data

US 2025/0337599 A1 Oct. 30, 2025

(51) Int. Cl.
*H04L 9/32* (2006.01)
*H04L 9/40* (2022.01)

(52) U.S. Cl.
CPC ........ *H04L 9/3263* (2013.01); *H04L 63/0807* (2013.01)

(58) Field of Classification Search
CPC .......................... H04L 9/3263; H04L 63/0807
See application file for complete search history.

(56) References Cited

U.S. PATENT DOCUMENTS

| | | | |
|---|---|---|---|
| 8,113,959 | B2 | 2/2012 | De Judicibus |
| 8,161,173 | B1 | 4/2012 | Mishra et al. |

(Continued)

FOREIGN PATENT DOCUMENTS

| | | | |
|---|---|---|---|
| CA | 2804864 | C | 11/2018 |
| CA | 3159014 | A1 | 6/2021 |

(Continued)

OTHER PUBLICATIONS

"Generating and using SSH keys for remote host authentication," Retrieved from https://cloud.ibm.com/docs/ssh-keys?topic=ssh-keys-generating-and-using-ssh-keys-for-remote-host-authentication, Apr. 27, 2023, pp. 5.

(Continued)

*Primary Examiner* — Yonas A Bayou
(74) *Attorney, Agent, or Firm* — Invoke

(57) ABSTRACT

Techniques for creating, managing, and using SSH certificates with one or more target-specific principals are disclosed. A certificate authority receives a certificate signing request that includes both a user identifier and a resource identifier. The user identifier identifies a user, and the resource identifier represents one or more target hosts. The certificate authority forms a target-specific principal for use in creating the certificate. The target-specific principal indicates both the user and the resource identifier representing the resource(s) for which access is requested. The resource identifier may represent a host class associated with more than one host. Once the certificate authority verifies that the user is entitled to access the requested resource(s), it generates the certificate, signs it, and returns it to the requesting device.

20 Claims, 17 Drawing Sheets

(56) References Cited

U.S. PATENT DOCUMENTS 8,214,398 B1 7/2012 Cowan et al.
9,092,502 B1 7/2015 Cannaliato et al.
9,100,424 B1 8/2015 Thomas
9,137,093 B1 9/2015 Abraham et al.
9,164,864 B1 10/2015 Novick et al.
9,306,814 B1 4/2016 Roth et al.
9,438,599 B1 9/2016 Yuhan et al.
9,553,787 B1 1/2017 Stickle et al.
9,569,630 B2 2/2017 Cabrera et al.
9,571,516 B1 2/2017 Curcic et al.
9,722,895 B1 8/2017 Sarukkai et al.
9,876,703 B1 1/2018 Arllen et al.
9,985,947 B1 5/2018 Elhard
10,021,084 B2 7/2018 Matthews et al.
10,061,932 B1 8/2018 Combs et al.
10,089,476 B1 10/2018 Roth et al.
10,122,717 B1 11/2018 Reddy et al.
10,237,149 B1 3/2019 Guo et al.
10,261,782 B2 4/2019 Suarez et al.
10,270,759 B1 4/2019 Bordelon et al.
10,318,265 B1 6/2019 To et al.
10,394,638 B1 8/2019 Lay et al.
10,511,675 B1 12/2019 Chud
10,528,995 B2 1/2020 Maes
10,554,418 B2 2/2020 Kshirsagar et al.
10,567,360 B2 2/2020 Nirwal et al.
10,649,834 B2 5/2020 Dhayapule et al.
10,757,574 B1 8/2020 Rule et al.
10,819,594 B2 10/2020 Margalit et al.
10,878,483 B1 12/2020 Felbinger et al.
10,956,600 B2 3/2021 Ye et al.
10,974,516 B2 4/2021 Moriya
10,992,540 B1 4/2021 Kandaswamy et al.
11,070,492 B2 7/2021 Kostov et al.
11,121,985 B2 9/2021 Cidon et al.
11,321,137 B2 5/2022 Barsalou et al.
11,323,477 B1 5/2022 Kumar et al.
11,356,273 B1 6/2022 Patel et al.
11,360,821 B1 6/2022 Dey et al.
11,379,353 B1 7/2022 Marchetti et al.
11,444,925 B1 9/2022 Patimer et al.
11,537,627 B1 12/2022 Baskaran et al.
11,537,745 B2 12/2022 Yang et al.
11,552,953 B1 1/2023 Avadhanam
11,574,151 B2 2/2023 Wang et al.
11,575,508 B2 2/2023 Anand et al.
11,587,458 B2 2/2023 Lowensohn
11,593,251 B2 2/2023 Chirkin et al.
11,604,672 B2 3/2023 Subramanian et al.
11,652,616 B2 5/2023 Zee et al.
11,689,475 B2 6/2023 Goyal
11,720,536 B1 8/2023 Kisser et al.
11,727,464 B2 8/2023 Eisenstein et al.
11,765,244 B1 9/2023 Barclay et al.
11,853,753 B1 12/2023 Chawda et al.
11,936,678 B2 3/2024 Pieczul et al.
11,943,385 B1 3/2024 Kumar et al.
11,954,238 B1 4/2024 Tan et al.
12,021,888 B1 6/2024 Reed et al.
12,028,274 B1 7/2024 Krishnaiah et al.
12,067,493 B2 8/2024 Zhang et al.
12,143,917 B2 11/2024 Raffa et al.
12,164,652 B1 12/2024 Li et al.
12,363,148 B1 7/2025 Anil et al.
12,373,252 B1 7/2025 Faust et al.
12,445,419 B2 10/2025 Adogla et al.
12,457,204 B2 10/2025 Adogla et al.
12,493,901 B2 12/2025 Gallagher et al.
2002/0026592 A1 2/2002 Gavrila et al.
2002/0198973 A1 12/2002 Besaw
2003/0135593 A1 7/2003 Lee et al.
2003/0154407 A1 8/2003 Kato et al.
2005/0198331 A1 9/2005 Okajima et al.
2006/0230281 A1 10/2006 Hofmann
2007/0124374 A1 5/2007 Arun et al.
2007/0168531 A1 7/2007 Sitaraman et al.
2007/0179859 A1 8/2007 Chan et al.
2008/0295095 A1 11/2008 Watanabe et al.
2009/0164499 A1 6/2009 Samudrala et al.
2009/0165078 A1 6/2009 Samudrala et al.
2009/0205018 A1 8/2009 Ferraiolo et al.
2010/0106678 A1 4/2010 Pietrek et al.
2010/0131624 A1 5/2010 Ferris
2010/0153865 A1 6/2010 Barnes et al.
2010/0212004 A1 8/2010 Fu
2011/0055399 A1 3/2011 Tung et al.
2011/0167435 A1 7/2011 Fang
2011/0277017 A1 11/2011 Ivanov et al.
2011/0295727 A1 12/2011 Ferris et al.
2011/0296000 A1 12/2011 Ferris et al.
2012/0124211 A1 5/2012 Kampas et al.
2012/0131162 A1 5/2012 Brandt et al.
2012/0137001 A1 5/2012 Ferris et al.
2013/0054426 A1 2/2013 Rowland et al.
2013/0111027 A1 5/2013 Milojicic et al.
2013/0111609 A1 5/2013 Resch et al.
2013/0124720 A1 5/2013 Wood et al.
2013/0226699 A1 8/2013 Long
2013/0282540 A1 10/2013 Bliesner
2013/0282798 A1 10/2013 McCarthy et al.
2013/0297711 A1 11/2013 Nhu
2013/0297802 A1 11/2013 Laribi et al.
2013/0304925 A1 11/2013 Ferris et al.
2013/0339515 A1 12/2013 Radhakrishnan
2014/0007041 A1 1/2014 Schmeling et al.
2014/0074793 A1 3/2014 Doering et al.
2014/0075034 A1 3/2014 Vasudevan et al.
2014/0075565 A1 3/2014 Srinivasan et al.
2014/0089393 A1 3/2014 Druet et al.
2014/0095546 A1 4/2014 Kruglikov et al.
2014/0122707 A1 5/2014 De et al.
2014/0156846 A1 6/2014 Stern et al.
2014/0188938 A1 7/2014 Banks et al.
2014/0236745 A1 8/2014 Vautour
2014/0280595 A1 9/2014 Mani et al.
2015/0033086 A1 1/2015 Sasturkar et al.
2015/0089575 A1 3/2015 Vepa et al.
2015/0106736 A1 4/2015 Torman et al.
2015/0134485 A1 5/2015 Kim et al.
2015/0180734 A1 6/2015 Maes et al.
2015/0180949 A1 6/2015 Maes et al.
2015/0200824 A1 7/2015 Sadovsky et al.
2015/0242262 A1 8/2015 Ranganathan et al.
2015/0350101 A1 12/2015 Sinha et al.
2015/0358161 A1* 12/2015 Kancharla ........... H04L 63/0823 713/164
2015/0363852 A1 12/2015 Vautour
2015/0365291 A1 12/2015 Burton et al.
2015/0372938 A1 12/2015 Patel et al.
2015/0381526 A1 12/2015 Beaty et al.
2016/0043909 A1 2/2016 Pogrebinsky et al.
2016/0080479 A1 3/2016 Zhang et al.
2016/0110553 A1 4/2016 Factor et al.
2016/0125489 A1 5/2016 Gupte et al.
2016/0127418 A1 5/2016 Maes et al.
2016/0132806 A1 5/2016 To et al.
2016/0139737 A1 5/2016 Conn et al.
2016/0142211 A1 5/2016 Metke et al.
2016/0142323 A1 5/2016 Lehmann et al.
2016/0203533 A1 7/2016 Cheng et al.
2016/0253722 A1 9/2016 Johnson et al.
2016/0277411 A1 9/2016 Dani et al.
2016/0294881 A1 10/2016 Hua et al.
2017/0006119 A1 1/2017 Pogrebinsky et al.
2017/0069011 A1 3/2017 Akkiraju et al.
2017/0111331 A1 4/2017 Auradkar et al.
2017/0111446 A1 4/2017 Rivera et al.
2017/0116334 A1 4/2017 Kruglikov et al.
2017/0201525 A1 7/2017 Biller et al.
2017/0214632 A1 7/2017 Ravi
2017/0230229 A1 8/2017 Sasturkar et al.
2017/0272336 A1 9/2017 Johnstone et al.
2017/0323112 A1 11/2017 Tran et al.
2017/0373860 A1* 12/2017 Kshirsagar ............. H04L 67/02

(56) References Cited

U.S. PATENT DOCUMENTS

| | | | |
|---|---|---|---|
| 2018/0025399 | A1 | 1/2018 | Nedeltchev et al. |
| 2018/0052861 | A1 | 2/2018 | Seetharaman et al. |
| 2018/0124105 | A1 | 5/2018 | Rodrigues |
| 2018/0137261 | A1* | 5/2018 | Lattin ..................... G06F 21/12 |
| 2018/0173510 | A1 | 6/2018 | Koshkin et al. |
| 2018/0176023 | A1* | 6/2018 | Prickett ................... G06F 21/12 |
| 2018/0191718 | A1 | 7/2018 | Kuzkin et al. |
| 2018/0212778 | A1* | 7/2018 | Novak ................ H04L 63/0435 |
| 2018/0219784 | A1 | 8/2018 | Jiang et al. |
| 2018/0234256 | A1 | 8/2018 | Bowen |
| 2018/0287914 | A1 | 10/2018 | Gupta |
| 2018/0288063 | A1 | 10/2018 | Koottayi et al. |
| 2018/0288135 | A1 | 10/2018 | Narayan et al. |
| 2018/0330300 | A1 | 11/2018 | Runkana et al. |
| 2018/0356964 | A1 | 12/2018 | Morris |
| 2018/0367542 | A1 | 12/2018 | Wolf et al. |
| 2018/0373521 | A1 | 12/2018 | Huang et al. |
| 2019/0020659 | A1 | 1/2019 | Loni et al. |
| 2019/0036797 | A1 | 1/2019 | Margalit et al. |
| 2019/0068622 | A1 | 2/2019 | Lin et al. |
| 2019/0087835 | A1 | 3/2019 | Schwed et al. |
| 2019/0097812 | A1 | 3/2019 | Toth |
| 2019/0104035 | A1 | 4/2019 | Cidon et al. |
| 2019/0114335 | A1 | 4/2019 | Koenig et al. |
| 2019/0132299 | A1 | 5/2019 | Tucker et al. |
| 2019/0149417 | A1 | 5/2019 | Augusto et al. |
| 2019/0155674 | A1 | 5/2019 | Dhayapule et al. |
| 2019/0156000 | A1 | 5/2019 | Hoffmann et al. |
| 2019/0166007 | A1 | 5/2019 | Sundaram et al. |
| 2019/0182153 | A1 | 6/2019 | Gundavelli et al. |
| 2019/0190917 | A1 | 6/2019 | Joe |
| 2019/0205045 | A1 | 7/2019 | Hugot et al. |
| 2019/0213104 | A1 | 7/2019 | Qadri et al. |
| 2019/0332789 | A1 | 10/2019 | Vandenbrouck et al. |
| 2019/0334917 | A1 | 10/2019 | Demmler et al. |
| 2019/0349426 | A1 | 11/2019 | Smith et al. |
| 2019/0354692 | A1 | 11/2019 | Thoram et al. |
| 2019/0362087 | A1 | 11/2019 | Ferrans et al. |
| 2020/0004569 | A1 | 1/2020 | Gupta et al. |
| 2020/0014659 | A1 | 1/2020 | Chasman et al. |
| 2020/0042675 | A1* | 2/2020 | Asanghanwa ........ H04L 63/123 |
| 2020/0097315 | A1* | 3/2020 | Faynberg .............. H04L 9/3263 |
| 2020/0112497 | A1 | 4/2020 | Yenumulapalli et al. |
| 2020/0117757 | A1 | 4/2020 | Yanamandra et al. |
| 2020/0128047 | A1 | 4/2020 | Biswas et al. |
| 2020/0134223 | A1 | 4/2020 | Ye et al. |
| 2020/0236096 | A1 | 7/2020 | Zhu et al. |
| 2020/0244527 | A1 | 7/2020 | Sharma et al. |
| 2020/0244549 | A1 | 7/2020 | Finch et al. |
| 2020/0250661 | A1 | 8/2020 | Padmanabhan et al. |
| 2020/0285496 | A1 | 9/2020 | Cropper et al. |
| 2020/0285737 | A1 | 9/2020 | Kraus et al. |
| 2020/0358617 | A1 | 11/2020 | Baierlein et al. |
| 2020/0358756 | A1 | 11/2020 | Rose et al. |
| 2020/0366716 | A1 | 11/2020 | Singh et al. |
| 2020/0389463 | A1 | 12/2020 | Chen |
| 2021/0036851 | A1 | 2/2021 | Villapakkam et al. |
| 2021/0064431 | A1 | 3/2021 | Smith et al. |
| 2021/0067372 | A1 | 3/2021 | Cidon et al. |
| 2021/0081404 | A1 | 3/2021 | Kempf et al. |
| 2021/0084048 | A1 | 3/2021 | Kannan et al. |
| 2021/0103991 | A1 | 4/2021 | Kern et al. |
| 2021/0142276 | A1 | 5/2021 | Gupte |
| 2021/0144440 | A1 | 5/2021 | Li et al. |
| 2021/0216190 | A1 | 7/2021 | Vakil et al. |
| 2021/0218722 | A1 | 7/2021 | Gaylor et al. |
| 2021/0224076 | A1 | 7/2021 | Dockter et al. |
| 2021/0224122 | A1 | 7/2021 | Glass et al. |
| 2021/0224132 | A1 | 7/2021 | Barsalou |
| 2021/0224409 | A1 | 7/2021 | Avanes et al. |
| 2021/0226956 | A1 | 7/2021 | Wei et al. |
| 2021/0234864 | A1 | 7/2021 | Dube et al. |
| 2021/0273914 | A1 | 9/2021 | Cobb |
| 2021/0279109 | A1 | 9/2021 | Ji et al. |
| 2021/0334375 | A1 | 10/2021 | Hu et al. |
| 2021/0368514 | A1 | 11/2021 | Xing |
| 2021/0377272 | A1 | 12/2021 | Dasari et al. |
| 2021/0377276 | A1 | 12/2021 | Dasari et al. |
| 2021/0382725 | A1 | 12/2021 | Vemula et al. |
| 2021/0383325 | A1 | 12/2021 | Loupos et al. |
| 2021/0392048 | A1 | 12/2021 | Olden et al. |
| 2021/0392142 | A1 | 12/2021 | Stephens et al. |
| 2021/0409403 | A1 | 12/2021 | Lewin et al. |
| 2022/0029803 | A1 | 1/2022 | Vijayanarayanan |
| 2022/0038449 | A1 | 2/2022 | Tripp et al. |
| 2022/0091947 | A1 | 3/2022 | Kothari et al. |
| 2022/0100573 | A1 | 3/2022 | Allen |
| 2022/0103566 | A1 | 3/2022 | Faulkner |
| 2022/0103618 | A1 | 3/2022 | Pinheiro et al. |
| 2022/0116285 | A1 | 4/2022 | Abdollahi et al. |
| 2022/0122097 | A1 | 4/2022 | Maugans, III |
| 2022/0129575 | A1 | 4/2022 | Goel et al. |
| 2022/0150124 | A1 | 5/2022 | Cooley et al. |
| 2022/0150133 | A1 | 5/2022 | Dhruvakumar et al. |
| 2022/0159010 | A1 | 5/2022 | Bandarupalli et al. |
| 2022/0191192 | A1 | 6/2022 | Drr et al. |
| 2022/0244949 | A1 | 8/2022 | Iqbal et al. |
| 2022/0255902 | A1 | 8/2022 | Woodson |
| 2022/0263793 | A1 | 8/2022 | Baker et al. |
| 2022/0271929 | A1 | 8/2022 | Villapakkam et al. |
| 2022/0283926 | A1 | 9/2022 | Chirkin et al. |
| 2022/0294818 | A1 | 9/2022 | Parekh et al. |
| 2022/0327095 | A1 | 10/2022 | Kim et al. |
| 2022/0335340 | A1 | 10/2022 | Moustafa et al. |
| 2022/0350675 | A1 | 11/2022 | Navali et al. |
| 2022/0353133 | A1 | 11/2022 | Shrestha et al. |
| 2022/0365835 | A1 | 11/2022 | Kandasamy et al. |
| 2022/0368813 | A1 | 11/2022 | Rossignol et al. |
| 2022/0374271 | A1 | 11/2022 | Pogrebinsky et al. |
| 2022/0377111 | A1 | 11/2022 | Liao et al. |
| 2022/0382598 | A1 | 12/2022 | Szab et al. |
| 2022/0398078 | A1 | 12/2022 | Segler |
| 2022/0405152 | A1 | 12/2022 | Edamadaka et al. |
| 2022/0413956 | A1 | 12/2022 | Mathew et al. |
| 2023/0006889 | A1 | 1/2023 | Thyagaturu et al. |
| 2023/0011628 | A1 | 1/2023 | Hurley et al. |
| 2023/0032585 | A1 | 2/2023 | Jeuk et al. |
| 2023/0068221 | A1 | 3/2023 | Magowan et al. |
| 2023/0086475 | A1 | 3/2023 | Mosko |
| 2023/0104368 | A1 | 4/2023 | Miriyala et al. |
| 2023/0105901 | A1 | 4/2023 | Adogla et al. |
| 2023/0107133 | A1 | 4/2023 | Ali et al. |
| 2023/0108661 | A1 | 4/2023 | Adogla et al. |
| 2023/0109926 | A1 | 4/2023 | Nair et al. |
| 2023/0110527 | A1 | 4/2023 | Bhat et al. |
| 2023/0116463 | A1 | 4/2023 | Rath et al. |
| 2023/0126757 | A1 | 4/2023 | Roy et al. |
| 2023/0132478 | A1 | 5/2023 | Robinson et al. |
| 2023/0179525 | A1 | 6/2023 | Pai et al. |
| 2023/0222550 | A1 | 7/2023 | Huang et al. |
| 2023/0224304 | A1 | 7/2023 | Lukanov et al. |
| 2023/0281100 | A1 | 9/2023 | Wells et al. |
| 2023/0315726 | A1 | 10/2023 | Ponjavic et al. |
| 2023/0316348 | A1 | 10/2023 | Dageville et al. |
| 2023/0328003 | A1 | 10/2023 | Agarwal et al. |
| 2023/0342179 | A1 | 10/2023 | Suttle et al. |
| 2023/0362161 | A1 | 11/2023 | Spector et al. |
| 2023/0367654 | A1 | 11/2023 | Kurian et al. |
| 2023/0370461 | A1 | 11/2023 | Kalley et al. |
| 2023/0385286 | A1 | 11/2023 | Glickman et al. |
| 2023/0386655 | A1 | 11/2023 | Kouvaras et al. |
| 2023/0393829 | A1 | 12/2023 | Panikkar et al. |
| 2023/0409590 | A1 | 12/2023 | Shah et al. |
| 2023/0418979 | A1 | 12/2023 | Deluca et al. |
| 2024/0015164 | A1 | 1/2024 | Guy et al. |
| 2024/0015165 | A1 | 1/2024 | Guy et al. |
| 2024/0031373 | A1 | 1/2024 | Gupta |
| 2024/0053973 | A1 | 2/2024 | Ranganathan et al. |
| 2024/0054063 | A1 | 2/2024 | Wichelman et al. |
| 2024/0061714 | A1 | 2/2024 | Pandit et al. |
| 2024/0069884 | A1 | 2/2024 | Majumdar et al. |
| 2024/0070735 | A1 | 2/2024 | Gallagher et al. |
| 2024/0089722 | A1 | 3/2024 | Samanta et al. |
| 2024/0095056 | A1 | 3/2024 | Adogla et al. |

(56) References Cited

U.S. PATENT DOCUMENTS

| | | | |
|---|---|---|---|
| 2024/0095390 A1 | 3/2024 | Chao et al. | |
| 2024/0095739 A1 | 3/2024 | Adogla et al. | |
| 2024/0095809 A1 | 3/2024 | Adogla et al. | |
| 2024/0095865 A1 | 3/2024 | Adogla et al. | |
| 2024/0098088 A1 | 3/2024 | Adogla et al. | |
| 2024/0098089 A1 | 3/2024 | Adogla et al. | |
| 2024/0103818 A1 | 3/2024 | Gallagher et al. | |
| 2024/0106832 A1 | 3/2024 | Adogla et al. | |
| 2024/0137339 A1 | 4/2024 | Vemulpali | |
| 2024/0143351 A1 | 5/2024 | Davis | |
| 2024/0152401 A1 | 5/2024 | Naseem | |
| 2024/0160517 A1 | 5/2024 | Fischer et al. | |
| 2024/0171586 A1 | 5/2024 | Jain et al. | |
| 2024/0184465 A1 | 6/2024 | Zwiegincew et al. | |
| 2024/0205235 A1 | 6/2024 | Batni | |
| 2024/0232408 A1 | 7/2024 | Pan et al. | |
| 2024/0244053 A1 | 7/2024 | Tian et al. | |
| 2024/0259389 A1 | 8/2024 | Wu et al. | |
| 2024/0275853 A1 | 8/2024 | Singh et al. | |
| 2024/0291729 A1 | 8/2024 | Khan et al. | |
| 2024/0305622 A1 | 9/2024 | Vijayan et al. | |
| 2024/0320240 A1 | 9/2024 | Podder | |
| 2024/0330069 A1 | 10/2024 | Atur et al. | |
| 2024/0330072 A1 | 10/2024 | Kantamneni et al. | |
| 2024/0362130 A1 | 10/2024 | Berg et al. | |
| 2024/0362142 A1 | 10/2024 | Berg et al. | |
| 2024/0364509 A1* | 10/2024 | Potlapally | H04L 9/0891 |
| 2024/0364579 A1 | 10/2024 | Peterson et al. | |
| 2024/0364707 A1 | 10/2024 | Elmenshawy et al. | |
| 2024/0378307 A1 | 11/2024 | Dcosta | |
| 2024/0378518 A1 | 11/2024 | Sparrow et al. | |
| 2024/0386054 A1 | 11/2024 | Wouhaybi et al. | |
| 2024/0388512 A1 | 11/2024 | Tesfatsion et al. | |
| 2024/0414169 A1 | 12/2024 | Fang et al. | |
| 2024/0422215 A1 | 12/2024 | Khan et al. | |
| 2024/0427658 A1 | 12/2024 | Pinahs et al. | |
| 2025/0023844 A1 | 1/2025 | Juneja et al. | |
| 2025/0077214 A1 | 3/2025 | Banaal | |
| 2025/0106221 A1 | 3/2025 | Wang et al. | |
| 2025/0126028 A1 | 4/2025 | Mohan et al. | |
| 2025/0199866 A1 | 6/2025 | Rushton et al. | |

FOREIGN PATENT DOCUMENTS

| | | |
|---|---|---|
| CN | 102656589 A | 9/2012 |
| CN | 104106276 A | 10/2014 |
| CN | 108197493 A | 6/2018 |
| CN | 114091725 A | 2/2022 |
| CN | 118312629 A | 7/2024 |
| EP | 2893685 B1 | 7/2017 |
| EP | 3429156 A1 | 1/2019 |
| EP | 3271857 B1 | 4/2020 |
| KR | 10-2014-0066616 A | 6/2014 |
| WO | 2010/088081 A1 | 8/2010 |
| WO | 2012/006638 A1 | 1/2012 |
| WO | 2014/039921 A1 | 3/2014 |
| WO | 2018/010791 A1 | 1/2018 |
| WO | 2019/212773 A1 | 11/2019 |
| WO | 2020/252088 A1 | 12/2020 |
| WO | 2021/051933 A1 | 3/2021 |
| WO | 2021/145894 A1 | 7/2021 |
| WO | 2021/150306 A1 | 7/2021 |
| WO | 2021/150307 A1 | 7/2021 |
| WO | 2021/150366 A1 | 7/2021 |
| WO | 2021/150435 A1 | 7/2021 |
| WO | 2021/174104 A1 | 9/2021 |
| WO | 2022/005992 A1 | 1/2022 |
| WO | 2022/104395 A1 | 5/2022 |
| WO | 2022/104396 A1 | 5/2022 |

OTHER PUBLICATIONS

"New: Using Amazon EC2 Instance Connect for SSH access to your EC2 Instances," Retrieved from https://aws.amazon.com/blogs/compute/new-using-amazon-ec2-instance-connect-for-ssh-access-to-your-ec2-instances/, Retrieved on Aug. 5, 2024, pp. 12.

"SSH Certificates Management Automation Made Easy Introducing Certonid," Retrieved from https://mailtrap.io/blog/certonid/, Retrieved on Aug. 5, 2024, pp. 19.

Magouryrk Clay: "Announcing Oracle Alloy: The power of the cloud in your hands", Oct. 18, 2022, XP093183485.

Mampage et al., "A Holistic View on Resource Management in Serverless Computing Environments Taxonomy and Future Directions", Research Gate, ACM Computing Surveys, 2022, 34 pages.

Marketplace Management, Available online at: https://www.appxite.com/platform/manage-marketplace?hsLang=en, 2022, 4 pages.

Marketplace Setup, Available online at: https://www.appxite.com/platform/launch-marketplace?hsLang=en, 2022, 3 pages.

Microsoft Learn, "Azure Key Vault REST API reference", Apr. 19, 2023, Available online at <https://learn.microsoft.com/en-us/rest/api/keyvault/>, 12 pages.

Microsoft Learn: "Connect to a Key Vault via private endpoint—Code Samples", Jul. 6, 2022, Available online at <https://learn.microsoft.com/en-US/samples/azure/azure-quickstart-templates/key-vault-private-endpoint/>, 5 pages.

Nolle, "Operational Strategies for Isolation in Cloud Computing", Tech Target, Sep. 15, 2021, 6 pages.

Organization Governance for Google Cloud Marketplace, Available online at: https://cloud.google.com/marketplace/docs/governance, Accessed from internet on Jan. 18, 2023, 1 page.

Palanisamy, "Cloud-based and Containerized Testing Environments Revolutionizing Text Automation", International Journal of Science and Research Archive, 2021, 11 pages.

Power your Cloud Business with StreamOne Cloud Marketplace, Available online at: https://asia.techdata.com/sg/wp-content/uploads/2021/01/SCM_TD_10.23.pdf, 2 pages.

Private Marketplace, Available online at: https://aws.amazon.com/marketplace/features/privatemarketplace, 2023, 4 pages.

Q. S. Singh and Y. Liu, "A cloud service architecture for analyzing big monitoring data," in Tsinghua Science and Technology, vol. 21, No. 1, pp. 55-70, Feb. 2016, doi: 10.1109/TST.2016.7399283 (Year: 2016).

Resell Cloud Marketplace Products from Independent Software Vendors (ISVs), Available online at: https://cloud.google.com/marketplace/docs/partners/resell, Accessed from internet on Jan. 18, 2023, 1 page.

Set up your Cloud Marketplace Products for Resale, Available online at: https://cloud.google.com/marketplace/docs/partners/resell/set-up-reselling, Accessed from internet on Jan. 18, 2023, 2 pages.

Soldani et al., "Anomaly Detection and Failure Root Cause Analysis in (Micro)Service-Based Cloud Applications: A Survey", ACM Computing Surveys, vol. 55, No. 3, Article 59, Feb. 2022, pp. 1-39.

U S U.S. Appl. No. 18/498,964, Non-Final Office Action mailed on Jul. 29, 2025, 23 pages.

U.S. Appl. No. 18/537,902, Non-Final Office Action, mailed on May 20, 2025, 10 pages.

U.S. Appl. No. 18/368,870, Non-Final Office Action mailed on Mar. 31, 2025, 11 pages.

U.S. Appl. No. 18/368,884, Non-Final Office Action mailed on Mar. 6, 2025, 44 pages.

U.S. Appl. No. 18/468,037, Non-Final Office Action mailed on Mar. 20, 2025, 8 pages.

U.S. Appl. No. 18/468,044, Non-Final Office Action mailed on May 19, 2025, 22 pages.

U.S. Appl. No. 18/468,047, Non-Final Office Action mailed on May 23, 2025, 11 pages.

Vanbenschoten et al., "Enabling the Next Generation of Multi-Region Applications with CockroachDB", Available Online at https //www cockroachlabs com/pdf/SIGMOD2022 pdf, Jun. 11, 2022, 14 pages.

Vidich, "Microsoft Publishes Secure Isolation Guidance for Azure and Azure Government", Microsoft, Dev Blogs, Aug. 31, 2020, 6 pages.

Want to Resell Public Cloud Services?, Available online At: https://ngkloud.com/resell-public-cloud/, 2021, 3 pages.

(56) References Cited

OTHER PUBLICATIONS

What is AWS Marketplace, Available online at: https://docs.aws.amazon.com/marketplace/latest/userguide/what-is-marketplace.html, Accessed from internet on Jan. 18, 2023, 5 pages.
What is Azure Marketplace?, Available online At: https://learn.microsoft.com/en-us/marketplace/azure-marketplace-overview?source=recommendations, Dec. 30, 2022, 9 pages.
What is Google Cloud Marketplace?, Available online at: https://cloud.google.com/marketplace/docs, Accessed from internet on Jan. 18, 2023, 2 pages.
Yedida et al., "Partitioning Cloud-based Microservices", Research Gate, via Deep Learning, Sep. 29, 2021, 11 pages.
"Cloud External Key Manager," Retrieved from https://cloud.google.com/kms/docs/ekm, Mar. 4, 2024, pp. 5.
"CNAME Record", Wikipedia, Available Online at: https://en.wikipedia.org/w/index.php?title=CNAME_record&oldld=I105641340, Accessed from Internet on Jan. 24, 2024, 4 pages.
"Create a Reseller and Reseller Administrator User", Retrieved from https://abiquo.atlassian.net/wiki/spaces/ABI54/pages/310740667/Create+a+Reseller+and+Reseller+Administrator+User, May 3, 2022, pp. 1-5.
"Dedicated Region Cloud@Customer", Available Online at: https://web.archive.org/web/20220705140320if_/https://www.oracle.com/a/ocom/docs/cloud/dedicated-region-cloud-customer-product-brief.pdf, Jul. 5, 2022, 4 pages.
"Developing System Services in Oracle Solaris 11.3", Oracle, Available Online at: https://docs.oracle.com/cd/E53394_01/pdf/E60814.pdf, Sep. 1, 2018, 76 pages.
"External Key Management for AWS by T-Systems, AWS Premier Consulting and Security Competency Partner," Retrieved from https://www.t-systems.com/resource/blob/565764/35be2fbd609320ec590eea9c5fbdf592/DL-Flyer-External-Key-Managment-for-AWS-T-Systems-EN-Aug. 2023.pdf, Retrieved on Jul. 30, 2024, pp. 2.
"External key stores," Retrieved from https://docs.aws.amazon.com/kms/latest/developerguide/keystore-external.html, Mar. 4, 2024, pp. 16.
"General Variables for All Requests", Jun. 28, 2023, pp. 6.
"IBM SmartCloud: Becoming a Cloud Service Provider", IBM, Dec. 13, 2012, <https://www.redbooks.ibm.com/abstracts/redp4912.html> (Year: 2012).
"Integrating Skyhigh CASB On-Prem Proxy with aKey Management Server," Retrieved from https://success.skyhighsecurity.com/Skyhigh_CASB/Skyhigh_CASB_Settings/On-Prem_Proxy/zIntegrating_MVISION_Cloud_On-Prem_Proxy_with_a_Key_Management_Server, Sep. 3, 2021, pp. 3.
"Key Management Interoperability Protocol (KMIP)," Retrieved from https://www.encryptionconsulting.com/education-center/kmip/#:~:text=KMIP%20is%20an%20extensible%20communication,by%20simplifying%20encryption%20key%20management., Retrieved on Jul. 30, 2024, pp. 5.
"Multicloud Architecture Partitioned, Cloud Burst and DR", NetApp, Apr. 9, 2020, 7 pages.
"Overview of Access Approval", Retrieved from https://cloud.google.com/assured-workloads/access-approval/docs/overview, Jun. 6, 2024, pp. 5.
"Overview of Search", Oracle Cloud Infrastructure Documentation, May 13, 2024, pp. 15.
"Overview of Tagging", Oracle Cloud Infrastructure Documentation, Mar. 28, 2024, pp. 12.
"Periodic 802.1X reauthentication", Retrieved from https://techhub.hpe.com/eginfolib/networking/docs/switches/5130ei/5200-3946_security_cg/content/485048074.htm, Retrieved from Oct. 25, 2023, p. 1.
"Policy Syntax", Jan. 4, 2023, pp. 7.
"Reinstate admin privileges for a customer's Azure CSP subscriptions", Retrieved from https://learn.microsoft.com/en-us/partner-center/reinstate-csp, Aug. 1, 2023, pp. 7.
"Sepior's Cloud Encryption Technology Now Supports Key Management Interoperability Protocol (KMIP)," SEPIOR, Nov. 10, 2017, pp. 4.
"StorMagic-SvKMS-Data-Sheet," Retrieved from https://stormagic.com/pdf/data-sheet/StorMagic-SvKMS-Data-Sheet.pdf, 2023, pp. 4.
"Tenant administrator settings", Retrieved from https://backstage.forgerock.com/docs/idcloud/latest/tenants/tenant-administrator-settings.html, Jun. 7, 2023, pp. 12.
22 "Verbs", Jun. 5, 2023, pp. 2.
10 Reasons to Become an AwesomeCloud Channel Partner, Available online at: https://www.awesomecloud.com/about/why-awesomecloud/, 2023, 3 pages.
Aldossary, "A Review of Dynamic Resource Management in Cloud Computing Environments", Computer Systems Science and Engineering, vol. 36, No. 3, 2021, pp. 461-476.
Anonymbus: "Tokenization—(data security)", Wikipedia, Feb. 1'2, 2023, pp. 1-12.
Anonymous: "AWS Identity and Access Management user guide—first 400 pages", Mar. 15, 2024, https://web.archive.org/web/2024031518 3106if_/https://docs.aws.amazon.com/pdfs/IAM/latest/UserGuide/iam-ug.pdf, pp. 4215.
Anonymous: "IAM Roles Anywhere with an external certificate authority : AWS Security Blog", Oct. 20, 2023, Retrieved from https://aws.amazon.com/blogs/security/ iam-roles-anywhere-with-an-external-certificate-authority/, pp. 1-18.
Anonymous: "OCI Documentation—Managing Key Pairs on Linux Instances", Mar. 6, 2024, https://web.archive.org/web/2024030621 4752/https://docs.oracle.com/en-us/iaas/Content/Compute/Tasks/managingkeypairs.htm.
Anonymous: "OCI Documentation—Security Credentials", Dec. 11, 2023, https://web.archive.org/web/2023121122 2908/https://docs.oracle.com/en-us/iaas/Content/General/Concepts/credentials.htm.
Anonymous: "Oracle Cloud Infrastructure Documentation—Security Guide for Exadata Database Service on Cloud@Customer Systems", Apr. 1, 2023, XP093181902.
Anonymous: "Oracle Cloud Infrastructure Documentation—Overview of IAM", Feb. 8, 2023, XP093184083.
Anonymous: "Oracle Cloud Infrastructure Documentation—Renaming a Cloud Account", May 14, 2021, XP093185071.
Anonymous: "Oracle Cloud Infrastructure Documentation—Site-to-Site VPN Overview", Feb. 8, 2023, XP093184733.
Anonymous: "Oracle Cloud Infrastructure Documentation—Billing and cost management overview", Dec. 20, 2022, XP093183514.
Anonymous: "Oracle Cloud Infrastructure Documentation—Cloud Guard concepts", Jan. 18, 2022, XP093183028.
Anonymous: "Oracle Cloud Infrastructure Documentation—Getting Started with Policies", Jan. 4, 2023, XP093184099.
Anonymous: "Oracle Cloud Infrastructure Documentation—Getting Summary Information on the Overview Page", Aug. 16, 2022, XP093183031.
Anonymous: "Oracle Cloud Infrastructure Documentation—Learn Best Practices for Setting Up Your Tenancy", Feb. 8, 2023, XP093184095.
Anonymous: "Oracle Cloud Infrastructure Documentation—Managing Compartments", Feb. 8, 2023, XP093184098.
Anonymous: "Oracle Cloud Infrastructure Documentation—Monitoring Threats", Sep. 28, 2022, XP093183035.
Anonymous: "Oracle Cloud Infrastructure Documentation—Overview of the Console Dashboards Service", Mar. 14, 2023, XP093184740.
Anonymous: "Oracle Cloud Infrastructure Documentation—Prerequisites for Oracle Platform Services on Oracle Cloud Infrastructure", Mar. 23, 2023, XP093185058.
Anonymous: "Oracle Cloud Infrastructure Documentation—Welcome to Oracle Cloud Infrastructure", Mar. 23, 2023, XP093182493.
Anonymous: "Oracle Gen 2 Exadata Cloud@Customer Security Controls", Jan. 11, 2023, XP093181973.
Anonymous: "Oracle Operator Access Control Configuration and Administration Guide", Nov. 18, 2022, XP093181896.
Anonymous: "Oracle Public Sector Licensing and Permitting", 2022, XP093184298.

(56) References Cited

OTHER PUBLICATIONS

Anonymous: "Oracle Sovereign Cloud", Feb. 15, 2023, XP093184649.
Anonymous: "Set up AWS Private Certificate Authority to issue certificates for use with IAM Roles Anywhere : AWS Security Blog", Retrieved from https://aws.amazon.com/blogs/security/set-up-aws-private-certificate-authority-to-issue-certificates-for-use-with-iam-roles-anywhere/, Nov. 8, 2023, pp. 1-14.
Anonymous: "Tokenization—(data security)", Wikipedia, Feb. 1'2, 2023, pp. 1-12.
U.S. Appl. No. 18/368,863, Non-Final Office Action, Mailed On Jun. 17, 2025, 11 pages.
U.S. Appl. No. 18/368,884, Final Office Action, Mailed On Nov. 10, 2025, 58 pages.
U.S. Appl. No. 18/468,024, Notice of Allowance, Mailed On Jun. 23, 2025, 8 pages.
U.S. Appl. No. 18/468,238 , Notice of Allowance, Mailed On Jul. 3, 2025, 9 pages.
Apps2fusion: "Security Roles in Oracle Fusion Cloud SLA", Nov. 30, 2018, XP093184293.
AwesomeCloud Services, Available online at: https://www.awesomecloud.com/about/, Accessed from internet on Jan. 18, 2023, 2 pages.
Azure Marketplace Service Providers Guide, Available online at: https://docs.azure.cn/en-us/articles/azure-marketplace/publishguide, Mar. 9, 2021, 9 pages.
Bhat S., "Admin access management in Azure Cloud Solution Provider (CSP) subscriptions", Retrieved from https://techcommunity.microsoft.com/t5/security-compliance-and-identity/admin-access-management-in-azure-cloud-solution-provider-csp/ba-p/3947126, Nov. 21, 2023, pp. 8.
Bridgwater, "Location, Location, Partition How To Beat Latency As Cloud Grows", Forbes, Dec. 3, 2020, 5 pages.
Cloud Reseller Program Overview, Available online at: https://www.awesomecloud.com/cloud-reseller-program/, 2023, 3 pages.
Create a Private Marketplace, Available online at: https://cloud.google.com/marketplace/docs/governance/private-marketplace, Accessed from internet on Jan. 18, 2023, 2 pages.
Direct As-a-Service Sales Platform, Available online at: https://www.appxite.com/cloud-saas-sellers, 2022, 3 pages.
Drive Revenue by Selling in AWS Marketplace, Available online at: https://aws.amazon.com/marketplace/partners/management-tour, Accessed from internet on Jan. 18, 2023, 7 pages.
Ducharme et al., "Seamlessly Protect Your IBM Cloud Application Infrastructure with Privileged Access Gateway", Oct. 3, 2022, pp. 13.
Enable Google Private Marketplace, Available online at: https://cloud.google.com/marketplace/docs/governance/enable-private-marketplace, Accessed from internet on Jan. 18, 2023, 2 pages.
F. John Krautheim ; Private Virtual Infrastructure for Cloud Computing; USENIX:2009; pp. 1-5.
Ferry, "Kubernetes Namespaces Isolation—What It is, What It Isn't, Life, Universe and Everything", SynActiv, 2021, 13 pages.
George et al., "Data anonymization and integrity checking in cloud computing", 2013 Fourth International Conference on Computing, Communications and Networking Technologies (ICCCNT), Jul. 2013, pp. 5.
Gholipour et al., "Recent Advances in Energy-Efficient Resource Management Techniques in Cloud Computing Environments", New Frontiers in Cloud Computing and Internet of Things, 2021, pp. 31-68.
Girola et al., "IBM Data Center Networking; Planning for Virtualization and Cloud Computing", Redbooks, May 9, 2011, 258 pages.
Google Cloud Platform Services Summary, Available online at: https://cloud.google.com/terms/services, Accessed from internet on Jan. 18, 2023, 25 pages.
Huey Patricia et al., "Oracle Database Security Guide", Nov. 2023, https://web.archive.org/web/20231121145008if_/https://docs.oracle.com/en/database/oracle/oracle-database/23/dbseg/database-security-guide.pdf, pp. 1327.
International Application No. PCT/US2023/074323, International Search Report and the Written Opinion, mailed on Nov. 22, 2023, 15 pages.
International Application No. PCT/US2023/074322, International Preliminary Report on Patentability mailed on Mar. 27, 2025, 9 pages.
International Application No. PCT/US2023/074322, International Search Report and Written Opinion, mailed on Nov. 22, 2023, 12 pages.
International Application No. PCT/US2023/074323, International Preliminary Report on Patentability mailed on Mar. 27, 2025, 10 pages.
International Application No. PCT/US2023/074325, International Preliminary Report on Patentability mailed on Mar. 27, 2025, 10 pages.
International Application No. PCT/US2023/074325, International Search Report and the Written Opinion, mailed on Nov. 22, 2023, 13 pages.
International Application No. PCT/US2023/074330, International Preliminary Report on Patentability mailed on Mar. 27, 2025, 10 pages.
International Application No. PCT/US2023/074330, International Search Report and the Written Opinion, mailed on Dec. 19, 2023, 14 pages.
International Application No. PCT/US2023/074341, International Preliminary Report on Patentability mailed on Mar. 27, 2025, 11 pages.
International Application No. PCT/US2023/074341, International Search Report and Written Opinion, mailed on Dec. 8, 2023, 15 pages.
International Application No. PCT/US2023/074342, International Preliminary Report on Patentability mailed on Mar. 27, 2025, 10 pages.
International Application No. PCT/US2023/074342, International Search Report and Written Opinion, mailed on Dec. 8, 2023, 13 pages.
International Application No. PCT/US2023/074343, International Preliminary Report on Patentability mailed on Mar. 27, 2025, 9 pages.
International Application No. PCT/US2023/074343, International Search Report and Written Opinion, mailed on Jan. 29, 2024, 13 pages.
International Application No. PCT/US2023/074344, International Preliminary Report on Patentability mailed on Mar. 27, 2025, 10 pages.
International Application No. PCT/US2023/074344, International Search Report and Written Opinion, mailed On Dec. 19, 2023, 13 pages.
International Application No. PCT/US2024/028744, International Search Report and Written Opinion mailed on Jul. 23, 2024, 16 pages.
International Application No. PCT/US2024/028767, "International Search Report and Written Opinion", mailed Sep. 10, 2024, 13 pages.
International Application No. PCT/US2024/028788, International Search Report and Written Opinion mailed on Jul. 23, 2024, 16 pages.
International Application No. PCT/US2024/029210, "International Search Report and Written Opinion", mailed Sep. 16, 2024, 12 pages.
International Application No. PCT/US2024/029417, "International Search Report and Written Opinion", mailed Sep. 16, 2024, 12 pages.
International Application No. PCT/US2024/030201, "International Search Report and Written Opinion", mailed Sep. 16, 2024, 12 pages.
International Application No. PCT/US2024/030208, "International Search Report and Written Opinion", mailed Sep. 16, 2024, 13 pages.
International Application No. PCT/US2024/030212, "International Search Report and Written Opinion", mailed Sep. 16, 2024, 12 pages.

(56) References Cited

OTHER PUBLICATIONS

Krichen et al., "Towards Optimizing the Placement of Security Testing Components for Internet of Things Architectures", 2019 Institute of Electrical and Electronics Engineers/ACS 16th International Conference on Computer Systems and Applications (AICCSA), 2019, 2 pages.
Ma et al., "ServiceRank: Root Cause Identification of Anomaly in Large-Scale Microservice Architectures", : IEEE Transactions on Dependable and Secure Computing, vol. 19, No. 5, Sep.-Oct. 2022, pp. 3087-3100.
Machine translation of CN 102656589 A, published on Sep. 5, 2012, 228 pages.
Machine translation of CN 104106276 A, published on Oct. 15, 2014, 347 pages.
Machine translation of CN 108197493 A, published on Jun. 22, 2018, 43 pages.

* cited by examiner

```
Type: ssh-rsa-cert-v01@openssh.com user certificate
Public key: RSA-CERT SHA256:xxxxxxxxxx
Signing CA: RSA RSA SHA256:yyyyyyyyyy (using rsa-sha2-512)
Key ID: "jsmith"
Serial: 9876543210
Valid: from 2024-05-20T18:30:00 to 2024-05-20T19:30:00
Principals:
        jsmith@hc_appserver-prod_sudo
        testuser1@hc_db-test_sudo
        account1@hc_db-prod_login
Critical Options: (none)
Extensions:
    permit-X11-forwarding
    permit-agent-forwarding
    permit-port-forwarding
    permit-pty
    permit-user-rc
```

SYSTEM AND METHOD FOR MANAGING SECURE SHELL PROTOCOL ACCESS IN CLOUD INFRASTRUCTURE ENVIRONMENTS

TECHNICAL FIELD

The present disclosure relates to systems and methods for use by tenants of a cloud infrastructure environment in accessing software products, services, or other offerings associated with the environment. In particular, the present disclosure relates to managing access to resources using a certificate that includes a target-specific principal.

BACKGROUND

A cloud computing environment can be used to provide access to a range of complementary cloud-based components, such as software applications or services, that enable organizations or enterprise customers to operate their applications and services in a highly available hosted environment.

The benefits to an organization in moving their application and service needs to a cloud environment include a reduction in the cost and complexity of designing, building, operating, and maintaining their own on-premise data center, software application framework, or other information technology infrastructure. Access to resources in a cloud environment may be restricted using a variety of mechanisms.

Secure Shell (SSH) is a cryptographic network protocol for operating network services securely over an unsecured network. Commonly, SSH is used for remote login and command execution, providing a secure channel over an unsecured network in a client-server architecture. The traditional method of authentication in SSH involves the use of password-based logins or public key authentication. In public key authentication, the SSH client creates a pair of keys, a private key that remains with the user and a public key that is shared with the SSH server. The server then uses this public key to challenge the client to prove ownership of the corresponding private key, thereby authenticating the user's access without transmitting the private key over the network.

SSH certificates introduce a more scalable and manageable approach to authentication, expanding upon the traditional public key method. Instead of directly managing individual public keys on every server, SSH certificates allow a centralized Certificate Authority (CA) to sign public keys. This signed public key, now an SSH certificate, can be used for authentication. The SSH server is configured to trust the CA; thus, any client presenting a certificate signed by the CA is granted access. This model simplifies key management, especially in environments with many servers and users. SSH certificates reduce the administrative overhead of updating public keys on individual servers when users are added or removed and enhance security by enabling features, such as certificate revocation and expiration.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 14 illustrates an example SSH certificate in accordance with one or more embodiments.

DETAILED DESCRIPTION

Figure 1:
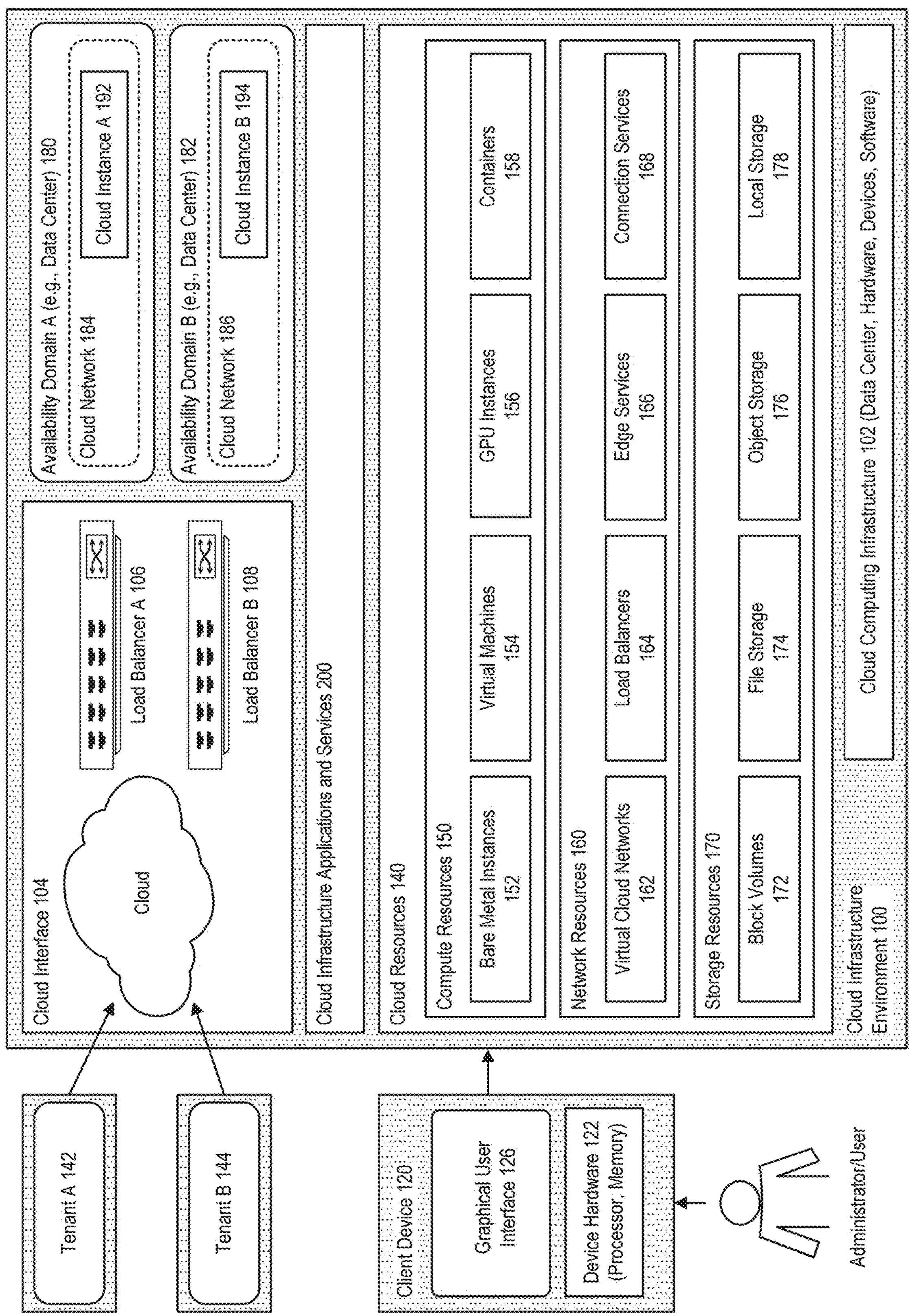
FIG. 1 illustrates a system for providing a cloud infrastructure environment in accordance with an embodiment.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CLOUD ENVIRONMENTS
3. ACCESS CONTROL ARCHITECTURE
4. CONTROLLING ACCESS WITH TARGET-SPECIFIC PRINCIPALS
5. USING TARGET-SPECIFIC PRINCIPALS WITH A CONNECTION AGENT
6. EXAMPLE EMBODIMENT-CERTIFICATE AUTHORITY
7. EXAMPLE EMBODIMENT-TARGET HOST
8. EXAMPLE EMBODIMENT-CONNECTION AGENT
9. PRACTICAL APPLICATIONS, ADVANTAGES & IMPROVEMENTS
10. MISCELLANEOUS; EXTENSIONS

1. General Overview

One or more embodiments use an SSH certificate that includes a target-specific principal to manage access to a resource. A certificate authority receives a certificate signing request from an operator device. The certificate signing request includes a user identifier associated with the operator device and a resource identifier associated with one or more target resources. The certificate authority forms a target-specific principal that includes the user identifier and the resource identifier. The certificate authority verifies, based on a set of access data, that the target-specific principal is entitled to access certain resources. In response to verifying this entitlement, the certificate authority generates a certificate that includes the target-specific principal. The certificate authority then transmits the certificate to the operator device.

One or more embodiments manage remote access requests at a target host. A target host receives a secure remote access request that is associated with an operator device. The request is accompanied by a certificate that has been signed by a trusted certificate authority. The certificate includes a target-specific principle that includes a user identifier and a resource identifier. The resource identifier in the target-specific principle corresponds to a set of one or more target resources that include the target host. The target host performs a validation to determine if the principle is authorized to access the target host. If the principal is authorized to access the target host, the target host grants the secure remote access request.

One or more embodiments facilitate the creation of secure connections using a connection agent. A connection agent receives a command from an operator device to initiate a secure remote access connection with a target host. The connection agent transmits a certificate signing request to a certificate authority on behalf of the operator device. The certificate signing request includes a user identifier, a public key associated with the operator device, and a resource identifier associated with one or more target hosts. The connection agent receives a certificate from the certificate authority that is signed by the certificate authority using a public key associated with the certificate authority. The certificate includes the operator device public key and a target-specific principle that includes the user identifier and the resource identifier. The connection agent uses this certificate to initiate a secure remote access connection to the target host on behalf of the operator device.

One or more embodiments described in this Specification and/or recited in the claims may not be included in this General Overview section.

2. Cloud Environments

One or more embodiments provide features associated with dedicated or private label cloud (PLC) environments for use by tenants of a cloud infrastructure environment in accessing software products, services, or other offerings associated with the environment.

A cloud computing or cloud infrastructure environment can be used to provide access to a range of complementary cloud-based components, such as software applications or services, that enable organizations or enterprise customers to operate their applications and services in a highly available hosted environment.

The benefits to an organization in moving their application and service needs to a cloud infrastructure environment include a reduction in the cost and complexity of designing, building, operating, and maintaining their own on-premise data center, software application framework, or other information technology infrastructure.

Cloud Infrastructure Environments

Figure 2:
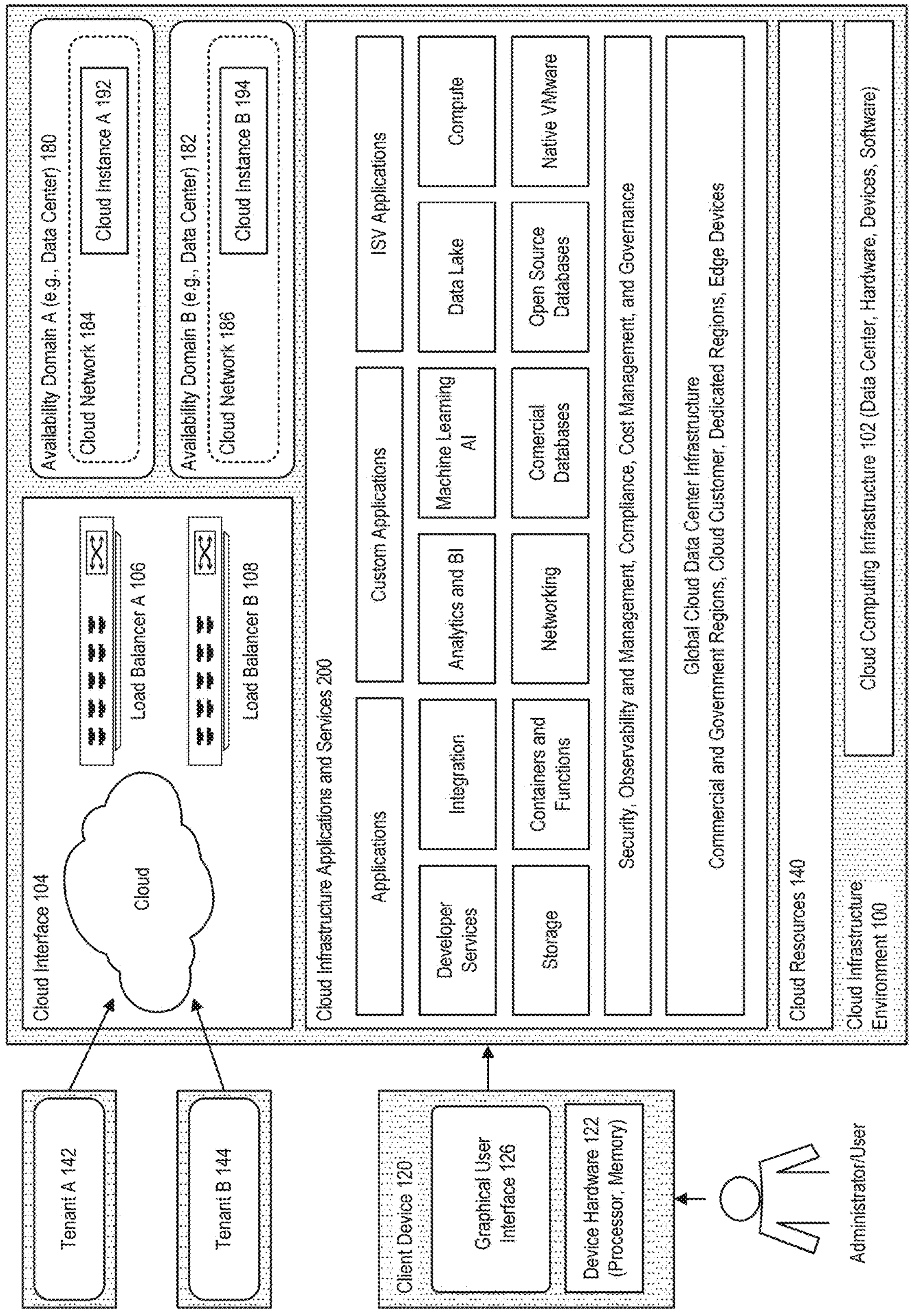
FIG. 2 further illustrates how a cloud infrastructure environment can be used to provide cloud-based applications or services or services in accordance with an embodiment.

FIGS. 1 and 2 illustrate a system for providing a cloud infrastructure environment in accordance with an embodiment.

In accordance with an embodiment, the components and processes illustrated in FIG. 1, and as further described herein regarding various embodiments, can be provided as software or program code executable by a computer system or other type of processing device, for example, a cloud computing system.

The illustrated example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

As illustrated in FIG. 1, in accordance with an embodiment, a cloud infrastructure environment 100 can operate on a cloud computing infrastructure 102 comprising hardware (e.g., processor, memory), software resources, and one or more cloud interfaces 104 or other application program interfaces (API) that provide access to the shared cloud resources via one or more load balancers A 106, B 108. Cloud interface 102 includes user interfaces and APIs provided by a cloud services provider for interacting with its cloud services. This includes tools and platforms that allow users and administrators to manage, configure, and monitor cloud resources and services. Cloud interface 102 may include a console, such as a web-based user interface that provides a visual way to interact with and manage cloud resources. Through the console, users may, for example, create, configure, and monitor cloud services like compute instances, databases, storage, and networking components. Cloud interface 102 may also include a command line interface for users who prefer to work with the cloud infrastructure using command-line tools. The CLI allows for scripting and automation of cloud management tasks in an embodiment.

In accordance with an embodiment, load balancer A 106 and load balancer B 108 are services that distribute incoming network traffic across multiple servers, instances, or other resources to ensure that no single resource bears too much demand. By spreading the requests evenly across the resources, load balancers enhance the responsiveness and availability of resources such as applications, websites, or databases. Load balancer A 106 and load balancer B 108 may be either public load balancers that are accessible from the Internet and used for distributing external traffic, or private load balancers that are used within a virtual cloud network (VCN) and are not accessible from the public Internet (and are therefore ideal for internal traffic distribution). In an embodiment, load balancer A 106 and load balancer B 108 are designed for high availability and fault tolerance and are implemented in a redundant configuration across multiple availability domains or fault domains.

In accordance with an embodiment, the cloud infrastructure environment supports the use of availability domains, such as availability domain A 180 and availability domain B 182, that enable customers to create and access cloud networks 184, 186, and run cloud instances A 192, B 194. In an embodiment, availability A 180 and availability domain B 182 may represent a data center, or a set of data centers located within a region. These availability domains may be isolated from each other, meaning that they may not share the same physical infrastructure such as power or cooling systems. This design provides a high degree of failure independence and robustness. In an embodiment, a fault domain may provide additional protection and resiliency within a single availability domain by grouping hardware and infrastructure within an availability domain that is isolated from other fault domains. This isolation may be in terms of electricity, cooling, and other potential sources of failure.

In accordance with an embodiment, a tenancy (a container for resources used by a tenant) can be created for each cloud tenant/customer, for example, tenant A 142, B 144, that provides a secure and isolated partition within the cloud infrastructure environment where the customer can create, organize, and administer their cloud resources. A cloud tenant/customer can access an availability domain and a cloud network to access each of their cloud instances. A tenancy in is isolated from other tenancies, ensuring that each customer's data and resources are secure and inaccessible to others. Within a tenancy, customers can create, manage, and organize a wide range of cloud resources, including compute instances, storage volumes, and networks. In Identity and Access Management (IAM) service enables the management of users, groups, and policies within a tenancy. Through IAM, customers can control who has access to their resources and what actions they can perform. The tenancy is also the level where billing and subscription management are handled. Usage and costs associated with the resources within a tenancy are tracked and billed collectively under that tenancy. Each tenancy may be associated with specific service limits and quotas for various resources. These limits may be used to help manage capacity and facilitate resource distribution across each tenant.

In accordance with an embodiment, a computing device, such as a client device 120 having a device hardware 122 (e.g., processor, memory) and graphical user interface 126, can enable an administrator or other user to communicate with the cloud infrastructure environment via a network, such as a wide area network, a local area network, or the Internet, to create or update cloud services.

In accordance with an embodiment, the cloud infrastructure environment provides access to shared cloud resources 140 via, for example, a compute resources layer 150, a network resources layer 160, and/or a storage resources layer 170. Customers can launch cloud instances as needed to meet compute and application requirements. After a customer provisions and launches a cloud instance, the provisioned cloud instance can be accessed from a client device such as client device 120.

In accordance with an embodiment, compute resources 150 can comprise resources, such as bare metal cloud instances 152, virtual machines 154, graphical processing unit (GPU) compute cloud instances 156, and/or containers 158. A bare metal instance represents a physical server with dedicated hardware that is fully allocated to a single tenant. A bare metal instance provides direct access to the server's processor, memory, storage, and other hardware resources. A virtual machine (VM) is a software emulation of a physical computer that runs an operating system and applications like a physical computer. VMs allow multiple operating systems to run on a single physical machine or across multiple machines. A hypervisor layer resides between the hardware and the virtual machines, allocating physical resources (like CPU, memory, and storage) to each VM. In an embodiment, GPU compute cloud instances provide GPUs along with traditional CPU resources. These instances are designed for tasks that require significant parallel processing power, making them ideal for applications like machine learning, scientific computing, 3D rendering, and video processing. In an embodiment, Containers 158 use a method of virtualization that allows for the running of multiple isolated applications on a single control host, virtualizing the operating system. Each container shares the host system's kernel but runs in an isolated user space, making containers lightweight and efficient.

The components of the compute resources 150 can be used to provision and manage bare metal compute cloud instances or provision cloud instances as needed to deploy and run applications, as in an on-premises data center. For example, in accordance with an embodiment, the cloud infrastructure environment can provide control of physical host (bare metal) machines within the compute resources layer that run as compute cloud instances directly on bare metal servers without a hypervisor.

In accordance with an embodiment, the cloud infrastructure environment can also provide control of virtual machines within the compute resources layer that can be launched, for example, from an image, wherein the types and quantities of resources available to a virtual machine cloud instance can be determined, for example, based upon the image that the virtual machine was launched from.

In accordance with an embodiment, the network resources layer can comprise several network-related resources, such as virtual cloud networks (VCNs) 162, load balancers 164, edge services 166, and/or connection services 168. In an embodiment, a virtual cloud network (VCN) is a customizable and private network in a cloud environment. A VCN provides a virtual version of a traditional network, including subnets, route tables, and gateways. It allows users to set up their cloud-based network architecture according to their requirements. In an embodiment, edge services 166 include services and technologies designed to bring computation, data storage, and networking capabilities closer to the location where they are needed. Edge services 166 may be used to optimize traffic, reduce latency, or provide other advantages.

In accordance with an embodiment, the storage resources layer can comprise several resources, such as data/block volumes 172, file storage 174, object storage 176, and/or local storage 178. Data/block volumes 172 provide unformatted block-level storage that can be used to create file systems that host databases or for other purposes requiring unformatted storage. File storage 174 provides a file system in an embodiment and may offer shared file systems that multiple instances can access concurrently using standard file storage protocols. Object storage 176 manages data as objects within storage buckets. Objects have certain attributes that may include data, metadata, and a unique identifier. Local storage 178 refers to storage devices that are physically attached to the host computer.

As illustrated in FIG. 2, in accordance with an embodiment, the cloud infrastructure environment can include a range of complementary cloud-based components, such as cloud infrastructure applications and services 200, that enable organizations or enterprise customers to operate their applications and services in a highly available hosted environment.

In accordance with an embodiment, a self-contained cloud region can be provided as a complete, e.g., Oracle Cloud Infrastructure (OCI), dedicated region within an organization's data center that offers the data center operator the agility, scalability, and economics of an e.g., OCI public cloud, while retaining full control of their data and applications to meet security, regulatory, or data residency requirements.

For example, in accordance with an embodiment, such an environment can include racks physically and logically managed by a cloud infrastructure provider (e.g., Oracle), customer's racks, access for cloud operations personnel for setup and hardware support, customer's data center power and cooling, customer's floor space, an area for customer's data center personnel, and a physical access cage.

In accordance with an embodiment, a dedicated region offers to a tenant/customer the same set of infrastructure-as-a-service (IaaS), platform-as-a-service (PaaS), and software-as-a-service (SaaS) products or services available in the cloud infrastructure provider's (e.g., Oracle's) public cloud regions, for example, ERP, Financials, HCM, and SCM. A customer can seamlessly lift and shift legacy workloads using the cloud infrastructure provider's services (e.g., bare metal compute, VMs, and GPUs), database services (e.g., Oracle Autonomous Database), or container-based services (e.g., Oracle Container Engine for Kubernetes).

In accordance with an embodiment, a cloud infrastructure environment can operate according to an infrastructure-as-a-service (IaaS) model that enables the environment to provide virtualized computing resources over a public network (e.g., the Internet)

In an IaaS model, a cloud infrastructure provider can host the infrastructure components (e.g., servers, storage devices, network nodes (e.g., hardware), deployment software, platform virtualization (e.g., a hypervisor layer), or the like). In some cases, a cloud infrastructure provider may also supply a variety of services to accompany those infrastructure components; example services include billing software, monitoring software, logging software, load balancing software, or clustering software. Thus, as these services may be policy-driven, IaaS users may be able to implement policies to drive load balancing to maintain application availability and performance.

In accordance with an embodiment, IaaS customers may access resources and services through a wide area network (WAN), such as the Internet, and can use the cloud infrastructure provider's services to install the remaining elements of an application stack. For example, the user can log in to the IaaS platform to create virtual machines (VMs), install operating systems (OSs) on each VM, deploy middleware such as databases, create storage buckets for workloads and backups, and install enterprise software into that VM. Customers can then use the provider's services to perform various functions, including balancing network traffic, troubleshooting application issues, monitoring performance, or managing disaster recovery.

In accordance with an embodiment, a cloud infrastructure provider may, but need not, be a third-party service that specializes in providing (e.g., offering, renting, selling) IaaS. An entity might also opt to deploy a private cloud, becoming its own provider of infrastructure services.

In accordance with an embodiment, IaaS deployment is the process of putting a new application, or a new version of an application, onto a prepared application server or the like. It may also include the process of preparing the server (e.g., installing libraries or daemons). This is often managed by the cloud infrastructure provider below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like).

In accordance with an embodiment, IaaS provisioning may refer to acquiring computers or virtual hosts for use and installing needed libraries or services on them. In most cases, deployment does not include provisioning, and the provisioning may need to be performed first.

In accordance with an embodiment, challenges for IaaS provisioning include the initial challenge of provisioning the initial set of infrastructure before anything is running. Second, there is the challenge of evolving the existing infrastructure (e.g., adding new services, changing services, or removing services) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on others, and how they each work together) can be described declaratively. In some instances, once the topology is defined, a workflow can be generated that creates and/or manages the different components described in the configuration files.

In accordance with an embodiment, a cloud infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up for one or more virtual machines (VMs). Other infrastructure elements may also be provisioned, such as a load balancer, a database, or the like. As more infrastructure elements are desired and/or added, the infrastructure may incrementally evolve.

In accordance with an embodiment, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various geographic locations). However, in some examples, the infrastructure where the code will be deployed requires provisioning. In some instances, the provisioning can be done manually, a provisioning tool may be utilized to provision the resources, and/or deployment tools may be utilized to deploy the code once the infrastructure is provisioned.

Figure 3:
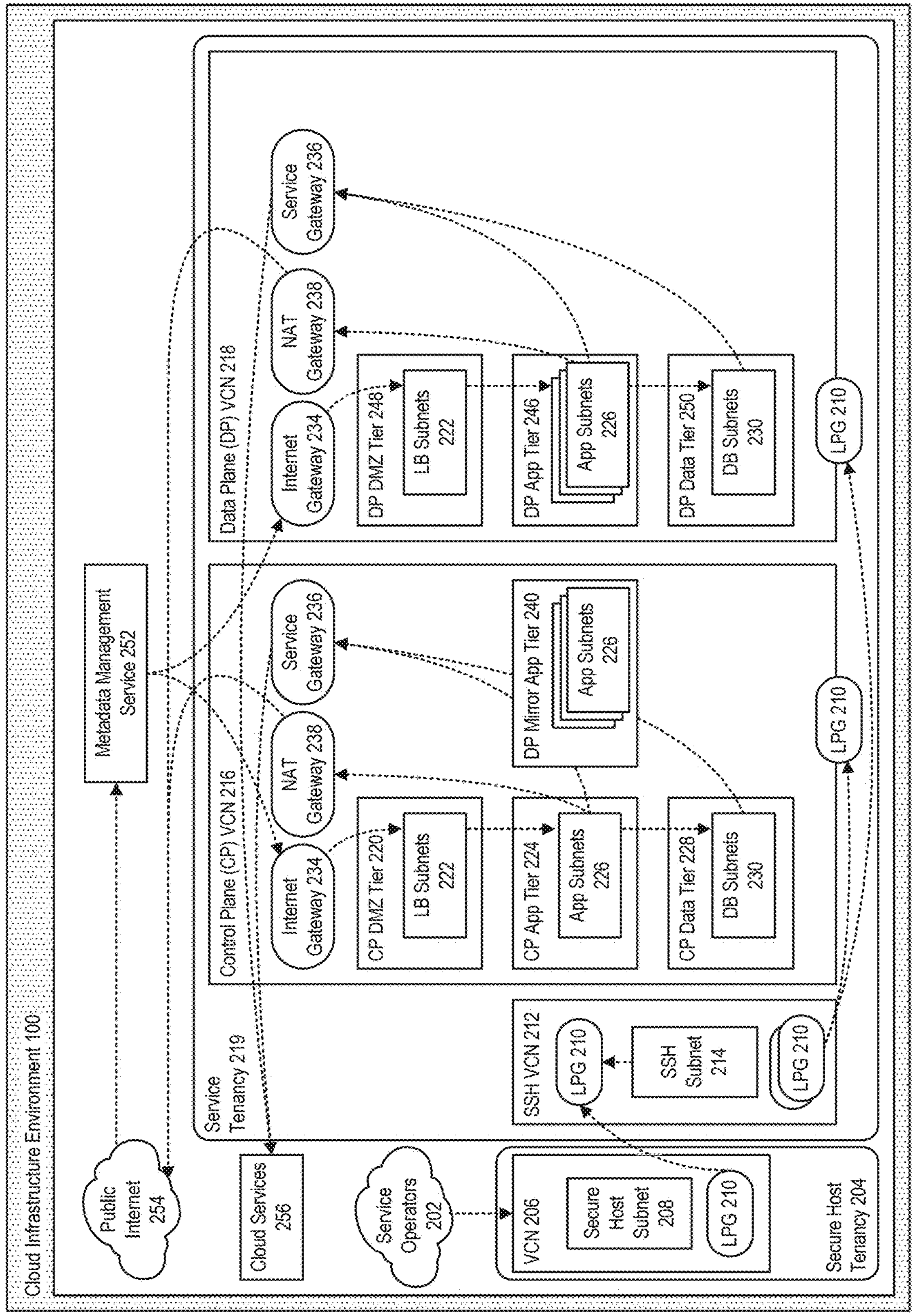
FIG. 3 illustrates an example cloud infrastructure architecture in accordance with an embodiment.

FIG. 3 illustrates an example cloud infrastructure architecture in accordance with an embodiment.

As illustrated in FIG. 3, in accordance with an embodiment, service operators 202 can be communicatively coupled to a secure host tenancy 204 that can include a virtual cloud network (VCN) 206 and a secure host subnet 208.

In some examples, the service operators may be using one or more client computing devices that may be portable handheld devices (e.g., a telephone, a computing tablet, a personal digital assistant (PDA)) or wearable devices (e.g., a head mounted display), running software such as Microsoft Windows, and/or a variety of mobile operating systems, such as IOS, Android, and the like, and being Internet, e-mail, short message service (SMS), or other communication protocol enabled. Alternatively, the client computing devices can be general purpose personal computers including, for example, personal computers and/or laptop computers running various versions of Microsoft Windows®, Apple Macintosh®, and/or Linux operating systems. The client computing devices can be workstation computers running any of a variety of commercially available UNIX® or UNIX-like operating systems, including without limitation the variety of GNU/Linux operating systems such as Chrome OS. Additionally, or alternatively, client computing devices may be any other electronic device, such as a thin-client computer, an Internet-enabled gaming system (e.g., a Microsoft Xbox gaming console), and/or a personal messaging device, capable of communicating over a network that can access the VCN and/or the Internet.

In accordance with an embodiment, a VCN can include a local peering gateway (LPG) 210 that can be communicatively coupled to a secure shell (SSH) VCN 212 via an LPG contained in the SSH VCN. The SSH VCN can include an SSH subnet 214, and the SSH VCN can be communicatively coupled to a control plane VCN 216 via the LPG contained in the control plane VCN. Also, the SSH VCN can be communicatively coupled to a data plane VCN 218 via an LPG. The control plane VCN and the data plane VCN can be contained in a service tenancy 219 that can be owned and/or operated by the cloud infrastructure provider.

In accordance with an embodiment, a control plane VCN can include a control plane demilitarized zone (DMZ) tier 220 that acts as a perimeter network (e.g., portions of a corporate network between the corporate intranet and external networks). The DMZ-based servers may have restricted responsibilities that help contain potential breaches. Additionally, the DMZ tier can include one or more load balancer (LB) subnets 222, a control plane app tier 224 that can include app subnets 226, and a control plane data tier 228 that can include database (DB) subnets 230 (e.g., frontend DB subnet(s) and/or backend DB subnet(s)). The LB subnet(s) contained in the control plane DMZ tier can be communicatively coupled to the app subnet(s) contained in the control plane app tier and to an Internet gateway 234 that can be contained in the control plane VCN. The app subnet(s) can be communicatively coupled to the DB subnet(s) contained in the control plane data tier, a service gateway 236, and a network address translation (NAT) gateway 238. The control plane VCN can include the service gateway and the NAT gateway.

In accordance with an embodiment, the control plane VCN can include a data plane mirror app tier 240 that can include app subnet(s). The app subnet(s) contained in the data plane mirror app tier can include a virtual network interface controller (VNIC) that can execute a compute instance. The compute instance can communicatively couple the app subnet(s) of the data plane mirror app tier to app subnet(s) that can be contained in a data plane app tier.

In accordance with an embodiment, the data plane VCN can include the data plane app tier, a data plane DMZ tier, and a data plane data tier. The data plane DMZ tier can include LB subnet(s) that can be communicatively coupled to the app subnet(s) of the data plane app tier and the Internet gateway of the data plane VCN. The app subnet(s) can be communicatively coupled to the service gateway of the data plane VCN and the NAT gateway of the data plane VCN. The data plane data tier can also include the DB subnet(s) that can be communicatively coupled to the app subnet(s) of the data plane app tier.

In accordance with an embodiment, the Internet gateway of the control plane VCN and of the data plane VCN can be communicatively coupled to a metadata management service 252 that can be communicatively coupled to the public Internet 254. The public Internet can be communicatively coupled to the NAT gateway of the control plane VCN and of the data plane VCN. The service gateway of the control plane VCN and of the data plane VCN can be communicatively coupled to cloud services 256.

In accordance with an embodiment, the service gateway of the control plane VCN, or of the data plane VCN, can make application programming interface (API) calls to cloud services without going through the public Internet. The API calls to cloud services from the service gateway can be one-way; the service gateway can make API calls to cloud services, and cloud services can send requested data to the service gateway. Generally, cloud services may not initiate API calls to the service gateway.

In accordance with an embodiment, the secure host tenancy can be directly connected to the service tenancy that may be otherwise isolated. The secure host subnet can communicate with the SSH subnet through an LPG that may enable two-way communication over an otherwise isolated system. Connecting the secure host subnet to the SSH subnet may give the secure host subnet access to other entities within the service tenancy.

In accordance with an embodiment, the control plane VCN may allow users of the service tenancy to set up or otherwise provision desired resources. Desired resources provisioned in the control plane VCN may be deployed or otherwise used in the data plane VCN. In some examples, the control plane VCN can be isolated from the data plane VCN, and the data plane mirror app tier of the control plane VCN can communicate with the data plane app tier of the data plane VCN via VNICs that can be contained in the data plane mirror app tier and the data plane app tier.

In accordance with an embodiment, users of the system, or customers, can make requests, for example, create, read, update, or delete (CRUD) operations through the public Internet that can communicate the requests to the metadata management service. The metadata management service can communicate the request to the control plane VCN through the Internet gateway. The request can be received by the LB subnet(s) contained in the control plane DMZ tier. The LB subnet(s) may determine that the request is valid, and in response to this determination, the LB subnet(s) can transmit the request to app subnet(s) contained in the control plane app tier. If the request is validated and requires a call to the public Internet, the call to the Internet may be transmitted to the NAT gateway that can make the call to the Internet. Metadata to be stored by the request can be stored in the DB subnet(s).

In accordance with an embodiment, the data plane mirror app tier can facilitate direct communication between the control plane VCN and the data plane VCN. For example, changes, updates, or other suitable modifications to configuration may be desired to be applied to the resources contained in the data plane VCN. By means of a VNIC, the control plane VCN can directly communicate with, and can thereby execute the changes, updates, or other suitable modifications to configuration to, resources contained in the data plane VCN.

In accordance with an embodiment, the control plane VCN and the data plane VCN can be contained in the service tenancy. In this case, the user, or the customer, of the system may not own or operate either the control plane VCN or the data plane VCN. Instead, the cloud infrastructure provider may own or operate the control plane VCN and the data plane VCN, both that may be contained in the service tenancy. This embodiment can enable isolation of networks that may prevent users or customers from interacting with the resources of other users or other customers. Also, this embodiment may allow users or customers of the system to store databases privately without needing to rely on the public Internet for storage that may not provide a desired level of threat prevention.

In accordance with an embodiment, the LB subnet(s) contained in the control plane VCN can be configured to receive a signal from the service gateway. In this embodiment, the control plane VCN and the data plane VCN may be configured to be called by a customer of the cloud infrastructure provider without calling the public Internet. Customers of the cloud infrastructure provider may desire this embodiment since the database(s) that the customers use may be controlled by the cloud infrastructure provider and may be stored on the service tenancy that may be isolated from the public Internet.

Figure 4:
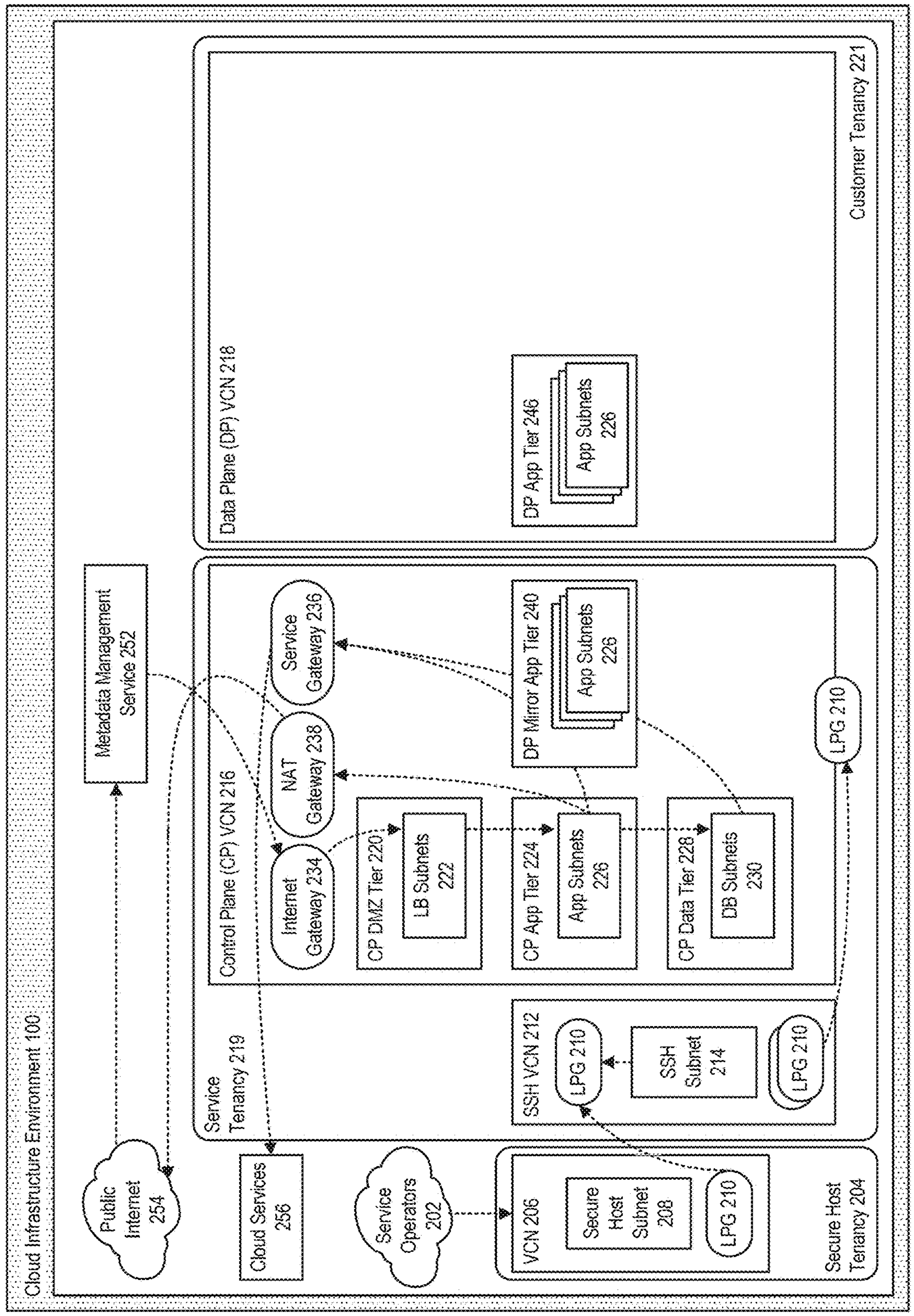
FIG. 4 illustrates another example of a cloud infrastructure architecture in accordance with an embodiment.

FIG. 4 illustrates another example of a cloud infrastructure architecture in accordance with an embodiment.

As illustrated in FIG. 4, in accordance with an embodiment, the data plane VCN can be contained in the customer tenancy 221. In this case, the cloud infrastructure provider may provide the control plane VCN for each customer, and the cloud infrastructure provider may, for each customer, set up a unique compute instance that is contained in the service tenancy. Each compute instance may allow communication between the control plane VCN, contained in the service tenancy, and the data plane VCN that is contained in the customer tenancy. The compute instance may allow resources provisioned in the control plane VCN contained in the service tenancy to be deployed or otherwise used in the data plane VCN contained in the customer tenancy.

In accordance with an embodiment, a customer of the cloud infrastructure provider may have databases that are managed and operated within the customer tenancy. In this example, the control plane VCN can include the data plane mirror app tier that can include app subnet(s). The data plane mirror app tier can reside in the data plane VCN, but the data plane mirror app tier may not be provided in the data plane VCN. That is, the data plane mirror app tier may have access to the customer tenancy, but the data plane mirror app tier may not exist in the data plane VCN or be owned or operated by the customer. The data plane mirror app tier may be configured to make calls to the data plane VCN, but the data plane mirror app tier may not be configured to make calls to any entity contained in the control plane VCN. The customer may desire to deploy or otherwise use resources in the data plane VCN that are provisioned in the control plane VCN, and the data plane mirror app tier can facilitate the desired deployment, or other usage of resources, by the customer.

In accordance with an embodiment, a customer of the cloud infrastructure provider can apply filters to the data plane VCN. In this embodiment, the customer can determine what the data plane VCN can access, and the customer may restrict access to the public Internet from the data plane VCN. The cloud infrastructure provider may not be able to apply filters or otherwise control access of the data plane VCN to any outside networks or databases. Applying filters and controls by the customer onto the data plane VCN, contained in the customer tenancy, can help isolate the data plane VCN from other customers and from the public Internet.

In accordance with an embodiment, cloud services can be called by the service gateway to access services that may not exist on the public Internet, on the control plane VCN, or on the data plane VCN. The connection between cloud services and the control plane VCN or the data plane VCN may not be continuous. Cloud services may exist on a different network owned or operated by the cloud infrastructure provider. Cloud services may be configured to receive calls from the service gateway and may be configured to not receive calls from the public Internet. Some cloud services may be isolated from other cloud services, and the control plane VCN may be isolated from cloud services that may not be in the same region as the control plane VCN.

For example, in accordance with an embodiment, the control plane VCN may be located in a "Region 1," and a cloud service "Deployment 1," may be located in Region 1 and in "Region 2." If a call to Deployment 1 is made by the service gateway contained in the control plane VCN located in Region 1, the call may be transmitted to Deployment 1 in Region 1. In this example, the control plane VCN, or Deployment 1 in Region 1, may not be communicatively coupled to, or otherwise in communication with, Deployment 1 in Region 2.

Figure 5:
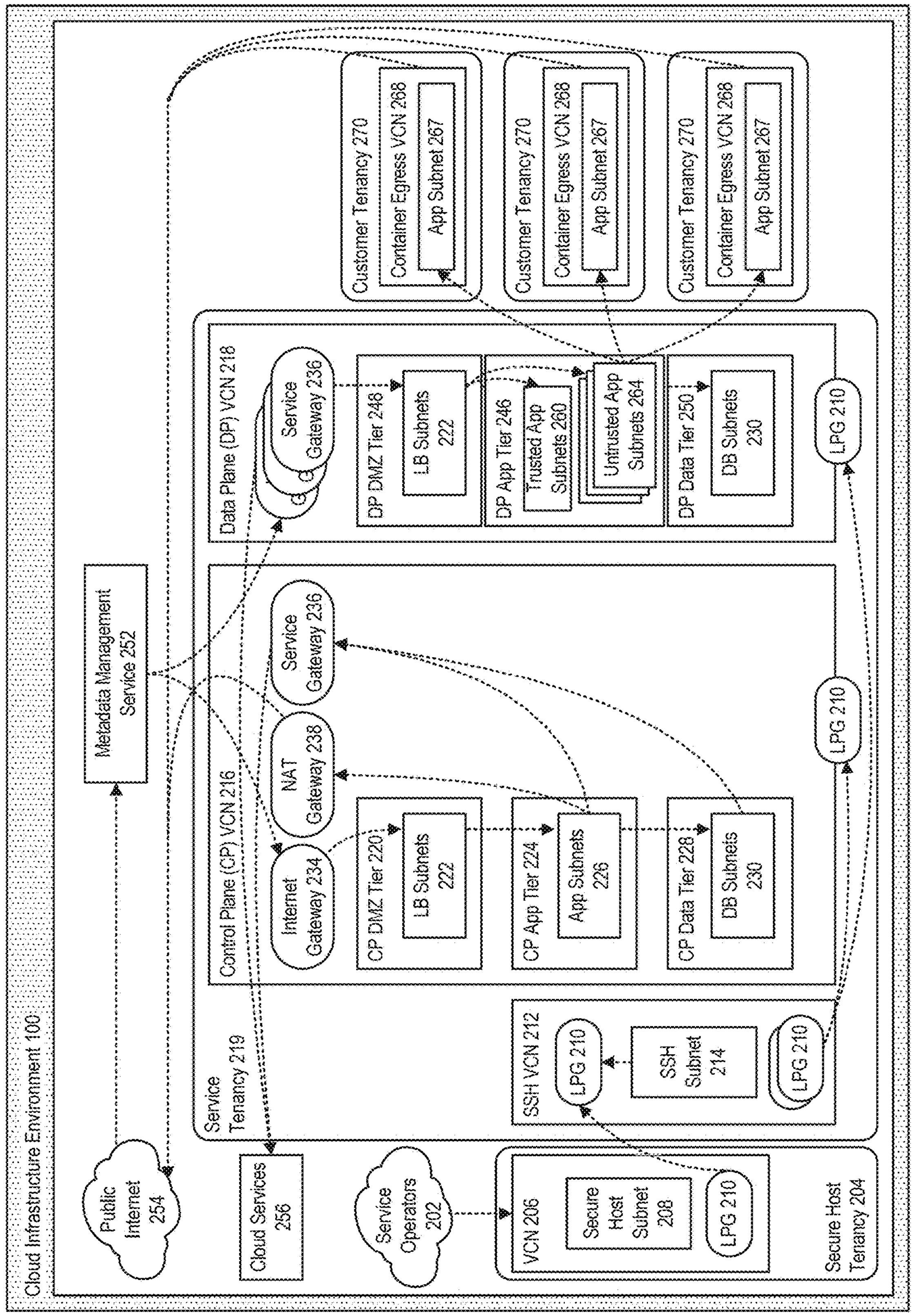
FIG. 5 illustrates another example of a cloud infrastructure architecture in accordance with an embodiment.

FIG. 5 illustrates another example of a cloud infrastructure architecture in accordance with an embodiment.

As illustrated in FIG. 5, in accordance with an embodiment, the trusted app subnets 260 can be communicatively coupled to the service gateway contained in the data plane VCN, the NAT gateway contained in the data plane VCN, and DB subnet(s) contained in the data plane data tier. The untrusted app subnets 264 can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include one or more primary VNICs (1)-(N) that can be communicatively coupled to tenant virtual machines (VMs). Each tenant VM can be communicatively coupled to a respective app subnet 267 (1)-(N) that can be contained in respective container egress VCNs 268 (1)-(N) that can be contained in respective customer tenancies 270 (1)-(N). Respective secondary VNICs can facilitate communication between the untrusted app subnet(s) contained in the data plane VCN and the app subnet contained in the container egress VCN. Each container egress VCN can include a NAT gateway that can be communicatively coupled to the public Internet.

In accordance with an embodiment, the public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the data plane VCN can be integrated with customer tenancies. This integration can be useful or desirable for customers of the cloud infrastructure provider in cases that may require additional support when executing code. For example, the customer may provide code to run that may be potentially destructive, may communicate with other customer resources, or may otherwise cause undesirable effects.

In accordance with an embodiment, a customer of the cloud infrastructure provider may grant temporary network access to the cloud infrastructure provider and request a function to be attached to the data plane app tier. Code to run the function may be executed in the VMs and may not be configured to run anywhere else on the data plane VCN. Each VM may be connected to one customer tenancy. Respective containers (1)-(N) contained in the VMs may be configured to run the code. In this case, there can be a dual isolation (e.g., the containers running code, where the containers may be contained in at least the VM that are contained in the untrusted app subnet(s)) that may help prevent incorrect or otherwise undesirable code from damaging the network of the cloud infrastructure provider or from damaging a network of a different customer. The containers may be communicatively coupled to the customer tenancy and may be configured to transmit or receive data from the customer tenancy. The containers may not be configured to transmit or receive data from any other entity in the data plane VCN. Upon completion of running the code, the cloud infrastructure provider may dispose of the containers.

In accordance with an embodiment, the trusted app subnet(s) may run code that may be owned or operated by the cloud infrastructure provider. In this embodiment, the trusted app subnet(s) may be communicatively coupled to the DB subnet(s) and be configured to execute CRUD operations in the DB subnet(s). The untrusted app subnet(s) may be communicatively coupled to the DB subnet(s) and configured to execute read operations in the DB subnet(s). The containers that can be contained in the VM of each customer and that may run code from the customer may not be communicatively coupled with the DB subnet(s).

In accordance with an embodiment, the control plane VCN and the data plane VCN may not be directly communicatively coupled, or there may be no direct communication between the control plane VCN and the data plane VCN. However, communication can occur indirectly, wherein an LPG may be established by the cloud infrastructure provider that can facilitate communication between the control plane VCN and the data plane VCN. In another example, the control plane VCN or the data plane VCN can make a call to cloud services via the service gateway. For example, a call to cloud services from the control plane VCN can include a request for a service that can communicate with the data plane VCN.

Figure 6:
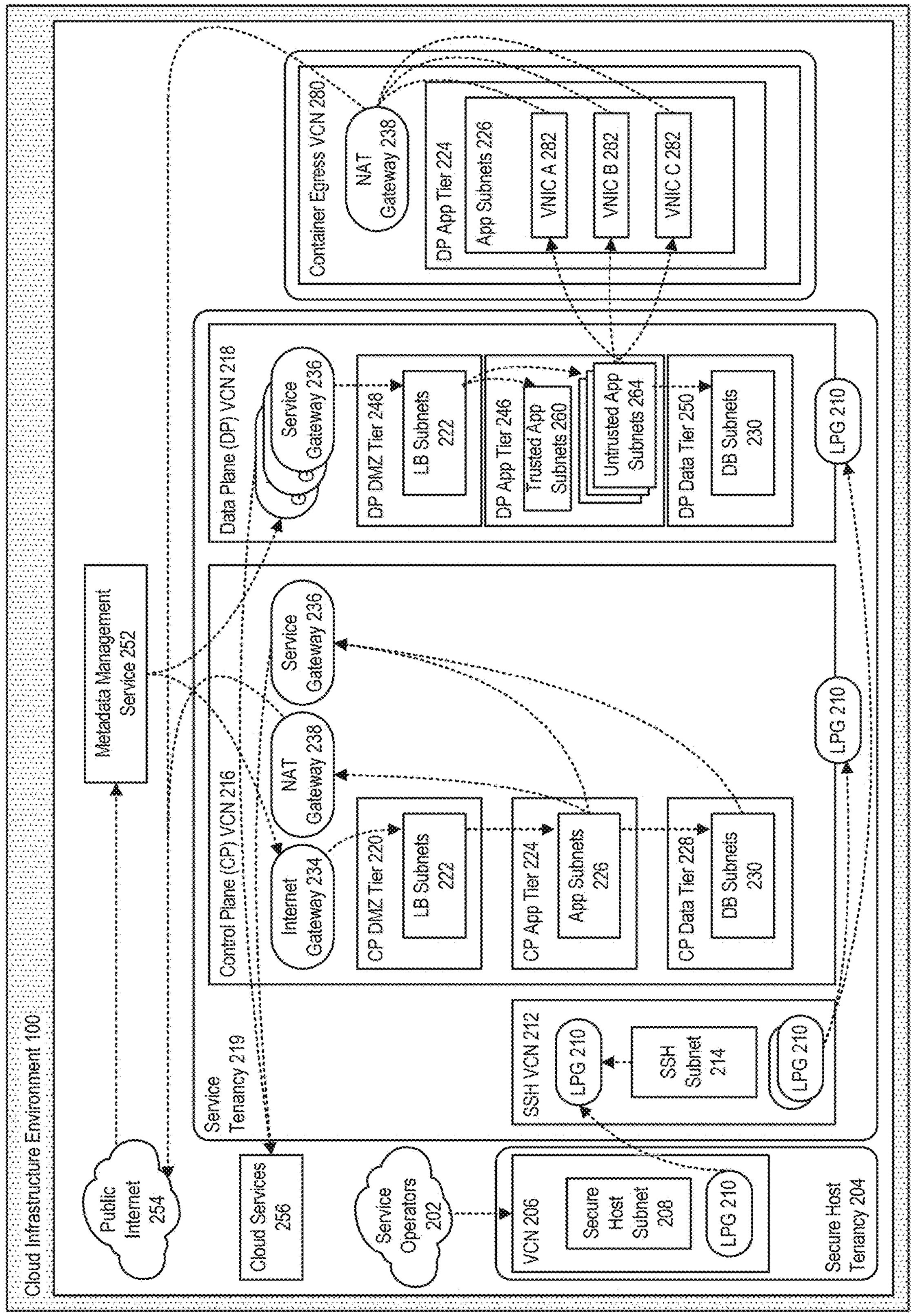
FIG. 6 illustrates another example of a cloud infrastructure architecture in accordance with an embodiment.

FIG. 6 illustrates another example of a cloud infrastructure architecture in accordance with an embodiment.

As illustrated in FIG. 6, in accordance with an embodiment, the trusted app subnet(s) can be communicatively coupled to the service gateway contained in the data plane VCN, the NAT gateway contained in the data plane VCN, and DB subnet(s) contained in the data plane data tier. The untrusted app subnet(s) can be communicatively coupled to the service gateway contained in the data plane VCN and DB subnet(s) contained in the data plane data tier. The data plane data tier can include DB subnet(s) that can be communicatively coupled to the service gateway contained in the data plane VCN.

In accordance with an embodiment, untrusted app subnet(s) can include primary VNICs that can be communicatively coupled to tenant virtual machines (VMs) residing within the untrusted app subnet(s). Each tenant VM can run code in a respective container and be communicatively coupled to an app subnet that can be contained in a data plane app tier that can be contained in a container egress VCN 280. Respective secondary VNICs 282 (1)-(N) can facilitate communication between the untrusted app subnet (s) contained in the data plane VCN and the app subnet contained in the container egress VCN. The container egress VCN can include a NAT gateway that can be communicatively coupled to the public Internet.

In accordance with an embodiment, the Internet gateway contained in the control plane VCN and contained in the data plane VCN can be communicatively coupled to a metadata management service that can be communicatively coupled to the public Internet. The public Internet can be communicatively coupled to the NAT gateway contained in the control plane VCN and contained in the data plane VCN. The service gateway contained in the control plane VCN and contained in the data plane VCN can be communicatively coupled to cloud services.

In accordance with an embodiment, the pattern illustrated in FIG. 6 may be considered an exception to the pattern illustrated in FIG. 5 and may be desirable for a customer if the cloud infrastructure provider cannot directly communicate with the customer (e.g., a disconnected region). The respective containers that are contained in the VMs for each customer can be accessed in real-time by the customer. The containers may be configured to make calls to respective secondary VNICs contained in app subnet(s) of the data plane app tier that can be contained in the container egress VCN. The secondary VNICs can transmit the calls to the NAT gateway that may transmit the calls to the public Internet. In this example, the containers that can be accessed in real-time by the customer can be isolated from the control plane VCN and can be isolated from other entities contained in the data plane VCN. The containers may also be isolated from resources from other customers.

In other examples, the customer can use the containers to call cloud services. In this example, the customer may run code in the containers that request a service from cloud services. The containers can transmit this request to the secondary VNICs that can transmit the request to the NAT gateway that can transmit the request to the public Internet. The public Internet can be used to transmit the request to LB subnet(s) contained in the control plane VCN via the Internet gateway. In response to determining that the request is valid, the LB subnet(s) can transmit the request to app subnet(s) that can transmit the request to cloud services via the service gateway.

It should be appreciated that IaaS architectures depicted in the above figures may have other components than those depicted. Further, the embodiments shown in the figures are some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner.

Private Label Cloud Environments

In accordance with an embodiment, a cloud infrastructure environment can be used to provide dedicated cloud environments, for example, as one or more private label cloud environments for use by tenants of the cloud infrastructure environment in accessing subscription-based software products, services, or other offerings associated with the cloud infrastructure environment.

Figure 7:
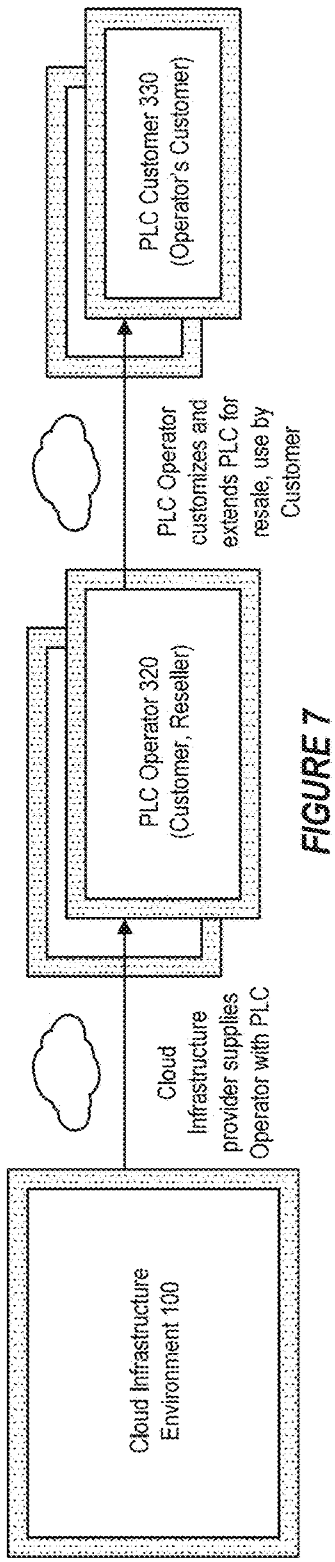
FIG. 7 illustrates how the system can provide dedicated or private label cloud environments for use by tenants or customers of a cloud infrastructure environment in accordance with an embodiment.

FIG. 7 illustrates how the system can provide dedicated or private label cloud environments for use by tenants or customers of a cloud infrastructure environment in accordance with an embodiment.

As illustrated in FIG. 7, in accordance with an embodiment, a cloud infrastructure provider (e.g., OCI) can supply a PLC operator 320, for example an OCI customer operating as a reseller, with one or more private label cloud (PLC) environments. The PLC operator/reseller can then customize and extend the private label cloud for use by (their) customer 330 for use in accessing subscription-based software products, services, or other offerings associated with the cloud infrastructure environment.

For purposes of illustration, examples of such subscription-based products, services, or other offerings may include various Oracle Cloud Infrastructure software products, Oracle Fusion Applications products, or other types of products or services that allow customers to subscribe to usage of those products or services.

Figure 8:
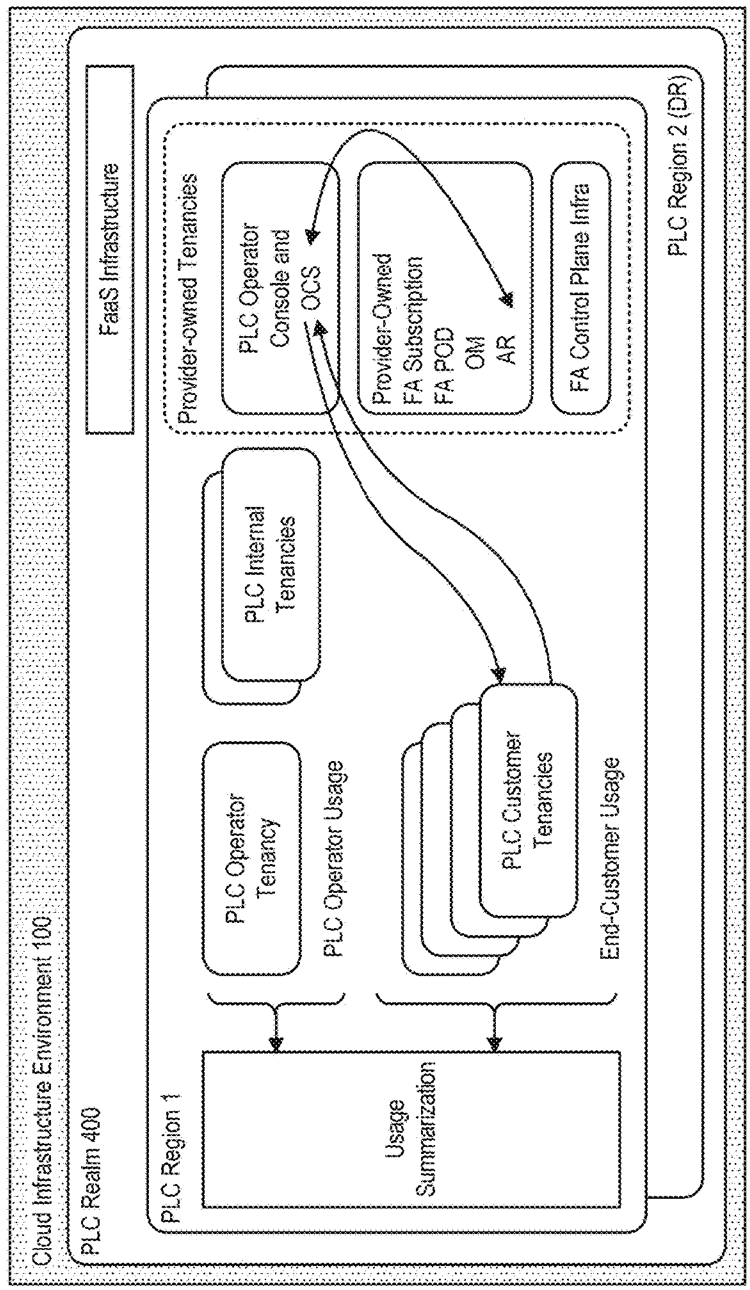
FIG. 8 further illustrates the use of private label cloud realms for use by tenants or customers of a cloud infrastructure environment in accordance with an embodiment.

FIG. 8 further illustrates the use of private label cloud realms for use by tenants or customers of a cloud infrastructure environment in accordance with an embodiment.

As illustrated in FIG. 8, in accordance with an embodiment, the system can include a cloud subscription service or component, such as an Oracle Cloud Subscriptions (OCS) service or component, that exposes one or more subscription management APIs for creating orders used to onboard new customers or to launch a workflow that creates a subscription and orchestrates billing and pricing service or other components for use with a PLC realm 400.

In accordance with an embodiment, when a PLC operator or their customer requests a PLC environment, the system creates a PLC realm for use with one or more provider-owned tenancies. A realm is a logical collection of one or more cloud regions that are isolated from each other and do not allow customer content to traverse realm boundaries to a region outside that realm. Each realm is accessed separately. PLC operators access cloud resources and services through a cloud tenancy. A cloud tenancy is a secure and isolated partition of a cloud infrastructure environment, and it only exists in a single realm. Within this tenancy, operators can access services and deploy workloads across all regions within that realm if policies allow.

In accordance with an embodiment, a first step in the process is to create an operator tenancy for the PLC operator before the realm and associated regions are turned over to them for subsequent management. The PLC operator then becomes the administrator of this tenancy with the ability to view and manage everything that happens within that realm, including their customer accounts and usage by those customers of cloud resources.

Generally, once the realm has been turned over or provided to the PLC operator, the cloud infrastructure provider cannot subsequently access the data within the operator tenancy unless the operator authorizes the cloud infrastructure provider to do so, for example, to provide troubleshooting for issues that may arise.

In accordance with an embodiment, the PLC operator can then create additional internal tenancies, intended for their own use internally, for example, to assess what the end customer experience will be, to provide a sales demo tenancy, or to operate a database for their own internal use. The operator can also create one or more customer tenancies that the end customer will be the administrator for. Cloud infrastructure usage metrics, for example, compute usage, storage usage, and usage of other infrastructure resources, may be consolidated by the operator, reflecting both operator usage and customer usage. Cloud infrastructure usage may be reported to the cloud infrastructure provider.

In accordance with an embodiment, a user interface or console can be provided that allows the PLC operator to manage its customer accounts and customer-offered services. A cloud infrastructure provider can also use a cloud infrastructure tenancy, for example, a Fusion Applications tenancy, to install any needed infrastructure services for use by the operator and their customers.

Figure 9:
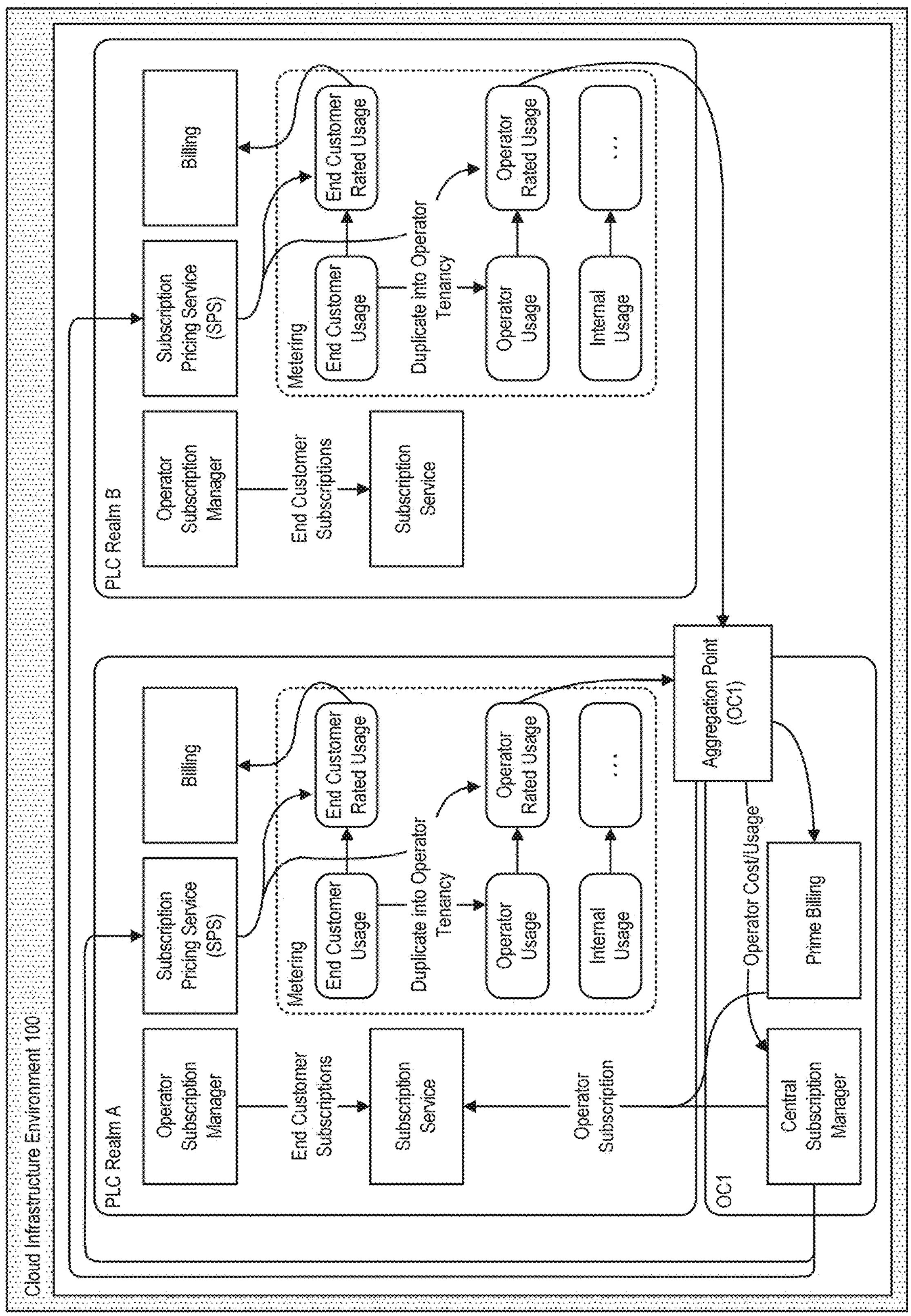
FIG. 9 further illustrates the use of private label cloud realms for use by tenants or customers of a cloud infrastructure environment in accordance with an embodiment.

FIG. 9 further illustrates the use of private label cloud realms for use by tenants or customers of a cloud infrastructure environment in accordance with an embodiment.

As illustrated in FIG. 9, in accordance with an embodiment, a cloud subscription service or component exposes one or more subscription management APIs for creating orders used to onboard new customers or to launch a workflow that creates a subscription and orchestrates billing and pricing services or other components.

In accordance with an embodiment, the system can also include a billing service or component that operates upon a billing account or logical container of subscriptions and preferences used to produce an invoice for a customer.

In accordance with an embodiment, the system can also include a subscription pricing service (SPS) or component that operates upon a product catalog that defines the products that can be purchased by a customer. The subscription pricing service can also be used to provide a price list (e.g., a rate card) that the pricing service also owns.

In accordance with an embodiment, to support the sales process used to create a subscription in a PLC realm, products can be selected from a product hub. Once an order is created, a subscription is created in cloud subscription service that thereafter manages the life cycle of that subscription and provisions what needs to be provisioned in downstream services. The SPS component then manages the aspects of pricing and usage for use in charging the end cost to the PLC operator or their ability to charge their customers. Usage events are forwarded to the billing service or component, where, depending on the billing preferences of the subscription, invoices are created and pushed to an accounts receivables component.

In accordance with an embodiment, although the services that are offered in a realm report their usage to a metering service or component, such usage does not have any price associated with it. A rating process determines how much each specific event costs, for example, by applying rate cards, determines a unit and cost for that subscription, associates the cost to that record, and then forwards that to the billing service or component.

As further illustrated in FIG. 9, in accordance with an embodiment, a PLC operator may control multiple realms A, B. For, example an operator that operates in multiple countries may wish to operate a data center that is completely isolated for the United States of America and a separate data center that is completely isolated for Europe, for example, to address governance or regulatory requirements. In accordance with an embodiment, the usage associated with these multiple realms can be aggregated for use in billing the operator.

The examples of various systems illustrated above are provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

Private Label Cloud Subscriptions

Figure 10:
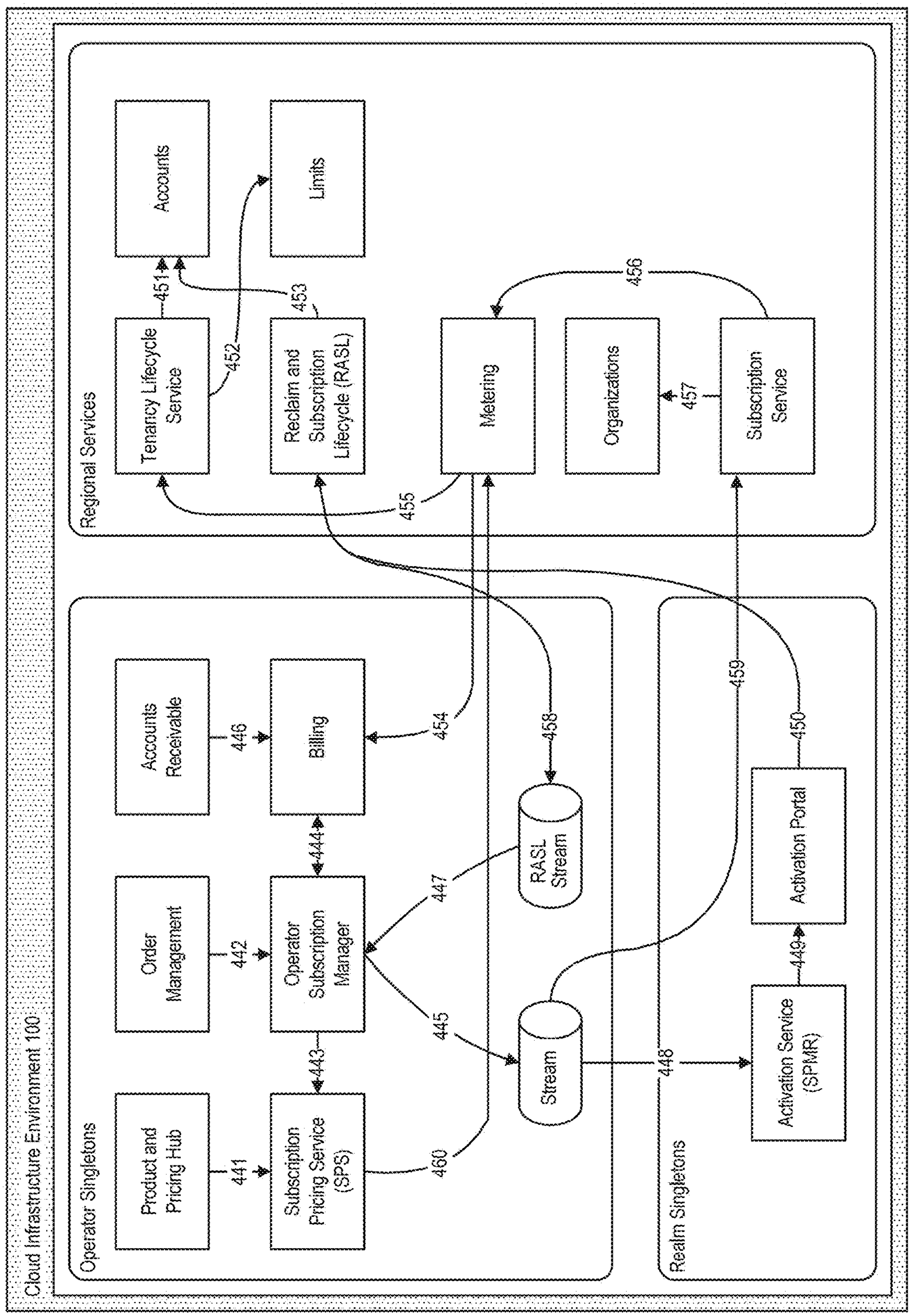
FIG. 10 illustrates a system for providing access to software products or services in a cloud computing or other computing environment in accordance with an embodiment.

FIG. 10 illustrates a system for providing access to software products or services in a cloud computing or other computing environment in accordance with an embodiment.

As illustrated in FIG. 10, in accordance with an embodiment, the system can be provided as a cloud computing or other computing environment, referred to herein in some embodiments as a platform, that supports the use of subscription-based products, services, or other offerings.

Examples of such subscription-based products, services, or other offerings may include various Oracle Cloud Infrastructure (OCI) software products, Oracle Fusion Applications products, or other types of products or services that allow customers to subscribe to usage of those products or services.

In accordance with an embodiment, a subscription can include artifacts, such as products, commits, billing model, and state. The cloud subscription service can expose one or more subscription management APIs for creating orders used to onboard new customers or to launch a workflow that creates a subscription and orchestrates creating the proper footprints in billing and pricing service or components as further described below.

In accordance with an embodiment, the billing service or component operates upon a billing account or logical container of subscriptions and preferences used to produce an invoice. Each billing account generates one or more invoices per billing cycle. The billing service includes a first pipeline that accepts usage and cost from a metering service or component. Usage may be accepted through a REST API or another interface. The billing service writes the usage to a database from which balances may be calculated and aggregated by the billing service or other services. The billing service may include a second pipeline responsible for taking the aggregated usage and commitments and calculating charges over one or more billing intervals.

In accordance with an embodiment, the subscription pricing service (SPS) or component operates upon a product catalog that defines the products that can be purchased by a customer. The product catalog forms the backbone of a price list (i.e., rate card) that the pricing service also owns. Rate cards are modeled as pricing rules on top of public list prices. The pricing service maintains a single price list for each product; new product prices can be added and existing prices changed. The price list has a full history, the latest version being the current rate card. Since some contracts may require a snapshot of the rate card be taken, the pricing service handles this by recording the time a customer's rate card is created and then querying the price list at that time.

In accordance with an embodiment, the SPS or pricing service is responsible for providing information about products, global price lists, and end customer subscription specific price lists and discounts. For example, in accordance with an embodiment, the SPS can sync product information from a product hub (e.g., an Oracle Fusion Product Hub) and a global price list from a pricing hub (e.g., an Oracle Fusion Pricing Hub).

In accordance with an embodiment, the cloud subscription service operates as an upstream service to receive new order requests, for example, from an Oracle Fusion Order Management environment. The cloud subscription service can provide subscription information to the SPS service. Subscription details like time of quote, configuration, and subscription type (Commitment, PayG) help SPS to determine an effective base price (Rate Card) for the subscription. The cloud subscription service can also send discounts for subscriptions received, for example, from Oracle Fusion Order Management, that SPS stores as a pricing rule entity.

In accordance with an embodiment, the SPS service runs as a background process to manage a rate cards service or component responsible for generating rate cards for new subscriptions and updating when new price changes occur. The SPS service can expose APIs to access rate cards and pricing rules. A metering in-line rating engine can utilize these APIs to get subscription-specific rate cards and pricing rules using this data for cost calculations.

In accordance with an embodiment, additional SPS components can include, for example, a Pricing/Product Hub Oracle Integration Cloud (OIC) integration component, that allows a PLC operator entity providing subscription-based products, services, or other offerings within the environment to manage their product and price list, for example, as provided by an Oracle Fusion Product Hub and Oracle Fusion Pricing Hub, respectively.

For example, in accordance with such an embodiment, an SPS OIC product integration flow can listen to create/update events in the Product Hub and make calls to an SPS product API. Similarly, an SPS OIC pricing integration flow can pull new price list creations from the Pricing Hub and call respective SPS pricing APIs.

In accordance with an embodiment, the system can also include an SPS core module that provides APIs to manage and access pricing entities. Pricing can be accessed by internal services, such as an inline rating engine.

In accordance with an embodiment, the system can also include a rate card manager component. The SPS service maintains the single base price for a product at a given time. However, product prices for subscriptions are dependent on a base price at quote configuration time and price list change policy attributes of subscriptions. The SPS service internally maintains the price to be used for subscriptions using these properties. Such price lists are grouped in a rate card. The rate card manager can create and maintain the rate card as well as listen to price list changes and update existing rate cards with the new price. It also listens to new subscriptions and assigns the rate card based on subscription properties.

In accordance with an embodiment, the system can also include a rule decoder engine. The SPS service is responsible for managing pricing rules for a subscription, including discounts offered to an end customer. Pricing rules eligibility can be based on attributes of Products, like Discount group, Product Category, or specific SKUs. Internally, SPS needs to identify the list of products these rules will be applicable. To accomplish this, the rule decoder engine can compile the pricing rules in a format such that an in-line rating engine can consume for cost calculation. This compilation process can be triggered when products or pricing rules get created/updated.

As illustrated by way of example in FIG. 10, in accordance with an embodiment: at 441, a product and price information managed in, e.g., Fusion Applications, is sent to the SPS component. At 442, orders are sent to the cloud subscription service component to create subscriptions, rate cards, and billing accounts. At 443, pricing configuration and pricing rules are sent to SPS for new orders. At 444, the cloud subscription service is used to set up a billing account in the billing service or component. At 445, the cloud subscription service publishes events to a cloud infrastructure streaming component. At 446, charge data is sent to an accounts receivable component to generate invoices. At 447, cloud subscription service consumes reclaim and subscription lifecycle (RASL) events from cloud infrastructure streaming. At 448, an activation service reads the cloud subscription service event stream. At 449, a customer gets activation data from a portal. At 450, a tenancy lifecycle service provisions a tenancy as part of the subscription activation. At 451, the tenancy lifecycle service creates an accounts footprint during account provisioning. At 452, the tenancy lifecycle service sets a limits template during account provisioning. At 453, the accounts component acts as a downstream RASL client to handle legacy reclamation. At 454, aggregated cost and usage is sent to the billing service or component. At 455, an organization can create child tenancies using the tenancy lifecycle service. At 456, a metering service or component gets subscription mapping data. At 457, the subscription service gets organization data for subscription mappings. At 458, RASL reads cloud subscription service event stream. At 459, the subscription service reads cloud subscription service event stream; and at 460, the metering service or component gets a rate card data for each subscription that can then be used in charging the end cost to the PLC operator or their ability to charge their customers.

The above example is provided for purposes of illustrating a computing environment that can be used to provide dedicated or private label cloud environments for use by tenants of a cloud infrastructure in accessing subscription-based software products, services, or other offerings associated with the cloud infrastructure environment. In accordance with other embodiments, the various components, processes, and features described herein can be used with other types of cloud computing environments.

2. Access Control Architecture

Figure 11:
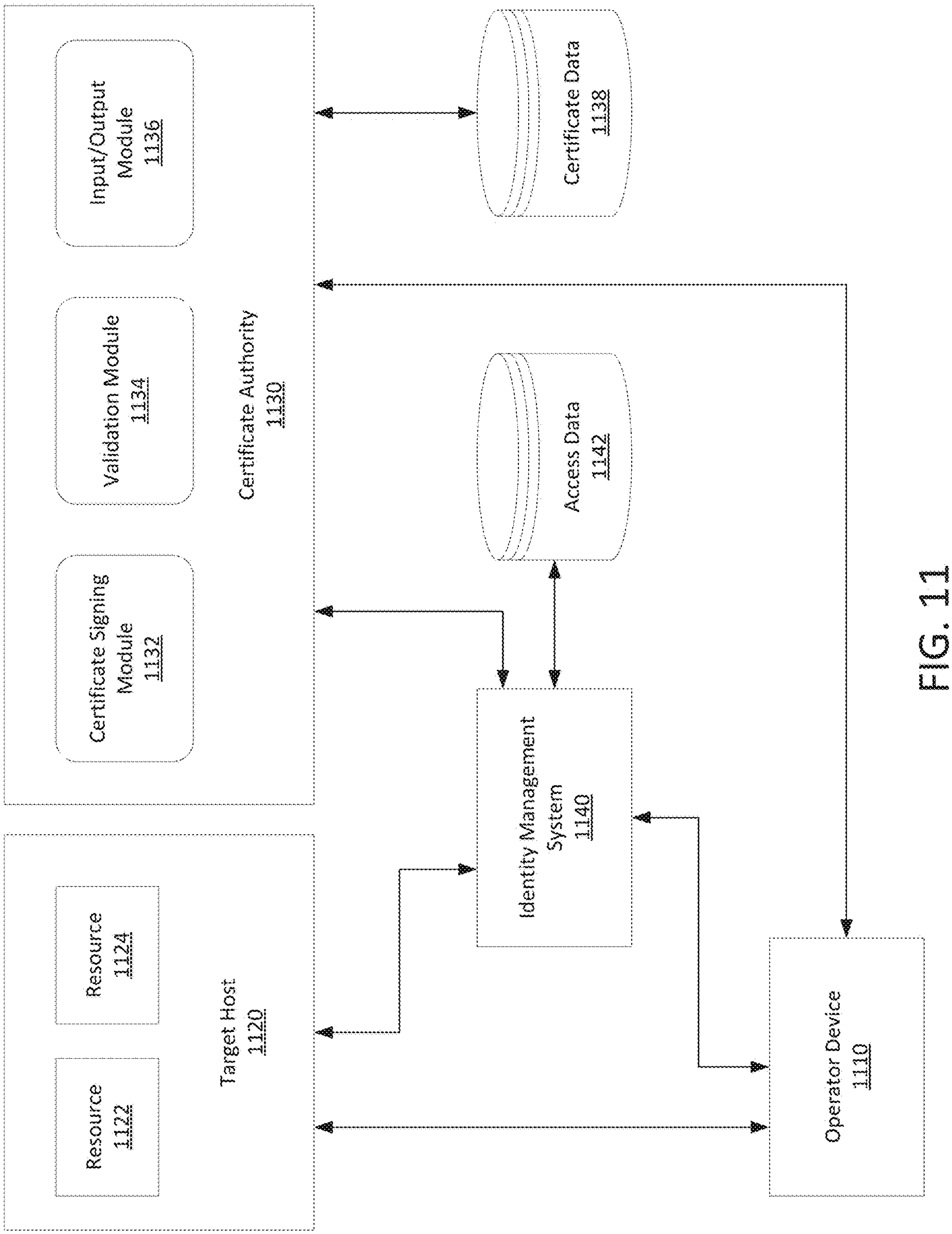
FIG. 11 illustrates a system for managing access to resources in a cloud computing environment using SSH certificates in accordance with one or more embodiments.

FIG. 11 illustrates a system for managing access to resources in a cloud computing environment using SSH certificates in accordance with one or more embodiments. As illustrated in FIG. 11, the system includes an operator device 1110, a target host 1120, a certificate authority 1130 communicatively coupled to certificate data 1138, and an identity management system 1140 communicatively coupled to access data 1142. The target host includes resources, such as resource 1122 and resource 1124, and the certificate authority includes a certificate signing module 1132, a validation module 1134, and an input/output module 1136. The components illustrated in FIG. 11 may be local to or remote from each other. The components illustrated in FIG. 11 may be implemented in software and/or hardware. Components may be distributed over multiple applications and/or machines. Multiple components may be combined into one application and/or machine. Operations described with respect to one component may instead be performed by another component.

In accordance with one or more embodiments, operator device 1110 device functions as the initiator of an access request process. Operator device 1110 includes several components related to access management and engages in a series of activities to facilitate secure and authenticated access to the specified resources. Some relevant elements of operator device 1110 include SSH client software, a key generation utility, and a certificate storage mechanism. These components interact through a sequence of operations that establish a secure connection.

SSH client software on operator device 1110 is configured to initiate the connection process by specifying a target host, such as target host 1120, and requesting access. This software is responsible for implementing the SSH protocol that encompasses establishing a secure channel, authenticating the operator to the resource, and encrypting the data exchange to maintain confidentiality and integrity. Before initiating a connection, the operator device should possess a valid SSH certificate and corresponding private key. The key generation utility on the device is configured to generate a pair of cryptographic keys, including of a private key retained securely on the operator device and a public key submitted to certificate authority 1130. The certificate storage mechanism on the operator device securely stores the SSH certificate and the private key. This storage ensures the certificate can be readily presented during the authentication process, and the private key remains confidential and accessible only to operator device 1110.

In accordance with one or more embodiments, certificate authority 1130 operates as a centralized entity that issues, signs, and manages certificates, thereby facilitating the authentication of operators seeking access to resources. Certificate authority 1130 performs several activities, including verification of requests, certificate issuance, certificate signing, and certificate revocation management. In an embodiment, certificate authority 1130 includes input/output module 1136, validation module 1134, and certificate signing module 1132.

In accordance with an embodiment, input/output module 1136 serves as the primary interface for data entering and exiting certificate authority 1130, managing the flow and integrity of data and requests (both incoming and outgoing). This data may include certificate signing requests, responses from identity management system 1140, certificate data 1138, management interface interactions, and data destined for validation module 1134. Other data may include data associated with creating and distributing certificates and data associated with key generation and distribution. Requests may also include requests for reports, for example, based on certificate data 1138. This module may accommodate a wide range of data sources and formats to facilitate integration and communication within the certificate authority 1130 architecture.

In an embodiment, an input handler within input/output module 1136 includes a data ingestion framework capable of interfacing with various data sources, such as databases, APIs, file systems, and real-time data streams. This framework is equipped with functionalities to handle different data formats (e.g., CSV, JSON, XML) and efficiently manage large volumes of data. It includes mechanisms for batch and real-time data processing that enable the input/output module 1136 to be versatile in different operational contexts when processing historical datasets, streaming data or handling interactions related to certificate signing by certificate signing module 1132.

In accordance with an embodiment, input/output module 1136 manages data integrity and quality as it enters the system by incorporating initial checks and validations. These checks and validations ensure that incoming data meets predefined quality standards, like checking for missing values, ensuring consistency in data formats, and verifying data ranges and types. This proactive approach to data quality minimizes potential errors and inconsistencies in later stages of the certificate creation process.

In an embodiment, an output handler within input/output module 1136 includes an output framework designed to handle the distribution and exportation of output. Using the output framework, input/output module 1136 may format these outputs into user-friendly and accessible formats, such as reports, visualizations, or data files compatible with other systems. Input/output module 1136 also ensures secure and efficient transmission of these outputs to end-users or other systems in an embodiment and may employ encryption and secure data transfer protocols to maintain data confidentiality and security.

In accordance with an embodiment, certificate authority 1130 includes validation module 1134. Validation module 1134 is configured to initiate a verification process when an operator submits a certificate request along with their public key. This involves authenticating the identity of the operator and validating their authorization to access the specified resources. Authentication typically requires comparing the request against an identity management system or directory service, where operators' identities and their associated access rights are stored.

In an embodiment, validation module 1134 is configured to compare the operator's submitted identity information against entries in a trusted directory service or identity management system such as identity management system 1140. This system maintains access data 1142 that includes a database of operators, including their associated roles, permissions, and, in some cases, their registered public keys. Validation module 1134 uses automated protocols to query this database, seeking a match for the submitted identity information.

In accordance with an embodiment, validation module 1134 is also configured to determine if the operator is authorized to access the specified resource. This assessment is based on predefined access control policies that dictate the permissions associated with different roles or identities within the organization. Validation module 1134 is configured to these policies that may be stored in access data 1142 (or in a separate access management system) to determine if the operator's role or identity grants them the access rights they are requesting.

In accordance with an embodiment, authority 1130 includes certificate signing module 1132. Certificate signing module 1132 is responsible for creating and issuing digital certificates. For example, certificate signing module 1130 may be configured to generate OpenSSH certificates or any other certificates that support the features described herein. A certificate signing request sent by an operator device may contain information to be included in the certificate, such as a public key, organizational information, and common name (domain name). Other information, such as an email address, physical location information.

In accordance with one or more embodiments, certificate authority's 1130 private key is used for signing certificates. When an operator submits an operator public key for certification, following successful verification of identity and authorization, the certificate authority 1130 issues a certificate that is signed by the certificate authority 1130 using the certificate authority's 1130 private key. In an embodiment, the act of signing involves the generation of a digital signature, achieved by encrypting the hash of the certificate with the certificate authority's private key. This binds the certificate authority's 1130 identity to the certificate and enables the detection of any modifications to the certificate that may occur after the certificate is signed. When a target host receives a secure connection request from an operator device, it will include the certificate. The target host uses the certificate authority's 1130 public key to decrypt the digital signature and match the decrypted hash against a newly computed hash of the certificate. A match confirms the certificate's integrity and the certificate's valid issuance by the certificate authority 1130. The relationship between the certificate authority's 1130 private and public keys allows use of the public key to validate signatures made with the private key without needing access to the private key.

In accordance with an embodiment, Certificate signing module 1132 creates the digital certificate after the request passes a validation process. The certificate creation process involves signing the public key along with the certificate information using the certificate authority's 1130 private key that confers trust onto the certificate. The signing process employs cryptographic algorithms to ensure the integrity and authenticity of the certificate. The resultant digital certificate includes the signed public key, information about the certificate authority 1130 (issuer), the validity period (start and end date), and other relevant details.

In accordance with an embodiment, certificate signing module 1132 is configured to form one or more target-specific principals to include in the certificate's principals section. The principals section typically specifies the entities that the certificate is valid for. The principals field in an SSH certificate can contain one or more names, each representing an operator or a system identity that is authorized to use the certificate for authentication. In an embodiment, a target-specific principal includes both the user identifier and a resource identifier that identifies one or more resources. For example, the resource identifier may identify a host by the host's host name or may identify a host class that encompasses hosts of that type (e.g., DNS servers or file servers within a tenancy).

In accordance with an embodiment, certificate signing module 1132 is configured to base the formation of target-specific principals based on access data 1142. For example, certificate signing module 1132 may generate a target-specific principal that will allow the operator device to access a host or a host class (or another resource) for which host class identity management system 1140 indicates access associated with that user identifier is appropriate based on access data 1142. In an embodiment, certificate signing module may include more than one target-specific principal, and the target-specific principals generated may allow for more restricted access than initially requested in the certificate signing request. In other words, certificate signing module 1132 may determine that the user identifier may be allowed access to some resources but not others requested in the certificate signing request. In an embodiment, a particular target-specific principal may be requested by the operator device, in which case that particular target-specific principal would be used. In such cases, the requested target-specific principal may be parsed by input/output module 1136 to normalize input for validation module 1134.

In accordance with an embodiment, certificate signing module 1132 is configured to include additional information in a target-specific principal. For example, the target-specific principal may include options or designations that impact the level of access an operator may have, such as sudo or non-sudo access. Short for "super user do," sudo access may grant elevated access to an operator, allowing the operator to perform tasks that normally require root privileges or another set of privileges, depending on the system involved. By providing a designation for sudo access in a target-specific principal, the target host may discern the level of access associated with the certificate when the target host is presented in conjunction with a request to open a secure communication session with an operator device.

In accordance with one or more embodiments, a target-specific principal may be formed as a string of characters in the format <<user ID>>@hc_<<hostclass>>_<<access>>. For example, if an operator with the user ID jsmith were approved for access to all production application servers with sudo access, the target-specific principal may be formed as the following string of characters: jsmith@hc_appserver-prod_sudo. In this example, it is assumed that the nomenclature for host classes is understood by the relevant actors involved. For example, the target host may be configured to recognize that the target host falls into the host class appserver-prod. In an embodiment, a different nomenclature for forming a target-specific principal may be used. For example, the principal may reference individual hosts or resources instead of a host class. Other classes may also be used in embodiments such as resource classes. In addition, other options may be included in the principal by adding option identifiers to the string forming the principal.

In accordance with an embodiment, the user ID used in the formation of the target-specific principal may not be the user ID used by operator device 1110 for authentication. For example, the user ID jsmith may be authorized to perform actions on a target host using a different user identifier. In this case, certificate signing module 1132 may form one or more target-specific principles to place in the certificate. The user ID jsmith may be included in the certificate for audit purposes in an embodiment. For example, the first target-specific principal may include jsmith as the user ID, and/or the user ID jsmith may be placed in the Key ID field of the certificate as shown in FIG. 14, discussed below.

In accordance with one or more embodiments, identity management system 1140 serves as a platform for managing the identities and access privileges of operators. This system is used to store, update, and manage access data that defines the roles, permissions, and policies associated with the operators. When operator device 1110 attempts to obtain a certificate, certificate authority 1130 relies on identity management system 1140 to verify the operator's authorization. This process entails a comparison of the operator's identity and their requested access rights against access data 1142 maintained within or associated with identity management system 1140.

In accordance with one or more embodiments, identity management system 1140 incorporates authentication, authorization, and auditing mechanisms. Authentication processes are designed to confirm the identity of operators by requiring them to present credentials that may include passwords, security tokens, or biometric verification methods. Following successful authentication, the authorization mechanism assesses if the operator's access request aligns with their roles and permissions. The identity management system's auditing features are instrumental in monitoring and logging access attempts and activities, providing a detailed record for security analysis and compliance auditing.

In accordance with one or more embodiments, identity management system 1140 may integrate with other security and operational tools within the organization. For example, when integrating with directory services, identity management system 1140 can automatically synchronize operator data, ensuring that access rights are accurately reflected across the systems. Additionally, identity management system 1140 may employ advanced security protocols and encryption standards to protect sensitive information and communications, further securing the authentication and authorization processes.

In accordance with one or more embodiments, target host 1120 includes resource 1122 and resource 1124. Resource 1122 and resource 1124 may represent configurable resources, such as server software, or may represent any other type of resource for which access may be managed by target host 1120. Target host 1120 is equipped with SSH server software capable of interpreting and validating SSH certificates that include a target-specific principal. In an embodiment, the SSH server software is also capable of interpreting and validating SSH certificates that include a target-specific and access-specific principal that identifies the target host or host class and access level available to the operator (e.g., sudo or non-sudo). For example, resource 1122 may be available to authenticated operators generally, while resource 1124 may be available only to operators with an elevated level of access such as sudo access. In an embodiment, other options included in the principal may also be interpreted and validated by the SSH server software. The Secure Shell daemon (sshd) is configured to recognize and authenticate certificates issued by a trusted certificate authority (CA). The configuration process includes specifying the CA's public key within the sshd configuration file that may be located at/etc/ssh/sshd_config, enabling the daemon to verify the signature on the operator's SSH certificate against the CA's public key that is accessible to target host 1120.

In accordance with one or more embodiments, target host 1120 is configured to map certificates (or certificate attributes) to the permissions and roles defined for the operators. This ensures that operators are granted access to the resources appropriate for their role, as defined by identity management system 1140.

In accordance with one or more embodiments, target host 1120 is configured to log SSH access attempts and activities, facilitating auditing and compliance with security policies. For example, target host 1120 may log the certificate's unique identifier, the accessing operator's identity, and the session's time and duration. In an embodiment, logging the user's identity may include logging principals, the user identifier portion of a target-specific principal, a user identifier listed in the Key ID field of the certificate, or any combination of these. Obtaining the user identifier from the Key ID field of the certificate may be necessary if the operator is being allowed to access accounts on the target host that are not associated with the operator's user identifier.

In accordance with one or more embodiments, during the authentication phase of the SSH connection process, the SSH client software on operator device 1110 retrieves the SSH certificate from a certificate storage mechanism and presents the certificate to the target resource. Target host 1120, equipped with certificate authority's 1130 public key, verifies the certificate's signature to confirm the certificate's authenticity and checks the access rights against the target host's 1120 configuration. This verification process ensures the operator device holds a certificate issued by a trusted CA, and the certificate grants access to the requested resource.

In accordance with one or more embodiments, access data 1142 and/or certificate data 1138 may be any type of storage unit and/or device (e.g., a file system, database, collection of tables, or any other storage mechanism) for storing data. Further, access data 1142 and/or certificate data 1138 may include multiple different storage units and/or devices. The multiple different storage units and/or devices may or may not be of the same type or located at the same physical site. Further, access data 1142 and/or certificate data 1138 may be implemented or executed on the same computing system as identity management system 1140 or certificate authority 1130. Additionally, or alternatively, access data 1142 and/or certificate data 1138 may be implemented or executed on a computing system separate from identity management system 1140 or certificate authority 1130. Access data 1142 and/or certificate data 1138 may be communicatively coupled to identity management system 1140 or certificate authority 1130 via a direct connection or via a network.

Figure 12:
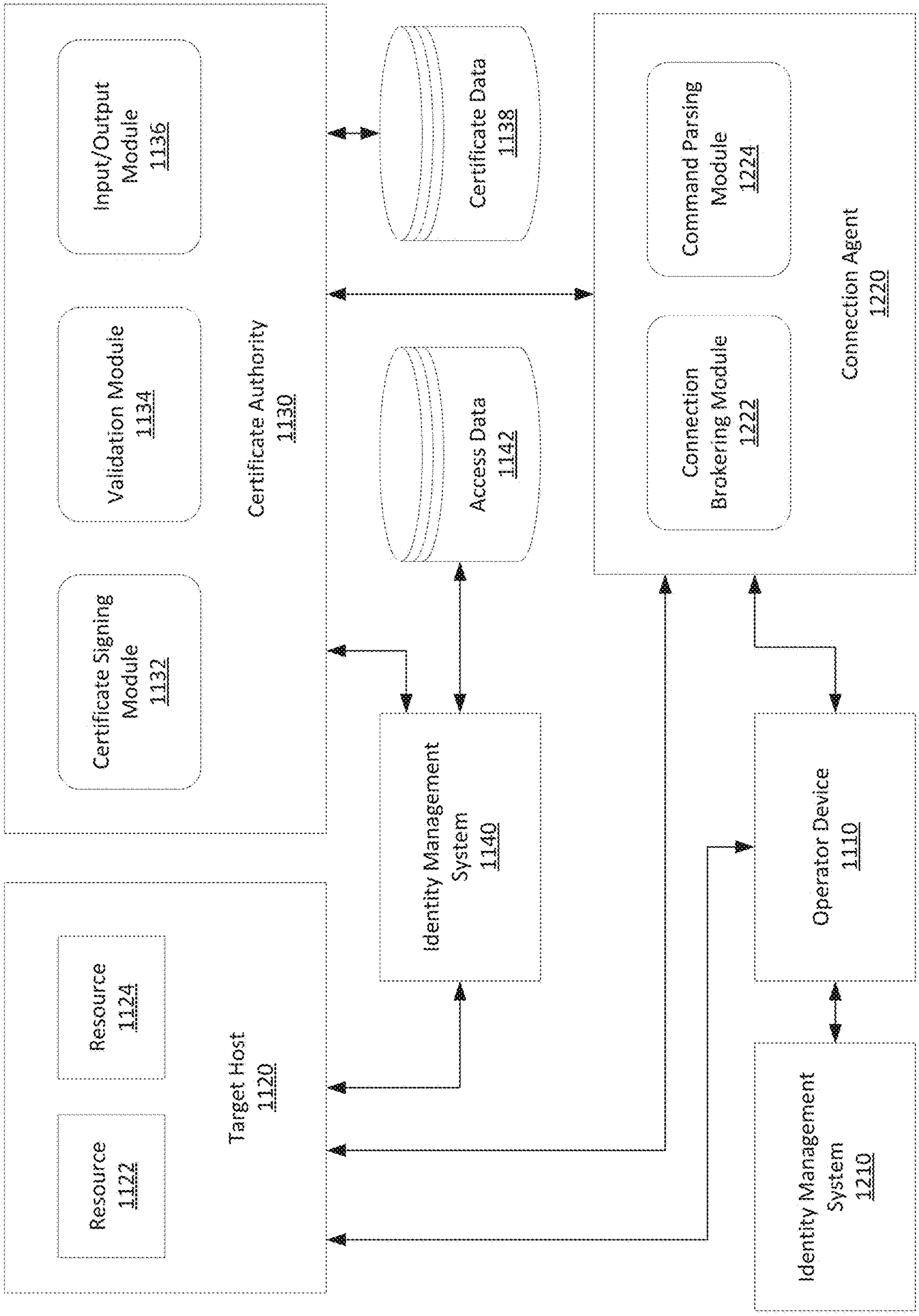
FIG. 12 illustrates a system for managing access to resources in a cloud computing environment using a connection agent to manage SSH sessions in accordance with one or more embodiments.

FIG. 12 illustrates a system for managing access to resources in a cloud computing environment using SSH certificates in accordance with one or more embodiments. As illustrated in FIG. 12, the system includes all the components of FIG. 11. In addition, FIG. 12 includes operator device 1110, target host 1120, identity management system 1140, and other elements described in connection with FIG. 11. Additionally, the system of FIG. 12 includes connection agent 1220 and identity management system 1210 (distinct from identity management system 1140). Connection agent 1220 includes a connection brokering module 1222 and command parsing module 1224. The components illustrated in FIG. 12 may be local to or remote from one another. The components illustrated in FIG. 12 may be implemented in software and/or hardware. Components may be distributed over multiple applications and/or machines. Multiple components may be combined into one application and/or machine. Operations described with respect to one component may instead be performed by another component.

In accordance with one or more embodiments, connection agent 1220 is an intermediary configured to manage SSH connections on behalf of operator device 1110. Connection agent 1220 may reside on operator device 1110, on a physical or virtual device managed by a cloud reseller, on a physical or virtual device managed by a cloud provider, on a device communicatively coupled with operator device 1110, or on a device that is associated with two or more of these categories (e.g., on an operator device that is managed by a cloud reseller). Using connection agent 1220 to manage SSH connectivity allows operators a convenient way to take advantage of the extended SSH certificate structure that includes target-specific principals. Connection agent 1220 is configured to present secure connection requests on behalf of operator device 1110 to certificate authority 1130 and target host 1120. Connection agent 1220 is configured to leverage the enhanced capabilities available by using target-specific principals and other extended SSH features described herein.

In accordance with one or more embodiments, connection agent 1220 includes command parsing module 1224. Command parsing module 1224 serves as a layer between the operator's input and the utility's core functionalities. This module's primary function is to interpret and validate the series of arguments and options provided by the operator through the command line interface (or another interface that generates the series of arguments). The input may consist of a command followed by one or more options that modify the command's behavior, along with possible values associated with these options.

In accordance with one or more embodiments, command parsing module 1224 tokenizes the input string, dividing the input into identifiable segments (e.g., segments separated by spaces). Segments are then classified either as a command, an option (e.g., preceded by a dash "-" for short options or two dashes "--" for long options), or a value associated with an option. Command parsing module 1224 has a predefined set of rules that define the expected structure of the command line input. This may include the commands that are valid, the options that are available for each command, what type of value the option expects (such as a string or a number), and if certain options are mandatory or optional.

In accordance with one or more embodiments, command parsing module 1224 validates the parsed input against the predefined set of rules. This process involves checking if the command is recognized, if the options are valid for the given command, if required options are present, and if the values provided for the options are in the expected format. Validation also includes checking for any conflicts or dependencies between options, such as if one option necessitates or excludes another. Command parsing module 1224 maps the validated commands and options to specific actions within the utility. This mapping process involves translating the command line input into function calls or operations that connection agent 1220 performs to carry out the requested action. For instance, this could involve setting up a secure connection to a remote host, where command options might dictate the host address, remote username, host class, access level, port number, authentication method, a particular target-specific principal to request, and other connection parameters. In an embodiment, command parsing module 1224 is configured to generate error messages if validation fails. These error messages are returned to the interface used to input the command (e.g., a command-line interface) with suggestions for correction.

In accordance with one or more embodiments, connection brokering module 1222 is configured to facilitate the creation of a secure connection between operator device 1110 and target host 1120. Connection brokering module 1222 manages interaction with certificate authority 1130 and with target host 1120 on behalf of operator device 1110. For example, when operator device 1110 makes a command line request via an interface to connection agent 1220 (such as the Oracle SSH command line interface), connection brokering module 1222 uses the commands and options parsed by command parsing module to determine orchestration requirements.

In accordance with one or more embodiments, orchestration requirements include verifying that operator device has been authenticated. Connection brokering module 1222 attempts to verify that the operator has been authenticated by the operator's identity management system, for example, by checking for the presence of an authentication token that serves as proof of the operator's authentication status. If an authentication token is present, connection brokering module 1222 validates this token against identity management system 1210 to ensure the token is valid and has not expired using secure protocols, such as OAuth 2.0 or OpenID Connect. If the token is validated successfully, indicating that the operator's authentication status is confirmed, connection brokering module 1222 allows the connection process to continue. However, if the authentication token is missing, invalid, or expired, connection brokering module 1222 redirects the operator to the identity provider associated with identity management system 1210. This redirection may be facilitated, for example, through an HTTP response with a status code indicating redirection and includes the URL of the identity provider where the operator can authenticate. Alternatively, in the case of a command line interface, other mechanisms for redirection may be employed. For example, the application may generate a URL for the identity provider where the operator can authenticate. This URL may be crafted to include the necessary parameters that the identity provider requires to initiate the authentication process, such as client identifiers, redirect URIs, and other information about the access being requested. The application may then use a system-specific command to open the URL in the default web browser. For example, on Windows, the start command can be used; on macOS, the open command can be used; and on Linux, various commands like xdg-open can be employed depending on the desktop environment. The application executes one of these commands as an external process, passing the URL as an argument. This action causes the operator's default web browser to launch (if the default browser is not already running) or open a new tab (if the default browser is already running), navigating to the provided URL for authentication.

In an embodiment, connection agent 1220 is associated with identity management system 1140, and operator device 1110 is associated with identity management system 1210. Although identity management for the operator device 1110 is decoupled from identity management system 1140, use of connection agent 1220 by operator device 1110 may be permitted by connection agent 1220 if operator device 1110 is authenticated with identity management system 1210. This may be true even if operator device 1110 is not authenticated with identity management system 1140. Even so, any target-specific principal for which a secure connection is requested will still be validated by certificate authority 1130 and target host 1120 before a secure connection to target host 1120 is created in an embodiment.

In accordance with one or more embodiments, connection brokering module 1222 is configured to contact certificate authority 1130 to make a certificate signing request on behalf of operator device 1110. In an embodiment, connection agent 1220 resides on operator device 1110, generates the required public/private key pair for the operator device, and presents the public key to certificate authority when making the certificate signing request. In another embodiment, connection agent 1220 resides on a device other than operator device 1110, such as a virtual machine managed by a cloud service provider, generates the required public/private key pair for the device where connection agent 1220 resides, and presents the public key to certificate authority when making the secure connection request. In another embodiment, connection agent 1220 resides on a device other than operator device 1110, such as a virtual machine managed by a cloud service provider, generates the required public/private key pair for operator device 1110, and presents the public key to certificate authority when making the secure connection request. In such an embodiment, connection agent 1220 acts as an intermediary between the target host 1120 and operator device 1110 once the secure connection is made.

In accordance with one or more embodiments, connection agent 1220 is configured to receive and respond to challenges from other systems that are associated with operator devices for which connection agent 1220 is performing actions. For example, connection agent 1220 is configured to generate a challenge response based on the private key associated with an operator device that confirms the operator device possesses the private key corresponding to the public key in a certificate. Connection agent 1220 is configured to send this response to other systems such as a certificate authority.

In accordance with one or more embodiments, one of the orchestration requirements is to receive a signed SSL certificate from certificate authority 1130. In an embodiment, connection agent 1220 is configured to receive a signed SSL certificate from certificate authority 1130 on behalf of operator device 1110. Connection agent 1220 may use the signed certificate to make a secure connection request to target host 1120 on behalf of operator device 1110. Target host 1120 is configured to validate the target-specific principal(s) in the certificate in the same way target host 1120 does when a connection is requested directly from operator device 1110 (once connection agent 1220 presents the signed certificate to target host 1120 with a secure connection request).

Figure 13:
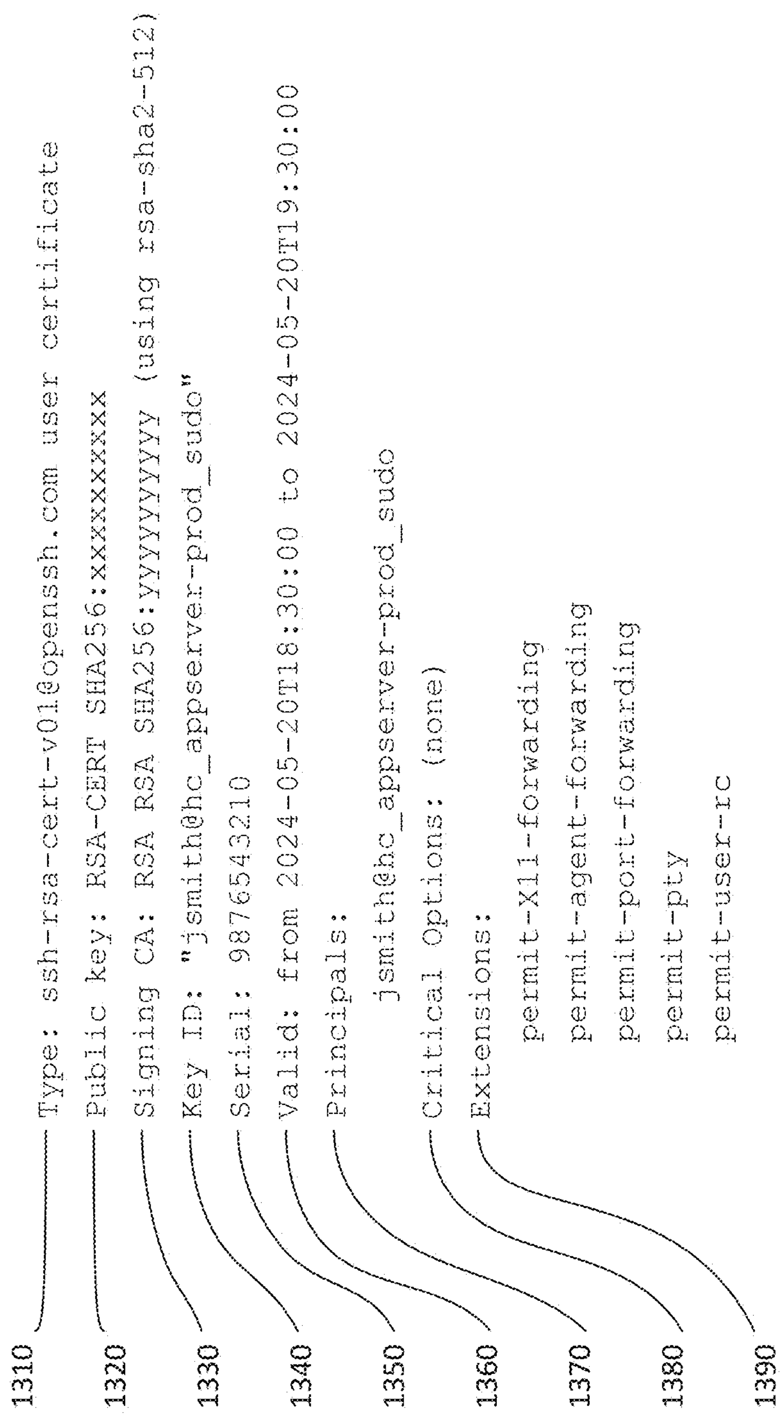
FIG. 13 illustrates an example SSH certificate in accordance with one or more embodiments.

FIG. 13 illustrates an example SSH certificate in accordance with one or more embodiments. Item 1310 indicates the type of certificate for systems receiving the certificate as part of a secure connection request. Item 1310 identifies the cryptographic algorithm and the version of the certificate format being used. Item 1310 determines how the certificate is parsed and validated as well as the cryptographic operations that are supported during the authentication process. The type shown in the example indicates that the certificate shown is an RSA (Rivest-Shamir-Adleman) certificate using version 01 of OpenSSH's certificate format.

Item 1320 contains the public component of a key pair for operator device 1110 used for SSH authentication. This key works in tandem with the operator device private key that remains securely stored and accessible to operator device 1110. The operator device public key is openly shared and embedded in the SSH certificate, allowing SSH servers to verify the identity of the certificate holder during the authentication process without exposing sensitive information.

Item 1330 identifies the certificate authority that has authenticated and issued the certificate. This line indicates which certificate authority has verified the entity's credentials and identity and then signed the certificate with the certificate authority's private key. The signing CA line links a certificate to its issuing certificate authority, facilitating the establishment of a chain of trust. This chain supports the verification process of the certificate's validity.

Item 1340 is an identifier for the key that can be set to anything meaningful to the user or system. In this case, the value of the key id field generally mirrors the value of the Principals section. The Key ID field may serve as a unique identifier or label for the specific public key within the certificate. The key id is intended to provide a human-readable or system-specific reference, but the key id field may be used for other purposes in an embodiment.

Item 1350 specifies a serial number. A serial number is assigned to certificates as a unique identifier. This identifier facilitates the differentiation of each certificate within the system, allowing for management of certificate issuance and revocation processes. The serial number enables the identification of specific certificates within a certificate revocation list. When a certificate is deemed invalid or compromised, its serial number is listed in the certificate revocation list to prevent its further use of the certificate. Additionally, the serial number aids in the audit and tracking functions, providing a method for administrators to log and monitor certificate activity over time. This includes tracking the lifecycle of a certificate from issuance to expiration or revocation, thereby supporting compliance with security policies and regulatory requirements.

Item 1360 specifies the time interval that the certificate is considered valid and may include a start time and end time in a format understandable by both the sender and the receiver of the certificate. Item 1370 indicates the principals for whom the certificate is considered valid. In the example shown, a target-specific and access-specific principle (jsmith@hc_appserver-prod_sudo). In this case, jsmith is the user id, hc_signals that the following text represents a host class, appserver-prod is a host class for a production application server, and sudo indicates the level of access being requested.

Item 1380 indicates that there are no critical options. The Critical Options field identifies a set of conditions to be satisfied for the certificate to be considered valid during authentication. These options are used to enforce certain security policies or restrictions directly at the SSH protocol level. If any critical option conditions are not met, the SSH server will refuse the connection or limit capabilities according to the specified options.

Item 1390 indicates any identified extensions. Extensions in an SSH certificate are used to grant additional permissions or capabilities to the certificate holder that go beyond the basic authentication and connection setup. Unlike critical options that impose restrictions and should be satisfied for a certificate to be considered valid, extensions provide optional functionalities that enhance the capabilities of the SSH session for the user or host. These extensions are not mandatory for the basic authentication process but enable specific features when the certificate is used.

FIG. 14 illustrates an example SSH certificate in accordance with one or more embodiments. In the example shown, item 1410 indicates a Key ID of jsmith. Unlike the example of FIG. 13, the Key ID field of item 1410 does not generally match item 1420, indicating the full target-specific principals associated with the certificate. Additionally, item 1420 shows three separate target-specific and access-specific principals (jsmith@hc_appserver-prod_sudo, testuser1@hc_db-test_sudo, and account1@hc_db-prod_login). If the verifications are successful, an operator device using the certificate of FIG. 14 may access hosts with the host class db-test with sudo access, using the user ID testuser1 (and so on), even though the user ID associated with the operator device in the relevant identity management system used for initial authentication is jsmith. By indicating the user ID in the key id field, the target host may extract this information and log the user ID for audit purposes to show the user ID associated with the use of one of the principals. In the previous example, the target host's log would indicate that user jsmith used a certificate to gain access to the system using the testuser1 user ID. In an embodiment, the first target-specific principal (jsmith@hc_appserver-prod_sudo) or any other value may be placed in the key id field for a similar purpose as long as the alternate value identifies the user ID associated with the operator device (directly or indirectly).

In an embodiment, the Key ID field may include a tenancy identifier and/or a user identifier related to a cloud infrastructure environment. For example, the Key ID field may include a tenancy OCID (Oracle Cloud Identifier) or a user OCID in an embodiment using an Oracle cloud infrastructure environment. Other specific identifiers may be used in other environments. By including a tenancy identifier and/or a user identifier related to a cloud infrastructure environment in the certificate, a record of the tenancy identifier and/or a user identifier will be stored in an audit log, allowing administrators to determine which user logged in. In addition, the tenancy identifier and/or a user identifier may be used as additional elements of the resource identifier for authorization purposes.

In an embodiment, the various systems described in FIGS. 11 and 12 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

4. Controlling Access with Target-Specific Principals

Figure 15:
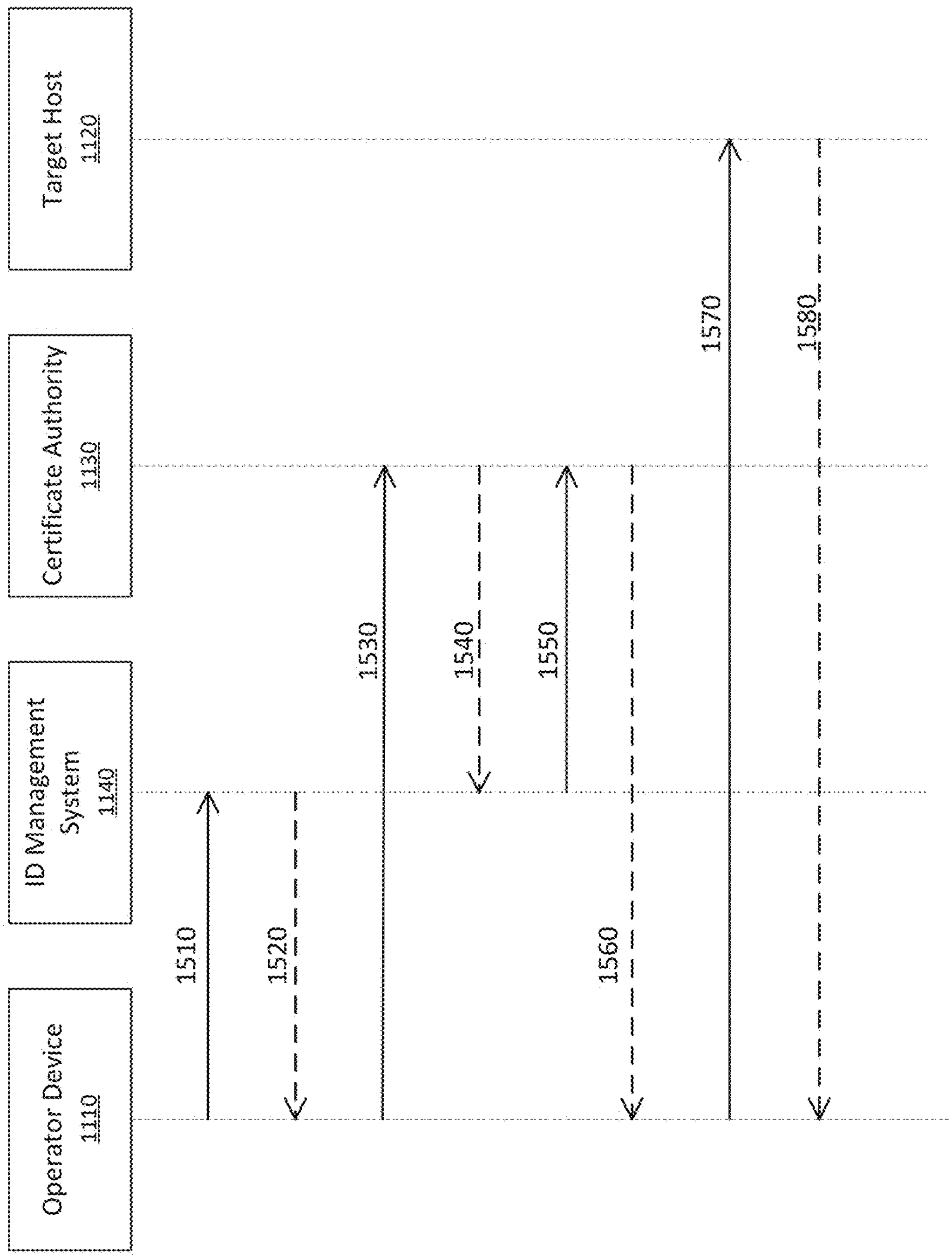
FIG. 15 illustrates an example set of operations for managing access to resources in a cloud computing environment using SSH certificates in accordance with one or more embodiments.

FIG. 15 illustrates an example set of operations for managing access to resources in a cloud computing environment using SSH certificates in accordance with one or more embodiments. One or more operations illustrated in FIG. 15 may be modified, rearranged, or omitted altogether. Accordingly, the particular sequence of operations illustrated in FIG. 15 should not be construed as limiting the scope of one or more embodiments.

In an embodiment, operator device 1110 initiates a request for authentication by sending credentials to identification management system 1140 (Operation 1510). This process is agnostic of the specific identity management system in use, allowing for flexibility in the deployment of various systems tailored to different organizational needs. The purpose of authentication is to verify the identity of the operator attempting access, ensuring that authorized operators can proceed. This is achieved through the comparison of the submitted credentials against those stored within the identity management system; this may include passwords, tokens, or biometric data.

In accordance with one or more embodiments, identity management system 1140 evaluates the provided credentials to determine their validity. Upon successful authentication, the system generates an access token that includes a public key sent by the operator device as part of the initial authentication to identity management system 1140. The token is then sent back to operator device 1110 (Operation 1520). The token and the private key associated with the public key in the token together function as a digital key, granting the operator device permission to access the requested resources for a specified duration. The access token encapsulates the operator's identity and access rights, ensuring that subsequent interactions with the system or services can be conducted without the need for repeated authentication. In other embodiments, different types of authentication mechanisms may be used.

Upon receiving the access token, operator device 1110 initiates a certificate signing request to obtain an SSH certificate. This request is sent to certificate authority 1130 (Operation 1530). Assuming the operator device has generated a public/private key pair, the certificate signing request includes the public key. The public key will be used in the SSH certificate and metadata related to the operator or the device generating the request, such as the device's name, location, or other identifiers that certificate authority 1130 requires for authentication and authorization purposes. The certificate signing request also includes a user ID associated with operator device 1110 and a target host class identifier that indicates that the certificate will be used to access hosts in the class of hosts that includes target host 1120. This request is then encoded and sent to certificate authority 1130 that is trusted within the organization's infrastructure or by the operator.

Upon receiving the certificate signing request, certificate authority 1130 processes the certificate signing request. If no access token is received or if the received token is invalid or expired, certificate authority 1130 either rejects the request or redirects operator device 1110 to the appropriate identity provider such as identity management system 1140 if configured to do so. If a valid access token exists, certificate authority 1130 validates the identity of the operator and the authenticity of the request. This validation process may involve checking the operator's credentials against an identity provider or directory service, such as identification management system 1140, and ensuring that the operator is authorized to receive a certificate for the requested usage. In an embodiment, certificate authority 1130 sends a validation request to identity management system 1140 to determine the principals that the user ID is associated with (Operation 1540). In an embodiment, certificate authority 1130 validates the request by comparing access privileges stored in a directory service or a separate identity and access management system.

In an embodiment, identity management system 1140 returns access data in the form of a list of target-specific principals and/or other principals (Operation 1550). In an embodiment, the access data returned includes details about resources associated with the user ID that may be used to form a target-specific principal. For example, identity management system 1140 may return a list of host classes available to an operator using the user ID. In an embodiment, the access data includes other information such as access levels available for the host(s).

Once validated, certificate authority 1130 generates a certificate. For example, the certificate may resemble the certificate shown in FIG. 13 or the certificate shown in FIG. 14. In accordance with one or more embodiments, the certificate generation process includes selecting a target-specific principal from the access data or forming a target-specific principal using a user ID and a target host class identifier found in access data. For example, the target-specific principal may be formed as a string of characters using the format previously discussed (e.g., <<user ID>>@hc_<<hostclass>>_<<access>>) or may be formed using a different format. In an embodiment, certificate authority 1130 uses input from the certificate signing request to determine the user ID. In an embodiment, the user ID associated with the request is stored in the Key ID field of the certificate as shown in FIG. 13. In an embodiment, a target-specific principal is stored in the Key ID field of the certificate as shown in FIG. 14.

In accordance with one or more embodiments, access data may indicate that an operator is permitted to access a variety of hosts or hosts in a variety of classes. The access data may also indicate that the operator is permitted to use different user IDs for some hosts or host classes and may have different access levels for different hosts. In such a case, multiple target-specific principals may be formed and included in the principals section of the certificate. For example, if the access data indicates that user jsmith may access the host class "appserver-prod" with sudo level access using the user ID jsmith, then jsmith@hc_appserver-prod_sudo may be added to the certificate as a target-specific principal. If access data indicates that jsmith may access a class of test databases called db-test with sudo access privileges using user ID testuser1 (not jsmith), then testuser1@hc_db-test_sudo may be added to the same certificate as a target-specific principal. In an embodiment, more than one certificate may be generated by a certificate authority for a single operator device or a connection agent.

In accordance with one or more embodiments, the certificate, including the signature of certificate authority 1130, is then returned to operator device 1110 (Operation 1560). Upon receiving the SSH certificate from certificate authority 1130, the operator device 1110 undertakes several preparatory steps before using the certificate to access the target host. Operator device 1110 stores the certificate in a secure location that may also be used to store the private key associated with operator device 1110. This storage can either be local, such as on the device's file system in a directory specifically reserved for SSH keys and certificates, or it might be managed through a centralized key management system. The SSH client software can then retrieve and use the certificate for authentication purposes during SSH sessions.

In accordance with one or more embodiments, operator device 1110 monitors the validity period of the certificate. SSH certificates that are issued with a defined validity period are discarded when they expire or are no longer usable for authentication for another reason (e.g., the certificate has been revoked). Monitoring involves tracking the start and end dates of the certificate's validity period to ensure that the certificate is used within the permissible time period. In an embodiment, SSH certificates are issued with a very short validity period if, for example, they are intended to be used for a single session.

Operator device 1110 may also configure the SSH client software to reference the certificate for authentication in an embodiment. This involves specifying the certificate (and corresponding private key) within the SSH client configuration files or command-line arguments, ensuring that the SSH client presents the certificate during the authentication handshake with target hosts. By properly configuring the SSH client, the device ensures that the certificate, if still valid, is used automatically in future SSH sessions.

In accordance with an embodiment, operator device 1110 sends a secure connection request to target host 1120 (Operation 1570). This operation represents the SSH handshake process. The handshake process begins with the exchange of SSH protocol versions to ensure compatibility. Following this, operator device 1110 presents the certificate. In addition, a list of supported cryptographic algorithms is sent, and mutually supported algorithms selected from the list are negotiated for the session. The key exchange initiation phase may involve the client sending a packet that includes a random number or other data needed to establish a shared secret. Other information, such as the SSH client software version, may also be shared for logging or debugging. Operator device 1110 then issues a connection request specifying the requested service type, such as an interactive shell or command execution, along with session specifics, like terminal type and window size. The user ID of the operator is also provided, indicating the account on the server the operator wishes to access. In an embodiment, the user ID may be different than the one used for initial authentication. The use of the certificate in the authentication request obviates the need for further credential exchange because target host 1120 validates the digital signature of certificate authority that is in the certificate against a list of trusted CAs to authenticate the operator's identity.

In accordance with one or more embodiments, target host 1120 parses the certificate to extract various pieces of information, including the principals. This allows target host 1120 to determine the entities that the certificate is authorized to represent; these can be specific user accounts or roles on the target host. Target host 1120 then uses the extracted principals to determine if the operator attempting to establish the connection is authorized to access the system under any of the specified identities. This involves a comparison of the principals listed in the certificate with the user accounts or roles available on the system. If there is a match between any principal in the certificate and a user account or role on the host, the operator is granted access under that identity.

In accordance with one or more embodiments, principals extracted from the certificate may be target-specific principals. Since target-specific principals include target-specific information that can identify classes of target resources, the same target-specific principal may indicate access for more than one target host. For example, if a target-specific principal jsmith@hc_appserver-prod_sudo is used, the operator associated with the certificate will be able to access hosts that are in the class "appserver-prod" using the same certificate, assuming the certificate remains valid. Target host 1120 compares the target-specific principals listed in the certificate with the user accounts or roles available on the system and the host class. If there is a match between any target-specific principal in the certificate and a user account or role on target host 1120, the operator is granted access under that identity if the host class matches the host class of target host 1120.

To further illustrate this process, in an embodiment, target host 1120 runs SSH software such as OpenSSH server. The software is configured to identify the principles that are authorized to access target host 1120 using one or more accounts associated with target host 1120. Target host 1120 includes a configuration that indicates the host class, so target host 1120 can reference that configuration to compare target host's 1120 host class with the host class in any of the target-specific principals. When target host 1120 receives a certificate along with a request for access, target host 1120 recognizes if a trusted certificate authority signed the certificate. If so, target host 1120 moves on to the next step. A public key for operator device 1110 is stored in the certificate, and target host 1120 uses this to issue a signature challenge to the sender of the certificate to ensure that the sender is the operator device 1110 rather than an imposter. Operator device 1110 responds to the signature challenge with proof that operator device 1110 possesses the operator device private key, thereby proving operator device's 1110 identity.

Once the identity of operator device 1110 has been established, target host 1120 checks to see what principle strings the user ID is associated with on target host 1110. Principal strings may be stored on target host 1110, or principal strings may be generated dynamically by combining known user IDs on the system with the known host class and other available options such as access level. By comparing the list of target-specific principals in the certificate with a list of target-specific principals stored on or generated by target host 1120, a match can be determined. If at least one match is found, then operator device 1110 is authorized to access target host 1120. This authorization is then communicated to operator device 1110 (Operation 1580).

In an embodiment, an operator device will not be authorized to access a target host if no match is found, even if the user ID provided matches a user ID on the system. This can occur even if the user ID on the system is associated with the same operator as the user ID previously authenticated. For example, if the target-specific principal is jsmith@hc_appserver-stage, but the host class of the target host to which the request is being made is appserver-prod, then the target host will generate a target-specific principal of jsmith@hc_appserver-prod for comparison purposes. When the target host compares the string jsmith @hc_appserver-stage with the string jsmith@hc_appserver-prod, the target host will not find a match.

This illustrates an advantage of using target-specific principals. If an operator has a user ID on a production host but intends to access a staging host, a certificate that indicates the staging host class will prevent the operator from accessing the production host of type accidentally. In contrast, a principal that is not target specific would not prevent access in such a case because a comparison of the principal and the local user IDs would match, indicating that access should be granted based on the trust associated with the certificate.

5. Using Target-Specific Principals with a Connection Agent

Figure 16:
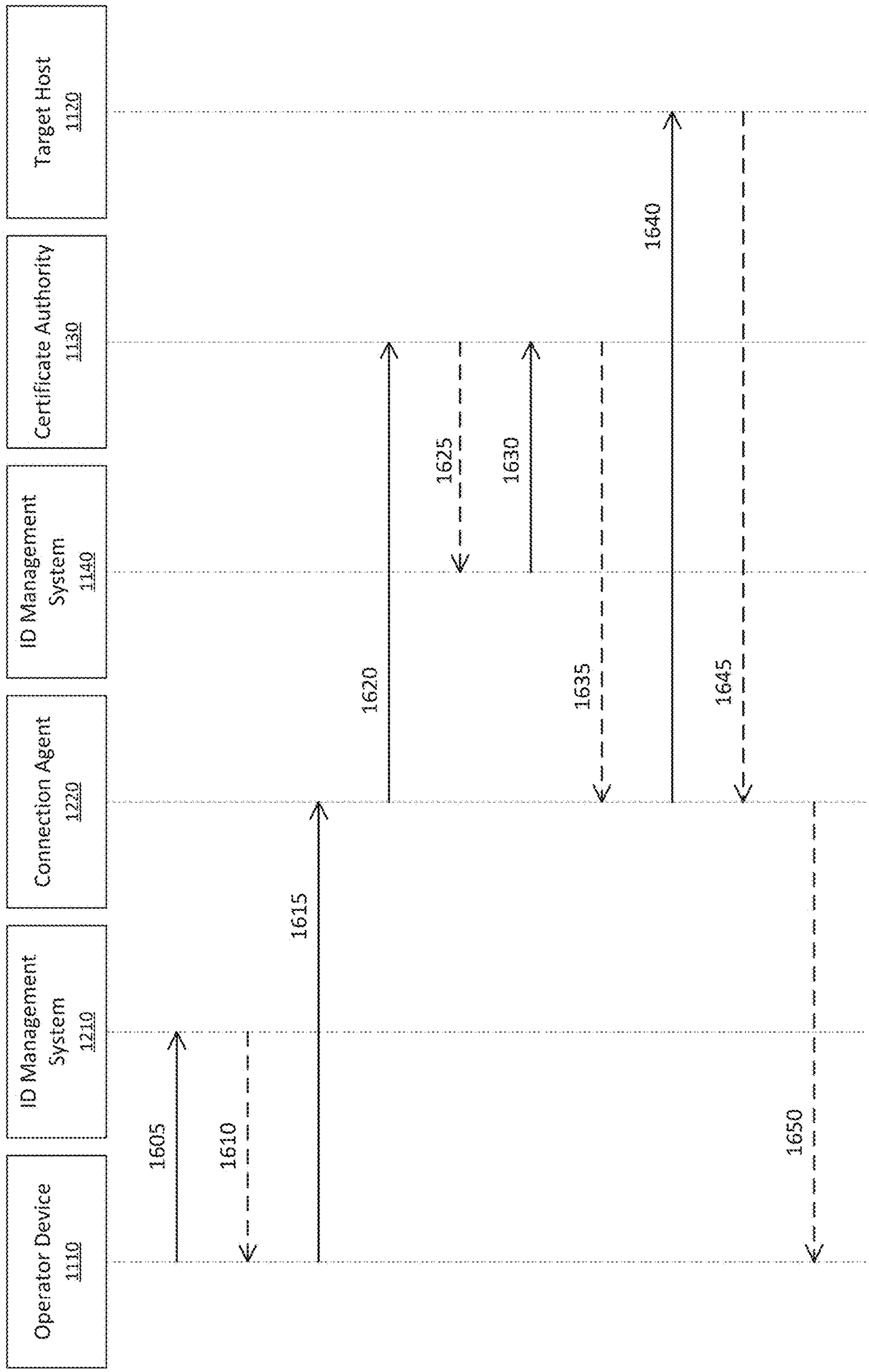
FIG. 16 illustrates an example set of operations for managing access to resources in a cloud computing environment using a connection agent to initiate SSH sessions in accordance with one or more embodiments.

FIG. 16 illustrates an example set of operations for managing access to resources in a cloud computing environment using a connection agent to manage SSH sessions in accordance with one or more embodiments. One or more operations illustrated in FIG. 16 may be modified, rearranged, or omitted altogether. Accordingly, the particular sequence of operations illustrated in FIG. 16 should not be construed as limiting the scope of one or more embodiments.

In an embodiment, operator device 1110 initiates a request for authentication by sending credentials to identity management system 1210 (Operation 1605). Although the process is similar to the operator device process 1110 authentication process described in connection with FIG. 15, the authorization is performed by a different identity management system. The use of connection agent 1220 results in the decoupling of the authentication of operator device 1110 from authorization of connection agent 1220 with identity management system 1140. From the perspective of certificate authority and target host, the connection agent needs to be authenticated with identification management system 1140 to use network resources.

Identity management system 1210 evaluates the provided credentials to determine their validity. Upon successful authentication, the system generates an access token that is sent back to operator device 1110 (Operation 1610). This token serves as a digital key, granting the operator device permission to access certain resources, including connection agent 1220.

In accordance with an embodiment, operator device 1110 sends the access token and a command to connection agent for opening a secure connection to target host (Operation 1615). For example, the command may indicate that an operator is attempting to obtain authorization to access hosts in a particular host class. The command may indicate the host class, identifiers for different types of hosts, level of access request, a request for a particular target-specific principal, and other options. If no access token is received or if the received token is invalid or expired, certificate authority 1130 redirects operator device 1110 to the appropriate identity provider such as identity management system 1140. If a valid access token exists, a chain of trust is established, allowing connection agent 1220 to make requests on behalf of operator device 1110.

In accordance with one or more embodiments, connection agent 1220 initiates a certificate signing request to obtain an SSH certificate on behalf of operator device 1110. This request is sent to certificate authority 1130 (Operation 1620). Assuming the operator device has generated a public/private key pair, the certificate signing request includes the public key. The public key will be used in the SSH certificate and metadata related to the operator or the device generating the request, such as the device's name, location, or other identifiers that certificate authority 1130 requires for authentication and authorization purposes. The certificate signing request also includes a user ID associated with operator device 1110 and a target host class identifier that indicates that the certificate will be used to access hosts in the class of hosts that includes target host 1120. This request is then encoded and sent to certificate authority 1130 that is trusted within the organization's infrastructure or by the operator. In an embodiment, connection agent 1220 resides on operator device 1110, so the public/private key pair is associated with operator device 1110. In another embodiment, connection agent 1220 does not reside on operator device 1110; thus, the public/private key pair is associated with the device where the connection agent resides.

Upon receiving the certificate signing request, certificate authority 1130 validates the identity of the operator and the authenticity of the request. This validation process may involve checking the operator's credentials against an identity provider or directory service, such as identification management system 1140, and ensuring that the operator is authorized to receive a certificate for the requested usage. In an embodiment, certificate authority 1130 sends a validation request to identity management system 1140 to determine the principals that the user ID is associated with (Operation 1625). In an embodiment, certificate authority 1130 validates the request by comparing access privileges stored in a directory service or a separate identity and access management system.

In an embodiment, identity management system 1140 returns access data to certificate authority 1130 in the form of a list of target-specific principals and/or other principals (Operation 1630). In an embodiment, the access data returned includes details about resources associated with the user ID that may be used to form a target-specific principal. For example, identity management system 1140 may return a list of host classes available to an operator using the user ID. In an embodiment, the access data includes other information such as access levels available for the host(s).

Once validated, certificate authority 1130 generates a certificate. For example, the certificate may resemble the certificate shown in FIG. 13 or the certificate shown in FIG. 14. In accordance with one or more embodiments, as with the example illustrated in FIG. 15, the certificate generation process includes selecting a target-specific principal from the access data or forming a target-specific principal using a user ID and a target host class identifier found in access data. For example, the target-specific principal may be formed as a string of characters using the format previously discussed (e.g., <<user ID>>@hc_<<hostclass>>_<<access>>) or may be formed using a different format. In an embodiment, certificate authority 1130 obtains the user ID from the authentication credential (e.g., the IAM token). In another embodiment, certificate authority 1130 uses input from the certificate signing request to determine the user ID. In an embodiment, the user ID associated with the request is stored in the Key ID field of the certificate as shown in FIG. 13. In an embodiment, a target-specific principal is stored in the Key ID field of the certificate as shown in FIG. 14.

In accordance with one or more embodiments, the certificate, including the signature of certificate authority 1130, is then returned to connection agent 1220 (Operation 1635). Upon receiving the SSH certificate from certificate authority 1130, connection agent 1220 stores the certificate in a secure location that may also be used to store the private key used in the certificate signing request. This storage can either be local, such as on the device's file system in a directory specifically reserved for SSH keys and certificates, or the storage might be managed through a centralized key management system. Connection agent 1220 can then retrieve and use the certificate for authentication purposes during SSH sessions. In other ways, connection agent 1220 manages certificates in a way similar to the way operator device 1110 manages certificates, as discussed above. In an embodiment, a copy of the certificate is passed on to operator device 1110.

In accordance with an embodiment, connection agent 1220 sends a secure connection request to target host 1120 on behalf of operator device 1110 (Operation 1640). This operation represents the SSH handshake process described previously. In accordance with one or more embodiments, target host 1120 parses the certificate to extract various pieces of information, including the principals. This allows target host 1120 to determine the entities that the certificate is authorized to represent; these can be specific user accounts or roles on the target host. Target host 1120 then uses the extracted principals to determine if the operator attempting to establish the connection is authorized to access the system under any of the specified identities. This involves a comparison of the principals listed in the certificate with the user accounts or roles available on the system. If there is a match between any principal in the certificate and a user account or role on the host, the operator is granted access under that identity.

In accordance with one or more embodiments, principals extracted from the certificate may be target-specific principals. Since target-specific principals include target-specific information that can identify classes of target resources, the same target-specific principal may indicate access for more than one target host. For example, if a target-specific principal jsmith@hc_appserver-prod_sudo is used, the operator associated with the certificate will be able to access hosts that are in the class "appserver-prod" using the same certificate, assuming the certificate remains valid. Target host 1120 compares the target-specific principals listed in the certificate with the user accounts or roles available on the system and the host class. If there is a match between any target-specific principal in the certificate and a user account or role on target host 1120, the operator is granted access under that identity if the host class matches the host class of target host 1120. If at least one match is found, then operator device 1110 is authorized to access target host 1120. This authorization is then communicated to operator device 1110 (Operation 1645).

In accordance with one or more embodiments, once a connection has been established with target host 1120, connection agent 1220 sends an indication to operator device 1110 that the connection was successfully made (Operation 1650). In an embodiment, operator device 1110 continues to use connection agent 1220 as an intermediary for passing commands to target host 1120. For example, port forwarding may be used to allow operator device 1110 to access a specific service on target host 1120 through connection agent 1220 acting as an intermediary. Once set up, the connection agent 1220 can forward packets between the operator device 1110 and target host 1120. In this case, the SSH session remains active.

6. Example Embodiment—Certificate Authority

Figure 17:
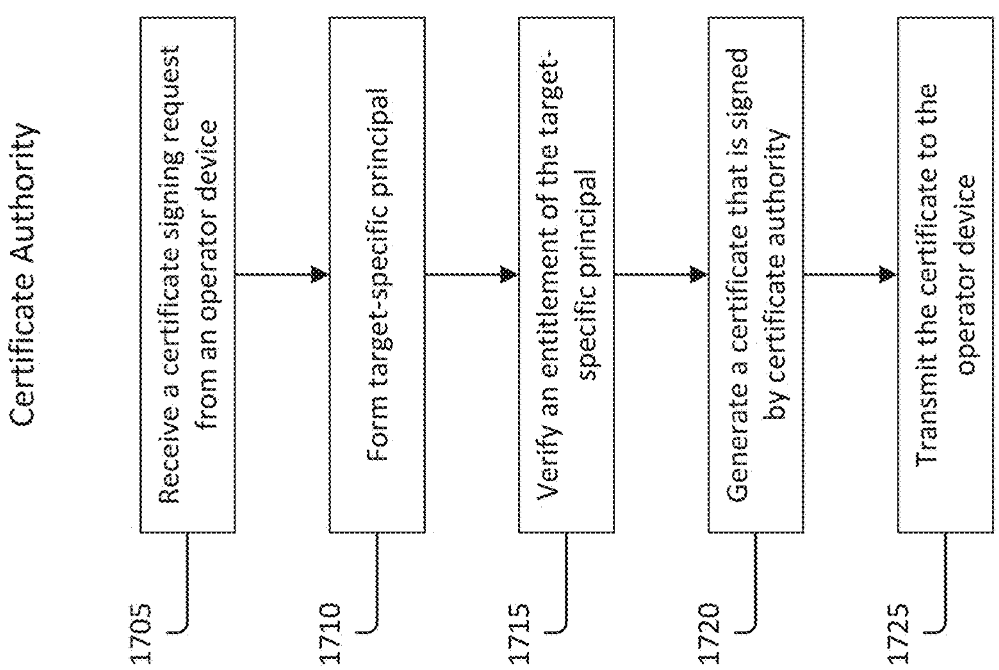
FIG. 17 illustrates an example set of operations performed by a certificate authority in accordance with one or more embodiments.

FIG. 17 illustrates an example set of operations performed by a certificate authority in accordance with one or more embodiments. One or more operations illustrated in FIG. 17 may be modified, rearranged, or omitted altogether. Accordingly, the particular sequence of operations illustrated in FIG. 17 should not be construed as limiting the scope of one or more embodiments.

In accordance with one or more embodiments, a certificate authority receives a certificate signing request from an operator device (Operation 1705). The certificate signing request includes a resource identifier that is associated with a target host or multiple target hosts. For example, the resource identifier may be a host class that is associated with a group of servers, such as file servers or application servers. As another example, the resource identifier may be associated with a group of VNICs or other resources. In an embodiment, the certificate signing request includes more than one resource identifier. The following steps also apply for the resource identifier. In an embodiment, the certificate signing request also includes a token that substantiates that an authentication action was completed. For example, the operator device may be required to authenticate with an identity provider before making a request to the certificate authority. In such a case, the certificate authority will determine if the token provides sufficient evidence of an acceptable authentication action.

In accordance with one or more embodiments, the certificate authority forms a target-specific principal (Operation 1710). The certificate authority uses the user identifier and the resource identifier provided with the certificate signing request to generate the target-specific principal. In an embodiment, the target-specific principal is formed using the format <<user identifier>>@<resource identifier>>. In other embodiments, the target-specific principal may be formed using the format <<user identifier>>@hc_<<resource identifier>> to indicate that the resource identifier is a host class. Other ways of distinguishing and separating the user identifier from the resource identifier may be utilized such as the use of different characters. Additionally, other ways of categorizing an element of a target-specific principal may be used. For example, instead of indicating that the resource identifier is a host class by including an element label "hc_", the element may be labeled using a special character before the element to indicate that the element is a host class. In an embodiment, more than one target-specific principal is generated, and the steps described may be performed for the target-specific principals.

In accordance with one or more embodiments, the certificate authority verifies an entitlement of the target-specific principal (Operation 1715). This step may include, for example, identifying a set of one or more authorized principals from the set of access data. In an embodiment, authorized principals identified from the access data include a user identifier and a resource identifier that may be different for the principals. In an embodiment, the authorized principal may be communicated to the certificate authority (by an identity management service, for example) in a manner that provides the essential elements of the authorized principal with the elements separated (rather than formed as a single string). In such a case, as long as the essential elements are received in a manner that allows the inference that the elements are associated with one another, they inherently represent an authorized principal and will be referred to as such. Once the authorized principals have been identified, the certificate authority compares the target-specific principal with the set of authorized principals retrieved from the access data. If there is a match, an entitlement has been verified.

In an embodiment, the certificate authority generates and signs a certificate (Operation 1720). The certificate may resemble the certificate of FIG. 13 or the certificate of FIG. 14 in an embodiment. The certificate includes, for example, the target-specific principal and a digital signature of the certificate authority. In an embodiment, two or more target-specific principals may be identified in the certificate. The target-specific principal(s) are included in the principals section of the certificate.

In an embodiment, once the certificate has been generated, certificate authority sends the certificate to the operator device. The linkage between a certificate signing request and response is managed through the certificate signing request's metadata and the authentication process. In an embodiment, a unique request identifier may be used to track the request through the system. The certificate authority delivers the signed certificate back to the operator device through a secure channel. This could be the same channel through which the request was made, such as a secure web interface or a Secure Shell connection, or through a separate secure mechanism designated for certificate delivery. The secure delivery helps to prevent the certificate from being intercepted or altered by unauthorized parties during transit.

7. Example Embodiment—Target Host

Figure 18:
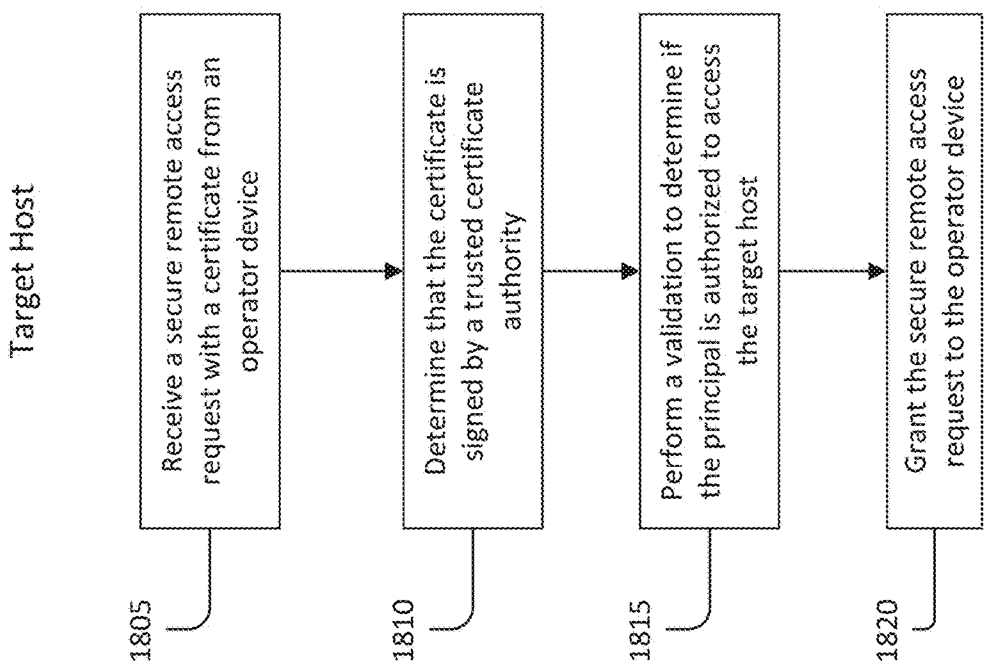
FIG. 18 illustrates an example set of operations performed by a target host in accordance with one or more embodiments.

FIG. 18 illustrates an example set of operations performed by a target host in accordance with one or more embodiments. One or more operations illustrated in FIG. 18 may be modified, rearranged, or omitted altogether. Accordingly, the particular sequence of operations illustrated in FIG. 18 should not be construed as limiting the scope of one or more embodiments.

In accordance with one or more embodiments, a target host receives a secure remote access request that includes a certificate from an operator device (Operation 1805). The certificate may be similar in form to the certificate illustrated in FIG. 13 or the certificate illustrated in FIG. 14, for example. The certificate may include one or more target-specific principals and additional information such as a time period that indicates when the certificate is valid. In accordance with an embodiment, the target-specific principal includes a resource identifier that corresponds to a set of one or more target resources. For example, the target resources may be identified by a host class.

In accordance with an embodiment, the target host examines the certificate to verify the certificate's authenticity and integrity. The target host parses the certificate to extract information, such as any target-specific principals, signature information, and the public key associated with the operator device that sent the secure remote access request. In accordance with an embodiment, the target host checks the digital signature on the certificate against the public key of the certificate authority that supposedly issued the certificate. For the target host to determine that the certificate authority that signed the certificate is a trusted authority, the target host uses prior knowledge of the certificate authority's public key. This is typically achieved by the target host having a pre-configured list of trusted certificate authorities.

If the certificate authority's public key is found within the target host's pre-configured list of trusted certificate authorities, the digital signature on the certificate can be successfully verified, confirming that a trusted certificate authority (Operation 1810) indeed issued the certificate. This verification establishes a trust chain from the certificate authority to the operator device presenting the certificate.

In accordance with one or more embodiments, the target host performs a validation to determine if the target-specific principal(s) are authorized to access the target host (Operation 1815). In an embodiment, the validation step includes identifying a set of one or more authorized principles from a set of access data and comparing the authorized principals from the access data with the principals in the certificate. If there is a match between any target-specific principal in the certificate and a user account/host class combination on the target host, the validation has been successful.

In accordance with one or more embodiments, in response to determining that the principal is authorized to access the target host, the target host grants the secure remote access request (Operation 1820). Upon granting access, the target host and the operator device establish a secure, encrypted communication channel. This channel is used for subsequent data exchange during the session, protecting the integrity and confidentiality of the data transmitted. The secure channel is established using cryptographic protocols that ensure data is encrypted and decrypted at each end by the operator device and the target host, respectively. This secure connection enables the operator to execute commands, transfer files, or perform any other authorized operations on the target host remotely, with some assurances that the session is protected against eavesdropping, tampering, and impersonation attacks.

8. Example Embodiment—Connection Agent

Figure 19:
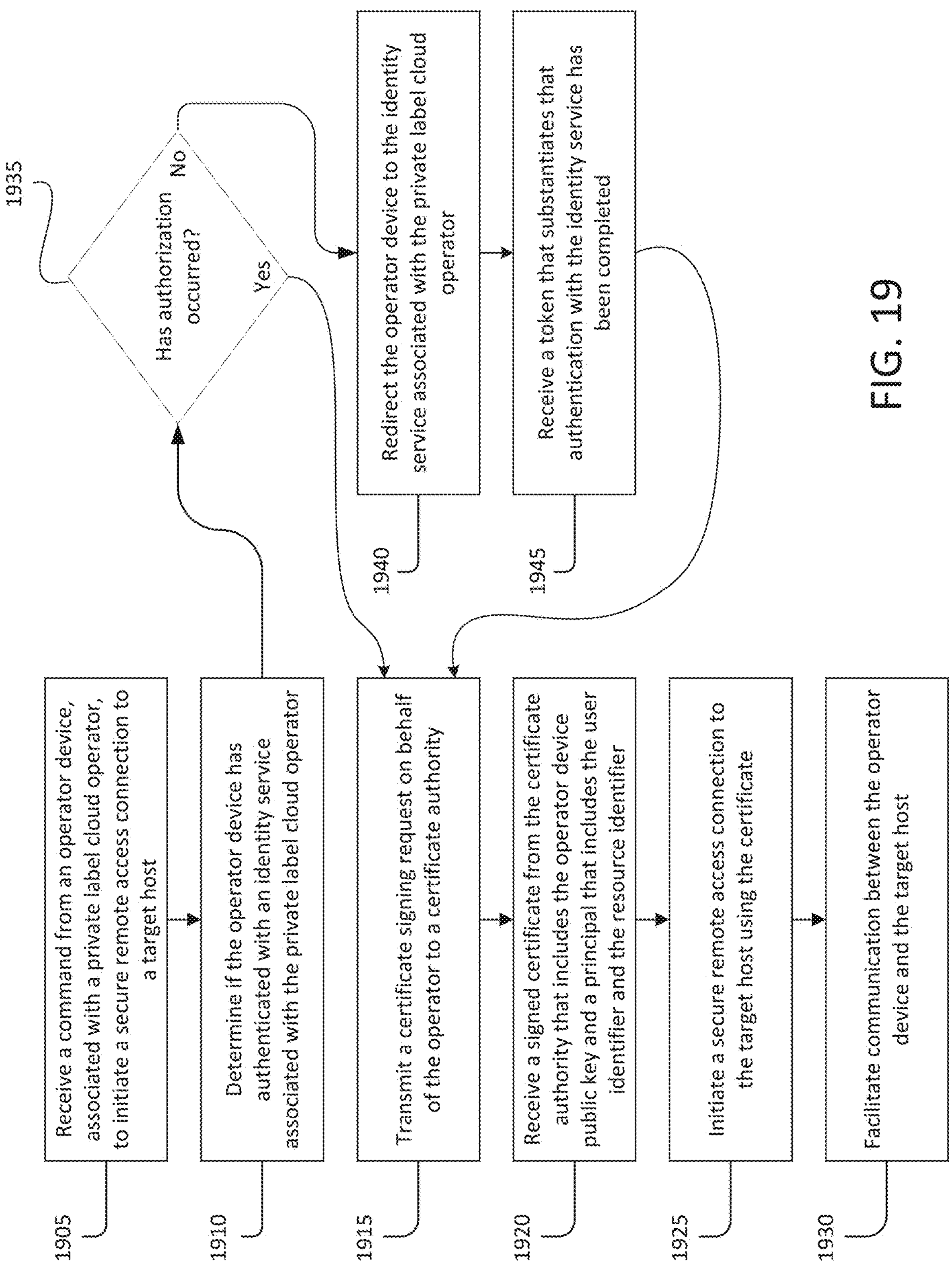
FIG. 19 illustrates an example set of operations performed by a connection agent in accordance with one or more embodiments.

FIG. 19 illustrates an example set of operations performed by a connection agent in accordance with one or more embodiments. One or more operations illustrated in FIG. 19 may be modified, rearranged, or omitted altogether. Accordingly, the particular sequence of operations illustrated in FIG. 19 should not be construed as limiting the scope of one or more embodiments.

In accordance with one or more embodiments, a connection agent receives a command from an operator device that is associated with a private label cloud operator. The command is interpreted as a request to establish a secure connection to a target host (Operation 1905). For example, the command may be presented to the connection agent using a command line interface, an application programming interface, or another interface such as a graphical user interface.

In accordance with one or more embodiments, the connection agent determines if the operator device has authenticated with an identity service associated with a private label cloud operator (Operation 1910). This process may involve, for example, the connection agent checking for the presence of a security token issued by the identity service as proof of successful authentication. This token encapsulates the operator's credentials and authorization details and may include a timestamp, user identity, and other pertinent attributes encrypted or signed by the identity service. The connection agent analyzes the token, validating the certificate's integrity and authenticity. This validation might include decrypting the token with a public key, verifying digital signatures, and checking the token's validity period to ensure the certificate has not expired. After confirming that the token is valid and was indeed issued by a trusted identity service, the connection agent can proceed with performing actions on behalf of the operator device, while enforcing security policies and access controls associated with the operator's authenticated identity. At this point, the connection agent can discern if authorization has occurred or not (Operation 1935).

In an embodiment, the connection agent determines that authorization has not occurred. For example, the expected token may be missing or invalid (e.g., timed out). In this case, the connection agent redirects the operator device to the identity service associated with the private label cloud operator (Operation 1940). As discussed previously, this redirection may be facilitated, for example, through an HTTP response with a status code indicating redirection and includes the URL of the identity provider where the operator can authenticate. Alternatively, in the case of a command line interface, other mechanisms for redirection may be employed.

The connection agent then receives a token that substantiates that authentication with the identity service has been completed (Operation 1945). The connection agent analyzes the token, validating the token's integrity and authenticity. After confirming that the token is valid and was issued by a trusted identity service, the connection agent may proceed.

In an embodiment, once the connection agent determines that the operator device has authenticated with an identity service associated with the private label cloud operator, the connection agent can begin performing actions on behalf of the operator based on the request to establish a secure connection to the target host. In accordance with an embodiment, the connection agent transmits a certificate signing request to a certificate authority on behalf of the operator (Operation 1915). In accordance with one or more embodiments, the certificate signing request includes a user identifier associated with the operator device and a public key of a public/private key pair associated with the operator device. In accordance with an embodiment, the public/private key pair are associated with a device other than the operator device where the connection agent resides. The certificate signing request also includes a resource identifier that is associated with a target host or with multiple target hosts.

In accordance with one or more embodiments, the connection agent receives a signed certificate from the certificate authority that includes the operator device public key and a target-specific principal that includes the user identifier and the resource identifier (Operation 1920). For example, the certificate may look similar in format to the certificate illustrated in FIG. 13 or the certificate illustrated in FIG. 14. The connection agent stores the certificate in a secure location that may also be used to store the private key used in the certificate signing request.

In accordance with one or more embodiments, the connection agent initiates a secure remote access connection to the target host using the certificate (Operation 1925). The connection agent performs this step by sending a secure connection request to the target host on behalf of the operator device. This operation represents the SSH handshake process described previously. The connection agent responds as necessary to complete the handshake and waits for the target host to confirm that the operator device is authorized to access the target server.

Once initiation of the secure remote access connection to the target host is complete, the communication agent facilitates communication between the operator device and the target host (Operation 1930). In accordance with one or more embodiments, the communication agent continues to receive commands from the operator via the operator device. The communication agent then passes these commands to the target host on behalf of the operator device using the established secure connection.

In accordance with one or more embodiments, the connection agent may receive a command by a second operator device to initiate a secure remote access connection to a target host that may be the same target host previously discussed or may be a different target host. In an embodiment, the second operator device corresponds to a second identity service, and the second operator and second identity service are associated with an operational domain of a cloud service provider.

In accordance with an embodiment, in response to determining that the second operator device has not authenticated with the second identity service, the connection agent redirects the second operator device to the second identity service. In accordance with an embodiment, the connection agent receives a second token from the second identity service that substantiates that authentication with the second identity service has been completed; next, the connection agent transmits a second certificate signing request on behalf of the second operator device to the certificate authority.

In accordance with an embodiment, the second certificate signing request comprises a second user identifier, a second operator device public key, and the resource identifier. In an embodiment, the connection agent receives a second certificate from the certificate authority that is signed by the certificate authority. The second certificate includes the second operator device public key and a second principal, and the principal includes the second user identifier and the resource identifier. The connection agent then initiates a second secure remote access connection to the target host using the certificate.

9. Practical Applications, Advantages & Improvements

SSH certificate systems provide a mechanism for authentication to validate the identity of operators and devices within a cloud environment. Unlike traditional SSH key authentication that involves managing individual public and private key pairs, SSH certificates introduce a centralized authority to issue certificates that assert the identity of the operator or device. This approach simplifies key management by reducing the number of keys that are directly managed and by providing a scalable way to control access across distributed systems.

In a cloud environment, where resources and services are dynamically provisioned and accessed over the internet, the use of SSH certificates enhances security by enabling more granular control over authentication and authorization. The certificate authority issues certificates to operators or devices after verifying their identity. Certificates contain the public key of the operator or device, along with metadata, such as the certificate's validity period and the permissions granted to the bearer. The CA's signature on the certificate allows the server to verify the authenticity of the certificate without needing to directly check the operator's or device's public key against a stored list.

SSH certificates also simplify the process of rotating keys and revoking access. Operators can be issued short-lived certificates, reducing the risk associated with stolen or compromised keys since the certificates expire after a brief period. If a key is compromised or an operator's access needs to be revoked, administrators can invalidate the certificate or wait for it to expire rather than having to manually update key lists on the server(s).

Furthermore, SSH certificate systems facilitate the implementation of least privilege access controls by allowing the specification of granular permissions within the certificate. This ensures that operators and devices are restricted to accessing what is necessary to perform their functions, limiting the potential impact of a compromised key. Additionally, automating certificate issuance and renewal processes can be integrated with existing identity management systems, streamlining the authentication workflow and reducing the administrative burden associated with managing access in a dynamic cloud environment.

The adoption and improvement of SSH certificate systems in cloud environments provide a secure, scalable, and manageable approach to authentication and access control, addressing many of the challenges associated with traditional SSH key management and enhancing the overall security posture of cloud-based systems.

10. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:

receiving, at a certificate authority, a certificate signing request associated with an operator device, wherein the certificate signing request includes a user identifier associated with the operator device, and a first resource identifier associated with one or more target hosts;

wherein the first resource identifier comprises at least one of: (a) a host name; or (b) a host class;

wherein the certificate signing request comprises a token that substantiates that an authentication action was successfully completed;

forming a first target-specific principal comprising the user identifier and the first resource identifier;

verifying an entitlement of the first target-specific principal based on a set of access data;

at least in response to verifying the entitlement of the first target-specific principal: generating a certificate, wherein the certificate comprises the first target-specific principal, and the certificate is signed by the certificate authority; and transmitting the certificate in response to the certificate signing request.

2. The non-transitory computer-readable media of claim 1, wherein verifying an entitlement of the first target-specific principal based on a set of access data comprises:

identifying, from the set of access data, a set of one or more authorized principals, each comprising a respective user identifier and a respective resource identifier;

determining a match between the first target-specific principal and an authorized principal of the set of authorized principals, wherein a match comprises matching a string that comprises the user identifier of the first target-specific principal and the resource identifier of the first target-specific principal with a second string that comprises user identifier of the authorized principal and the resource identifier of the authorized principal.

3. The non-transitory computer-readable media of claim 1, wherein validating the first principal against the set of access data comprises:

identifying, from the set of access data, a set of one or more authorized principals, each comprising a respective user identifier and a respective resource identifier;

determining a match between the first target-specific principal and an authorized principal of the set of authorized principals, wherein a match comprises (a) a first match between the user identifier of the first target-specific principal and the user identifier of the authorized principal and (b) a second match between the resource identifier of the first target-specific principal and the resource identifier of the authorized principal.

4. The non-transitory computer-readable media of claim 1, wherein the certificate signing request includes a second resource identifier, the operations further comprising:

forming a second target-specific principal comprising the user identifier and the second resource identifier;

validating a second principal against the set of access data, the second principal comprising the user identifier and the second resource identifier;

wherein the certificate comprises the second principal.

5. The non-transitory computer-readable media of claim 1, wherein the certificate signing request includes a third resource identifier, the operations further comprising:

determining that a third principal is not valid when compared against the set of access data, the third principal comprising the user identifier and the third resource identifier;

wherein the certificate does not include the third principal.

6. The non-transitory computer-readable media of claim 1, wherein the certificate forms a basis for opening a secure connection between the operator device and a target host associated with the first resource identifier.

7. The non-transitory computer-readable media of claim 6, wherein the operations further comprise:

receiving, at the target host, (a) a secure remote access request, associated with the operator device, to open a secure connection with the target host, and (b) the certificate;

determining that the certificate is signed by a trusted certificate authority;

performing, at the target host, a validation to determine whether the principal is authorized to access the target host;

at least in response to determining that the principal has authorization to access the target host: granting the secure remote access request to open the secure connection.

8. The non-transitory computer-readable media of claim 7, wherein performing a validation to determine whether the principal is authorized to access the target host comprises:

identifying, from the set of access data, a set of one or more authorized principals;

determining that the principal corresponds to at least one authorized principal of the set of authorized principals.

9. The non-transitory computer-readable media of claim 7, wherein the secure remote access request is received from a connection agent, and the operations further comprise:

receiving, at the connection agent, a command to initiate a first secure remote access connection to the target host, wherein the command is received from the operator device;

transmitting the certificate signing request on behalf of the operator device to the certificate authority, wherein the certificate signing request further comprises a first operator device public key;

receiving, at the connection agent, the certificate from the certificate authority;

wherein the certificate is signed by the certificate authority using a certificate authority public key;

wherein the certificate further comprises the operator device public key and the first target-specific principal;

initiating, by the connection agent, a first secure remote access connection between the operator device and the target host, using the first certificate.

10. The non-transitory computer-readable media of claim 1, wherein the certificate comprises an expiration indicator that specifies or references an expiration time.

11. The non-transitory computer-readable media of claim 1, wherein the certificate signing request further comprises a public key of a key pair associated with the operator device, the certificate comprises the public key, and an access request substantiated using the certificate is signed with a private key of the key pair associated with the operator device.

12. The non-transitory computer-readable media of claim 1, wherein the certificate further comprises one or more tenancy identifiers related to a cloud infrastructure environment.

13. The non-transitory computer-readable media of claim 1, wherein the certificate further comprises a user identifier related to a cloud infrastructure environment.

14. A method, comprising:

receiving, at a certificate authority, a certificate signing request associated with an operator device, wherein the certificate signing request includes a user identifier associated with the operator device, and a first resource identifier associated with one or more target resources;

wherein the first resource identifier comprises at least one of: (a) a host name; or (b) a host class;

wherein the certificate signing request comprises a token that substantiates that an authentication action was successfully completed;

forming a first target-specific principal comprising the user identifier and the first resource identifier;

verifying an entitlement of the first target-specific principal based on a set of access data;

at least in response to verifying the entitlement of the first target-specific principal: generating a certificate, wherein the certificate comprises the first target-specific principal, and the certificate is signed by the certificate authority; and transmitting the certificate in response to the certificate signing request;

wherein the method is performed on one or more devices, each comprising a hardware processor.

15. The method of claim 14, wherein verifying an entitlement of the first target-specific principal based on a set of access data comprises:

identifying, from the set of access data, a set of one or more authorized principals, each comprising a respective user identifier and a respective resource identifier;

determining a match between the first target-specific principal and an authorized principal of the set of authorized principals, wherein a match comprises matching a string that comprises the user identifier of the first target-specific principal and the resource identifier of the first target-specific principal with a second string that comprises user identifier of the authorized principal and the resource identifier of the authorized principal.

16. The method of claim 14, wherein validating the first principal against the set of access data comprises:

identifying, from the set of access data, a set of one or more authorized principals, each comprising a respective user identifier and a respective resource identifier;

determining a match between the first target-specific principal and an authorized principal of the set of authorized principals, wherein a match comprises (a) a first match between the user identifier of the first target-specific principal and the user identifier of the authorized principal and (b) a second match between the resource identifier of the first target-specific principal and the resource identifier of the authorized principal.

17. The method of claim 14, wherein the certificate signing request includes a second resource identifier, the method further comprising:

forming a second target-specific principal comprising the user identifier and the second resource identifier;

validating a second principal against the set of access data, the second principal comprising the user identifier and the second resource identifier;

wherein the certificate comprises the second principal.

18. A system, comprising:

at least one device including a hardware processor;

the system being configured to perform operations comprising:

receiving, at a certificate authority, a certificate signing request associated with an operator device, wherein the certificate signing request includes a user identifier associated with the operator device, and a first resource identifier associated with one or more target resources;

wherein the first resource identifier comprises at least one of: (a) a host name; or (b) a host class;

wherein the certificate signing request comprises a token that substantiates that an authentication action was successfully completed;

forming a first target-specific principal comprising the user identifier and the first resource identifier;

verifying an entitlement of the first target-specific principal based on a set of access data;

at least in response to verifying the entitlement of the first target-specific principal: generating a certificate, wherein the certificate comprises the first target-specific principal, and the certificate is signed by the certificate authority; and transmitting the certificate in response to the certificate signing request.

19. The system of claim 18, wherein verifying an entitlement of the first target-specific principal based on a set of access data comprises:

identifying, from the set of access data, a set of one or more authorized principals, each comprising a respective user identifier and a respective resource identifier;

determining a match between the first target-specific principal and an authorized principal of the set of authorized principals, wherein a match comprises matching a string that comprises the user identifier of the first target-specific principal and the resource identifier of the first target-specific principal with a second string that comprises user identifier of the authorized principal and the resource identifier of the authorized principal.

20. The system of claim 18, wherein validating the first principal against the set of access data comprises:

identifying, from the set of access data, a set of one or more authorized principals, each comprising a respective user identifier and a respective resource identifier;

determining a match between the first target-specific principal and an authorized principal of the set of authorized principals, wherein a match comprises (a) a first match between the user identifier of the first target-specific principal and the user identifier of the authorized principal and (b) a second match between the resource identifier of the first target-specific principal and the resource identifier of the authorized principal.

* * * * *